US009492984B2

(12) United States Patent
Ben-David et al.

(10) Patent No.: US 9,492,984 B2
(45) Date of Patent: Nov. 15, 2016

(54) SYSTEMS AND METHODS FOR TREATING AND HANDLING CARDBOARD SHEETS

(71) Applicant: HIGHCON SYSTEMS LTD., Yavne, IL (US)

(72) Inventors: David Ben-David, Rehovot (IL); Yaki Stern, Shoham (IL); Yaron Smirnov, Netanya (IL); Tal Harmon, Gedera (IL)

(73) Assignee: HIGHCON SYSTEMS LTD., Yavne (IL)

( * ) Notice: Subject to any disclaimer, the term of this patent is extended or adjusted under 35 U.S.C. 154(b) by 0 days.

(21) Appl. No.: 14/530,813

(22) Filed: Nov. 2, 2014

(65) Prior Publication Data

US 2015/0148940 A1 May 28, 2015

Related U.S. Application Data

(63) Continuation-in-part of application No. 13/915,414, filed on Jun. 11, 2013, now Pat. No. 9,045,292, which is a continuation of application No. PCT/IL2013/000047, filed on May 1, 2013, application No. 14/530,813, which is a continuation-in-part of application No. 13/875,781, filed on May 2, 2013, application No. 14/530,813, which is a continuation-in-part of application No. PCT/IL2013/000042, filed on May 1, 2013, application No. 14/530,813, which is a continuation-in-part of application No. 13/875,894, filed on May 2, 2013, application No. 14/530,813, which is a continuation-in-part of application No. PCT/IL2013/000044, filed on May 1, 2013.

(60) Provisional application No. 61/641,298, filed on May 2, 2012, provisional application No. 61/641,458, filed on May 2, 2012, provisional application No. 61/641,534, filed on May 2, 2012.

(51) Int. Cl.
*G06F 7/00* (2006.01)
*B31B 1/74* (2006.01)

(52) U.S. Cl.
CPC .......... *B31B 1/74* (2013.01); *B31B 2201/0235* (2013.01); *B31B 2201/927* (2013.01); *B31B 2201/95* (2013.01)

(58) Field of Classification Search
None
See application file for complete search history.

(56) References Cited

U.S. PATENT DOCUMENTS

| | | |
|---|---|---|
| 3,777,604 A | 12/1973 | Gerber |
| 4,049,945 A | 9/1977 | Ehlscheid et al. |
| 4,244,465 A | 1/1981 | Hishikawa et al. |
| 4,637,206 A | 1/1987 | Suwa |

(Continued)

FOREIGN PATENT DOCUMENTS

| | | |
|---|---|---|
| DE | 10038104 A1 | 3/2002 |
| DE | 102007037133 A1 | 3/2008 |

(Continued)

OTHER PUBLICATIONS

DE 10038104 Machine Translation (by EPO and Google)—published Mar. 21, 2002—Brendahl Gunnar.

(Continued)

*Primary Examiner* — Yolanda Cumbess
(74) *Attorney, Agent, or Firm* — Daniel Feigelson Fourth Dimension IP

(57) ABSTRACT

System and methods of treating or handling cardboard sheets.

20 Claims, 34 Drawing Sheets

(56) References Cited

U.S. PATENT DOCUMENTS

| | | | | | |
|---|---|---|---|---|---|
| 4,645,900 | A | | 2/1987 | Heyden | |
| 4,667,953 | A | | 5/1987 | Hirakawa et al. | |
| 5,108,358 | A | | 4/1992 | Mounce | |
| 5,366,217 | A | * | 11/1994 | Tokuno | B65H 29/68 271/176 |
| 5,460,479 | A | | 10/1995 | Neumann et al. | |
| 5,874,157 | A | | 2/1999 | Robinson et al. | |
| 5,980,440 | A | | 11/1999 | Mitman et al. | |
| 6,024,003 | A | | 2/2000 | Newman et al. | |
| 6,131,901 | A | * | 10/2000 | Hirohata | B65G 29/56 271/188 |
| 6,180,913 | B1 | | 1/2001 | Kolmeder et al. | |
| 6,191,382 | B1 | | 2/2001 | Damikolas | |
| 6,297,470 | B1 | | 10/2001 | Stelzl | |
| 6,521,866 | B1 | | 2/2003 | Arai et al. | |
| 7,021,450 | B2 | | 4/2006 | Jones, Jr. | |
| 7,066,277 | B2 | | 6/2006 | Hendriks et al. | |
| 7,764,432 | B2 | | 7/2010 | Miyajima et al. | |
| 2002/0123418 | A1 | | 9/2002 | Davison et al. | |
| 2006/0178248 | A1 | | 8/2006 | Coullery et al. | |
| 2008/0078751 | A1 | | 4/2008 | Abrott | |
| 2008/0169601 | A1 | * | 7/2008 | Frank | B26D 5/12 271/183 |
| 2008/0179304 | A1 | | 7/2008 | Osako et al. | |
| 2010/0139464 | A1 | * | 6/2010 | Holm | B26D 7/18 83/23 |
| 2012/0053032 | A1 | | 3/2012 | Bruns et al. | |
| 2012/0121802 | A1 | | 5/2012 | Zimmer et al. | |
| 2013/0126489 | A1 | | 5/2013 | Buschulte | |
| 2013/0267397 | A1 | | 10/2013 | Hoover et al. | |
| 2013/0292226 | A1 | | 11/2013 | Ben-David et al. | |
| 2013/0335467 | A1 | | 12/2013 | Gerber | |
| 2014/0137977 | A1 | | 5/2014 | Cik | |
| 2015/0148940 | A1 | | 5/2015 | Ben-David et al. | |

FOREIGN PATENT DOCUMENTS

| | | | |
|---|---|---|---|
| EP | 0532217 | A1 | 3/1993 |
| WO | 02/11941 | A1 | 2/2002 |
| WO | WO0211941 | A1 | 2/2002 |
| WO | 03/022510 | A1 | 3/2003 |
| WO | WO03022510 | A1 | 3/2003 |
| WO | 2008/088246 | A1 | 7/2008 |
| WO | WO2008088246 | A1 | 7/2008 |
| WO | 2011/145092 | A2 | 11/2011 |
| WO | 2011/145931 | A1 | 11/2011 |
| WO | WO2011145931 | A1 | 11/2011 |
| WO | 2012/052985 | A1 | 4/2012 |
| WO | 2013/170160 | A1 | 11/2013 |
| WO | WO2013170160 | A1 | 11/2013 |

OTHER PUBLICATIONS

DE 102007037133 Machine Translation (by EPO and Google)—published Mar. 13, 2008—Brendahl Gunnar.

* cited by examiner

SYSTEMS AND METHODS FOR TREATING AND HANDLING CARDBOARD SHEETS

CROSS-REFERENCE TO RELATED APPLICATIONS

This application is a continuation-in-part (CIP) of U.S. patent application Ser. No. 13/915,414, filed Jun. 11, 2013 and entitled "METHOD AND SYSTEM FOR AUTOMATIC-ADJUSTABLE STACKER", which is a continuation of PCT Application No. PCT/IL2013/000047, filed May 1, 2013, both of which draw priority from and claim the benefit of U.S. Provisional Application Ser. No. 61/641,298 and entitled "METHOD AND SYSTEM FOR ADJUSTABLE STACKER", filed May 2, 2012; this application is also a continuation-in-part (CIP) application of PCT Application No. PCT/IL2013/000047, filed May 1, 2013 and entitled "METHOD AND SYSTEM FOR AUTOMATIC-ADJUSTABLE STACKER", which draws priority from and claims the benefit of U.S. Patent Application Ser. No. 61/641,298, filed May 2, 2012 and entitled "METHOD AND SYSTEM FOR ADJUSTABLE STACKER"; this application is also a continuation-in-part (CIP) of U.S. patent application Ser. No. 13/875,781, filed May 2, 2013 and entitled "METHOD AND SYSTEM FOR A DYNAMIC MULTIPLE SCANNERS SYSTEM", and of PCT Application No. PCT/IL2013/000042, filed May 1, 2013 and entitled "METHOD AND SYSTEM FOR A DYNAMIC MULTIPLE SCANNERS SYSTEM", both of which draw priority from and claim the benefit of U.S. Patent Application Ser. No. 61/641,458, filed May 2, 2012 and entitled "METHOD AND SYSTEM FOR LASER SCANNING"; this application is also a continuation-in-part (CIP) of U.S. patent application Ser. No. 13/875,894, filed May 2, 2013 and entitled "METHOD AND SYSTEM FOR STRIPPING AND BLANKING A CARDBOARD", and of PCT Application No. PCT/IL2013/000044, filed May 1, 2013 and entitled "METHOD AND SYSTEM FOR STRIPPING AND BLANKING A CARDBOARD", both of which draw priority from and claim the benefit of U.S. Patent Application Ser. No. 61/641,534, filed May 2, 2012 and entitled "METHOD AND SYSTEM FOR STRIPPING AND BLANKING"; all of which applications are hereby incorporated by reference for all purposes as if fully set forth herein.

TECHNICAL FIELD AND BACKGROUND

The present disclosure generally relates to the die-cutting and die-creasing industry, and more particularly the disclosure relates to a system and method of stripping and/or blanking a pre-treated cardboard. The present disclosure further relates to laser-beam (LB) scanners, and more particularly, to a system and method of pre-treating a cardboard using a laser-beam scanner. The present disclosure further relates to a system and method of stacking pre-treated cardboards.

The rapid evolution of trade around the world has created a significant demand for packaging in order to transfer/distribute goods to different remote areas. The transport of goods may be done by: ship, airplanes, trucks, as well as other transportations. The transport of goods may be performed by: the manufacturer; different suppliers; individual persons; etc. Further, a significant demand for different brochures, flyers, and the like also takes part in trade. The different brochures/flyers may have pre-folds and/or embossing and/or cuttings, for example. As a non-limiting example, embossing may be Braille writing.

Packaging has taken on a major role in the marketing of products in today's environments. The package in which the goods are packed and presented, in a store for instance, may determine if the goods will be appealing to a potential buyer in the store or not. Thus the packaging appearance can have a direct effect on the sales of merchandise. The brochures, flyers, and the likes, may also contribute to the sales and/or awareness with regards to a product and/or a service, for example.

Henceforth, throughout the description, drawings and claims of the present disclosure, the terms package, paperboard box, parcel, box, carton box, cardboard box, brochure, plastic box, flyers, etc. may be used interchangeably. The present disclosure may use the term package as a representative term for the above group as well as variants thereof.

In the process of constructing a package, it is well known in the art that as a preliminary requirement, a pre-treated cardboard and/or paper based material should be purchased or prepared. The paper based material may be constructed in a variety of forms and using a variety of different types of materials as well as combinations material types. For example, the material types may include, but are not limited to: waxed paper, cartridge paper, art paper, as well as other materials. Henceforth, throughout the description, drawings and claims of the present disclosure, the terms cardboard, card-stock, display board, corrugated fiberboard, paperboards of different paper based material, folding boxboard, carton, blanks, laminated paper, plastics sheets, any of these and other materials, may be used interchangeably and, the various embodiments as well as anticipated variants thereof may operate on any of these materials as well as combinations of these materials and other materials. Thus, while the present disclosure or certain embodiments may be presented as working with cardboard, this is just a representative term for the above groups well as variants thereof.

The pre-treatment of a cardboard may include one or more of the following actions: creating folding lines along the cardboard to ease and provide accurate folding of the cardboard; piercing the cardboard in different areas; creating embossment in different areas of the cardboard; cutting the raw cardboard into predefined profiles, cutting openings, slits or slots in the cardboard; a combination of two or more of the above-listed actions as well as other actions. Thus, any combination of these and other actions may also be performed. Henceforth, throughout the description, drawings and claims of the present disclosure the terms pre-folded cardboard, and pre-treated cardboard may be used interchangeably. The present disclosure may use the term pre-treated cardboard as a representative term for the above group of actions as well as combinations of these and other actions.

Some common techniques for preparing a pre-treated cardboard include the acts of placing the cardboard between dies. A few non-limiting examples of the types of dies include: a cutting-die; a creasing-die; an embossing-die; a scoring-die; a counter die; a combination of two or more of these different types of dies as well as other die types. Other examples of common techniques for preparing a pre-treated cardboard may include using light sources, such as, but not limited to laser-beams. For example, some common laser-beam based techniques may employ the use of $CO_2$, YAG or fiber lasers. A typical range of wavelength utilized in such laser-beam based techniques may be between 0.35 to 12.0 micrometers, (10.6 μm for $CO_2$, for example). A typical range of wavelength for a fiber laser based technique may be between 1-2 micro-meters. The laser-beam power may be in the range of a few tens of milliwatts to several hundred watts. A laser-beam source may deliver between 100 to 500 watts, and be used for pre-treating cardboard having widths of 0.2 to 9 mm, for example.

Examples of actions performed with laser-beam based pre-treatment of a cardboard may include: cutting, creasing, embossing, piercing, as well as a combination of two or more of these actions as well as other actions. Henceforth, throughout the description, drawings and claims of the present disclosure, the term laser-beam may be used as a representative term for a variety of light sources pre-treating a cardboard and the like.

When using a laser-beam for pre-treating a cardboard, a laser-beam scanning system (scanners) may be used. Laser-beam scanning may be a controlled deflection of the laser-beam, visible or invisible, by one or more moveable light reflecting planes.

SUMMARY OF THE DISCLOSURE

The present disclosure presents various embodiments of systems, devices and methods for processing of cardboard items in systems that employ the use of LB scanners. Although the various embodiments are presented as being applicable for cardboard handling systems, it should be appreciated that the various inventive techniques and systems may equally be applied in other settings in which media or other items are pre-treated at least partially but the use of an LB scanner. In general, the various embodiments include the ability to dynamically adjust the operation of one or more LB scanners operating within the cardboard handling system such that the throughput of the system is optimized.

More particularly, one embodiment includes a system and method of a dynamic, multiple scanner system (DMSS) that can be automatically and dynamically adjusted to modify the throughput of the method and system for each job and/or for each cardboard to be pre-treated. Embodiments may employ the use of two or more LB scanners while the cardboard is conveyed at a substantially constant velocity through the system. Advantageously, the ability to maintain a substantially constant velocity can allow for reducing the complexity of the mechanics of the cardboard handling system as having to vary the velocity can require expensive and complex components. In various embodiments, the DMSS may automatically and dynamically define or adjust areas of responsibility for each of the LB scanners. This may be performed on a per job basis and/or on a per cardboard basis. Further, in various embodiments, the DMSS may automatically and dynamically make adjustments such that an overlap occurs in the areas of responsibility of two or more LB scanners thus allowing multiple LB scanners to work on complicated areas. Further, the DMSS may automatically and dynamically plan and change the order, method and/or algorithm of the pre-treatment actions performed in the pre-treatment of a cardboard according to the dynamic change of the areas of responsibility of one or more LB scanners, and/or vice versa.

In addition, in various embodiments the DMSS may automatically and dynamically change the defined time slot to pre-treat different divisions or areas of a cardboard. Some embodiments of a DMSS may automatically and dynamically change the size of one or more divisions. In various embodiments, an algorithm may be employed for the pre-treatment of a cardboard while it is being conveyed. As a non-limiting example, the algorithm may perform the actions of: (a) theoretically dividing the cardboard into a plurality of divisions, (b) assigning two or more of the LB scanner areas of responsibility.

Even further, in various embodiments, the DMSS may automatically and dynamically change the coverage areas of one or more of the LB scanners before and/or while pre-treating a conveyed cardboard.

The present disclosure also presents various embodiments of systems, devices and methods for processing of cardboard items in various types of cardboard handling systems. Although the various embodiments are presented as being applicable for cardboard handling systems, it should be appreciated that the various inventive techniques and systems may equally be applied in other settings in which media or other items are moved through a processing system and that require a mechanism or method for handling of the media to eliminate, reduce or alleviate turbulence or movement of the media that could result in causing damage to the media. Various embodiments include a mechanism to receive and or hold an edge of the media, such as a cardboard item, and guide, pull, encourage or otherwise assist in movement of the media from its current location, to a desired location in a manner that eliminates or minimizes contact between the media and other media or a platform onto which the media is to be deposited. As such, the various embodiments present systems and methods for gripping the media, releasing of the media, identifying the timing of gripping and releasing the media, automatically adjusting components of the system to accommodate different media types and requirements, such as speed of movement, size of media etc.

More particularly, one embodiment includes a system or device for controlling the movement of a media through a media handling system. The controller includes a media receiver positioned proximate to an end point of a module in the media handling system and operative to receive a leading edge of the media as it passes the end point of the module. In addition, a controller configured to cause the media receiver to move from a first position for receiving the media, to a second position for depositing of the media at a desired location. The media receiver is configured to prevent the media from coming into contact with other media already located at the desired location until the media has arrived at the desired location. For instance, the media receiver, in cooperation with the module feeding the media, hold the media above the surface to receive the media until the media is dropped into position. As the media may be flexible, this cooperation may cause the media to form a concave like shape which further helps to reduce the turbulence as the media is released. The controller is further configured to cause the media receiver to release the media once it arrives at the desired location.

The media receiver may include a gripper that is in a first state for receiving the media, enters a second state for securing and moving the media to the desired location, and then enters a third state for releasing of the media at the desired location. The controller can determine the distance to move the receiver and the timing of the release based on the length of the media.

The embodiment may also include a stacker for receiving the media, and the controller can adjusts parameters of the stacker.

This and other embodiments, features and aspects of the adjustable-stacker are described further in conjunction with the figures and the detailed description following.

Unless otherwise defined, all technical and/or scientific terms used herein have the same meaning as commonly understood by one of ordinary skill in the art to which the disclosure pertains. In case there is a conflict in the definition or meaning of a term, it is intended that the definitions presented within this specification are to be controlling. In addition, the materials, methods, and examples that are presented throughout the description are illustrative only and are not necessarily intended to be limiting.

Reference in the specification to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily referring to the same embodiment or all embodiments.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof and with or without employment of an operating system. Software may be embodied on a computer readable medium such as a read/write hard disc, CDROM, Flash memory, ROM, etc. In order to execute a certain task, a software program may be loaded into or accessed by an appropriate processor as needed.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific embodiments are described in detail to illustrate the inventive concepts to a person of ordinary skill in the art, such embodiments are susceptible to various modifications and alternative forms. Accordingly, the figures and written description are not intended to limit the scope of the inventive concepts in any manner.

In some embodiments the pretreated-cardboard stripper system, apparatus and method may be implemented as part of a pre-treating cardboard systems, for instance. Pre-treating cardboard systems such as but not limited to: common steel-rule die industry, surface-adhesive-rule technology (SART), laser industry, a combination of them and so no. In other embodiments the pretreated-cardboard stripper may be a standalone system.

More information on surface-adhesive-rule technology (SART) may be found in related U.S. application Ser. No. 13/108,389, bearing the title of "Method and system for surface adhesive rule technology" which application is incorporated by reference for all purposes as if fully set forth herein.

Some embodiments of a vacuum sorter may include a vacuum chamber with openings along its surface (or on part of its surface); and a peeler. A pre-treated cardboard, after been pretreated, may lay on top and along part of the surface of the vacuum chamber.

The peeler may then transfer part of the pre-treated cardboard away from the surface of the vacuum chamber.

The peeler may hold (by grippers, for example) the pre-treated cardboard by one or more of the pre-treated cardboard's sections and/or joints and/or boarder. The waste of the cardboard (areas between the sections and joints) may be coupled to the vacuum chamber surface while the pre-treated cardboard is been transferred by the peeler along and/or away from the surface of the vacuum chamber. Advantageously disconnecting and thus sorting the waste from the sections.

The waste may then be removed from the surface of the chamber in different techniques. Example of techniques may be: brushing of the waste (while vacuum is turned off or left working); the vacuum chamber may be a drum or a belt mechanism that may pivot around an axis thus stopping the vacuum and pivoting may utilize gravitation and waste may fall; or having some areas of the drum/belt go over an area with no vacuum and utilizing gravitation or brush etc.; and so on.

In another embodiment the peeler grabs the waste and peels away from the vacuum surface, thus sorting and leaving the sections on the vacuum chamber surface. The sections may then be removed by techniques similar to the above described techniques for removing the waste.

The pretreated-cardboard stripper may further include a controller, the controller may synchronizing between the peeler and the pretreated cardboard sections/boarders/waste along the vacuum chamber surface; between the motion of the peeler and the motion of the conveyor; and so on. Synchronization may utilize information gotten from sensors, from encoders, etc.

Another embodiment of a pre-treated-cardboard stripper may include: a cutting mechanism that cuts (by laser, for instance) along the borders of the sections, joint and/or borders of a pretreated cardboard while the pre-treated cardboard lays on a surface of a vacuum chamber. After cutting the surrounding of the sections and joints has been completed a peeler may get the pretreated cardboard by one of one or more of the pre-treated cardboard's sections and/or joints and/or boarder and transfer the pre-treated cardboard's away from the surface of the vacuum chamber. Advantageously disconnecting and thus sorting the waste from the sections. The waste attached to the vacuum surface may be removed in similar ways described above.

In other embodiments the sections may be cut all around their boarder, meaning no joints between them. The peeler may hold the pre-treated cardboards surrounding and transfer away from the vacuum chamber, thus leaving only the sections on the vacuum chamber's surface, advantageously sorting the waste from the sections.

The sections may then be removed from the surface of the vacuum chamber. The remove may be done by different. Techniques such as, but not limited to: brushing of the sections (while vacuum is turned off or left working); the vacuum chamber may be a drum or a belt mechanism that may pivot around an axis thus stopping the vacuum and pivoting may utilize gravitation and sections may fall into a collector; or having some areas of the drum/belt go over an area with no vacuum and utilizing gravitation or brush etc.; and so on.

Yet another embodiment of a pre-treated-cardboard stripper may include a selective mask sorter. A selective mask sorter may include a selective mask may be made (from plastic, cardboard, paper, etc), and a vacuum chamber with openings along its surface. The selective mask may be made to have a plurality of openings in substantially similar size and place to the sections with and/or without their joints on a pre-treated cardboard, for example. The openings of the selective mask may be done by dies, and/or laser, etc.

The selective mask may be associated to and along the surface of the vacuum chamber. The association may be by grippers, or vacuum, for example. The vacuum chamber may be a drum or a belt pivoting around one or more axis, for instance.

The pretreated-cardboard stripper may further include a controller, the controller may synchronizing an arrival of a pre-treated cardboard after it has been cut around the sections and joints to the surface of the vacuum chamber with the selective mask on top of it.

The controller may synchronize such that the pre-treated cardboard may be placed on top of the selective mask in a way that the sections and joints are placed substantially on the areas of the openings the selective mask. Synchronization may utilize information gotten from sensors, from encoders, etc.

Advantageously, when the vacuum chamber pivots then gravitation may cause the waste to fall to a waste-collector and the sections and joints stay attached to the vacuum chamber surface.

The sections and their joints may be removed from the vacuum chamber in different techniques. Example of techniques may be: peeled from the vacuum chamber via a peeler (gripper, for instance; stopping the vacuum; etc.). The peeler may hold an area (one of the joints, sections, boarder, etc.) that is not attached by vacuum (an area left un-cut in the selective mask), for example.

In other embodiments the selective mask may be a negative to the sections and their joints. Thus the sections and their joint may fall from the vacuum chamber (by gravitation, for example) to a collector and the waste may stay on the surface of the vacuum chamber, and so on.

In some of the embodiments the cutting around the surrounding of the sections and joints may be made on the vacuum chamber, via laser for example.

A yet other embodiment of pretreated-cardboard stripper may include an electrostatic selective mechanism. The electrostatic selective mechanism may include a drum or belt pivoting around one or more axis. The surface of the drum or belt may be coated with coating that hold electrostatic charge when in the dark, and conduct away such a charge when under light (amorphous selenium, ceramic or organic photo-conductors, for instance).

The coated surface may be charged in high voltage (a few thousand volts, for instance). A light source may discharge certain areas along the surface. The light may be laser for example. The areas discharge may be a negative image of the pretreated cardboard's sections with/without their joints. The pre-treated cardboard may be charged as well.

Next a controller may synchronize the arrival of a pre-treated cardboard after it has been cut around the sections and joints to the surface of the electrostatic selective mechanism.

The synchronization may be such that the charged pre-treated cardboard's edge may be attached to the coated drums/belt surface to an area charged, in a way that pulls the pre-treated cardboard toward and along the surface of the drum/belt.

The controller may synchronize such that the pre-treated cardboard may be placed on top of the drum/belt in a way that the sections and joints are placed substantially on the areas charged. Synchronization may utilize information gotten from sensors, from encoders, etc.

Advantageously when the drum/belt pivots than gravitation may cause the waste to fall to a waste-collector and the sections with/without their joints stay attached to the surface of the drum/belt.

The sections with/without joints their joints may be removed from the surface in different techniques. Example of techniques may be: peeled via a peeler (gripper, for instance; stopping the vacuum; etc.). The peeler may hold an area (one of the joints, sections, boarder, etc.) that is not charged (an area left partially uncharged on the surface), for example.

In other embodiments the areas discharge on the surface of the drum/belt may be a negative of the pretreated cardboard's sections and joints, or just sections. Thus the sections and their joint may fall from the drum/belt's surface (by gravitation, for example) to a collector and the waste may stay on the surface of the vacuum chamber, and so on.

This and other embodiments, features and aspects of the adjustable-stacker are described further in conjunction with the figures and the detailed description following.

Unless otherwise defined, all technical and/or scientific terms used herein have the same meaning as commonly understood by one of ordinary skill in the art to which the disclosure pertains. In case there is a conflict in the definition or meaning of a term, it is intended that the definitions presented within this specification are to be controlling. In addition, the materials, methods, and examples that are presented throughout the description are illustrative only and are not necessarily intended to be limiting.

Reference in the specification to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily referring to the same embodiment or all embodiments.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof and with or without employment of an operating system. Software may be embodied on a computer readable medium such as a read/write hard disc, CDROM, Flash memory, ROM, etc. In order to execute a certain task, a software program may be loaded into or accessed by an appropriate processor as needed.

These and other aspects of the disclosure will be apparent in view of the attached figures and detailed description. The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific embodiments are described in detail to illustrate the inventive concepts to a person of ordinary skill in the art, such embodiments are susceptible to various modifications and alternative forms. Accordingly, the figures and written description are not intended to limit the scope of the inventive concepts in any manner.

BRIEF DESCRIPTION OF THE DRAWINGS

Exemplary embodiments of the present disclosure will be understood and appreciated more fully from the following detailed description, taken in conjunction with the drawings in which.

DETAILED DESCRIPTION OF EXEMPLARY EMBODIMENTS

Turning now to the figures in which like numerals and/or labels may represent like elements throughout the several views, exemplary embodiments of the present disclosure are described. For convenience, only some elements of the same group may be labeled with numerals. The purpose of the drawings is to describe exemplary embodiments and is not for production purpose. Therefore features shown in the figures are for illustration purposes only and are not necessarily drawn to-scale and were chosen only for convenience and clarity of presentation.

It will be appreciated by one of ordinary skill in the art that the incorporation of LB scanners into a pre-treatment process can impose restrictions on the throughput capacity of a cardboard handling system. Unlike the use of dies, the use of a LB scanner may require additional time and/or passes over a cardboard in order to fully achieve the desired pre-treatment. As a result, the movement of the cardboards through the system can be delayed while the LB scanner is performing the pre-treatment actions.

Many advantages can be realized in the use of LB scanners in a cardboard handling system. For instance, the ability to control the movement of a LB by software and/or hardware based controllers allows a cardboard handling system to by dynamically adjusted by a controller rather than having to disassemble, adjust and modify the cardboard handling system.

Figure 1A:
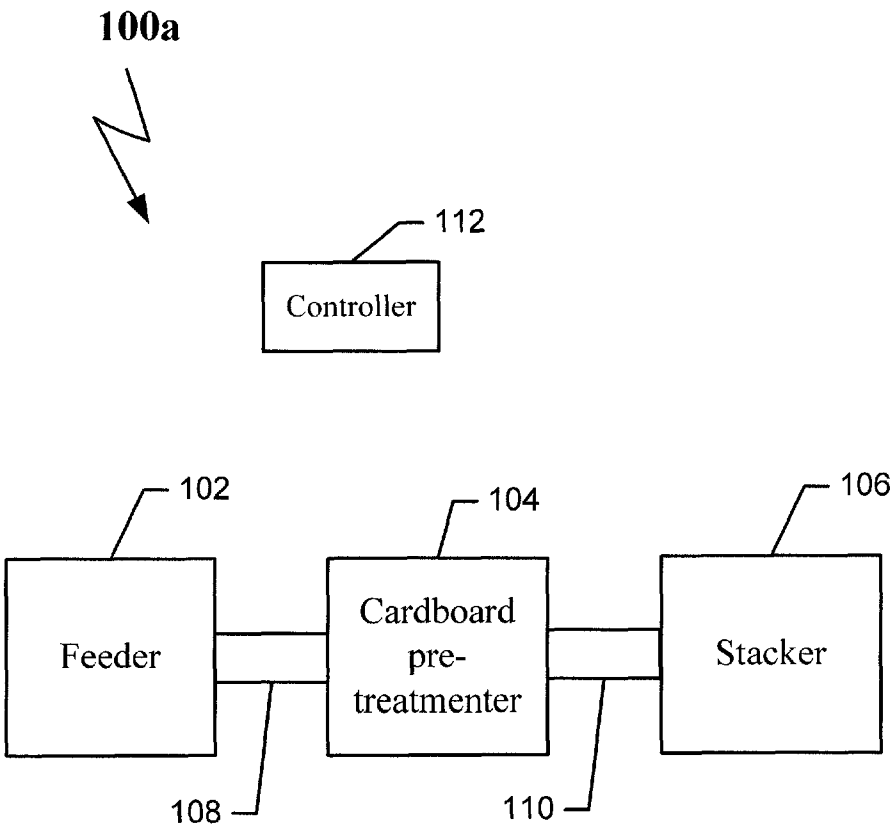
FIG. 1*a* is a block diagram illustrating relative components of a portion of an exemplary cardboard-processing system.

FIG. 1A is a block diagram illustrating relative components of a portion of an exemplary cardboard-processing system 100*a*. The illustrated embodiment of the cardboard-processing system 100*a* may include, but is not limited to, a feeder 102, a cardboard pre-treatmenter 104, a stacker 106, a controller 112, and one or more conveyors 108 and 110.

The feeder 102 may receive, retrieve or otherwise obtain a cardboard and feed it toward a conveyor 108. The conveyor 108 may convey the cardboard toward the cardboard pre-treatmenter 104. The cardboard pre-treatmenter 104 may then perform one or more pre-treatments to the cardboard such as: creasing, cutting, embossing, piercing, printing, imaging, as well as a combination of two or more of these actions as well as other treatments. Once the pre-treatment is completed, the conveyor 110 may convey the pre-treated cardboard toward the stacker 106.

The stacker 106 may stack the pre-treated cardboards into a pile. In some embodiments, the stacker may comprise the conveyor 110. The controller 112 may control and/or synchronize the operation of one or more of the modules of the cardboard-processing system 100*a*. It should be appreciated that the illustrated modules in the cardboard processing system 100*a*, as well as in any other of the illustrated embodiments in this disclosure, is just one example of a workable configuration. The modules are provided to delineate and illustrate functionality and may not necessarily be required to exist as separate physical components. For instance, two or more of the illustrated modules may be combined into a single module, as well as other configurations. Likewise, functionality from one module can be spread across multiple physical modules. Further, other embodiments of a cardboard-processing system may include other modules.

Figure 1B:
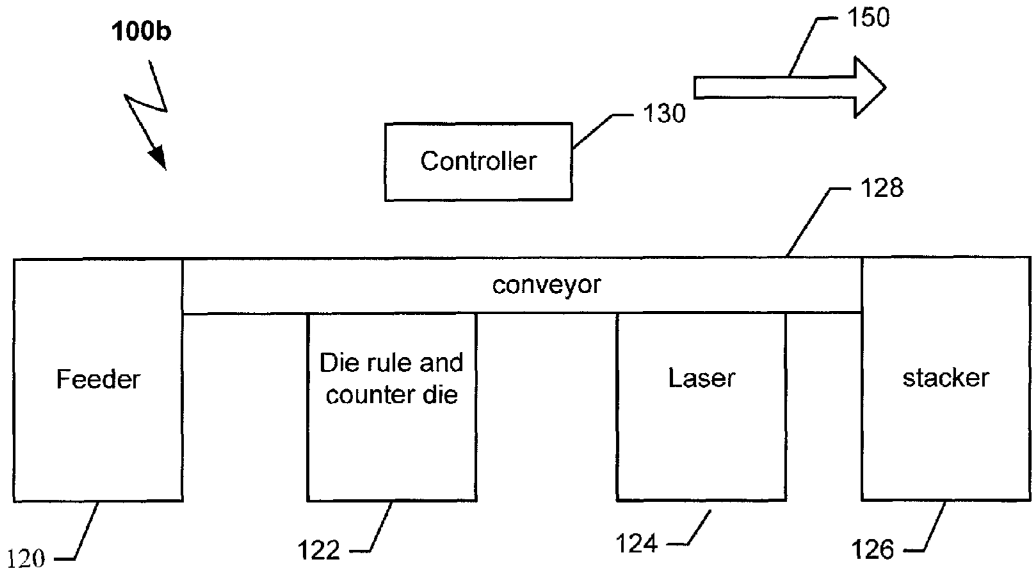
FIG. 1*b* is a block diagram illustrating relevant elements of another exemplary embodiment of a cardboard-processing system.

FIG. 1B is a block diagram illustrating relevant elements of another exemplary embodiment of a cardboard-processing system 100*b*. The illustrated cardboard-processing system 100*b* is shown as including a feeder 120, a die-rule and counter-die 122, a laser 124, a stacker 126, a controller 130, and a conveyor 128. Arrow 150 represents the flow-direction of cardboard items being passed through the cardboard-processing system.

The feeder 120 may receive, retrieve or otherwise obtain a cardboard and transmit it toward the conveyor 128. The conveyor 128 may convey the cardboard toward and/or through the die-rule and counter-die 122. The die-rule and counter-die 122 may pre-treat the cardboard.

The one or more die rules and counter dies 122 may include: a steel-rule die industry, and/or surface-adhesive-rule technology (SART), laser-beam industry, a combination of these, as well as others.

The conveyor 128 may then convey the pre-treated cardboard toward the laser 124 to be further pre-treated. The laser may operate to provide additional pre-treatment actions to the cardboard. The conveyor 128 may then convey the pre-treated cardboard toward the stacker 126. The stacker 126 may stack the pre-treated cardboard into a pile. The controller 130 may synchronize and control one or more of the modules of the cardboard-processing system 100*b*.

The controller 130 may obtain inputs from different sensors along the cardboard-processing system 100*b*, and accordingly send commands to one or more modules. A few non-limiting examples of the types of commands that the controller 130 may send to a module include commands to: adjust the velocity of the conveyor, start/stop operation, hold/release cardboard, forward/reverse the cardboard feed, accelerate/decelerate movement; as well as a combination of two or more of these commands and/or other commands. In some embodiments, the controller may obtain information from an operator and/or relevant computer files and job descriptions. Computer files can supported in a variety of formats and a few non-limiting examples include DXF and PDF.

Other examples of cardboard-processing systems may comprise other modules, more of the same modules, only some of the described modules, and so on.

More information on embodiments of cardboard-processing systems may be found in U.S. patent application Ser. No. 13/684,196 bearing the title "Cardboard-handling system and method", and in PCT patent application no. PCT/IL2012/000377, bearing the title of "Cardboard-handling system and method" both of which are incorporated for all purposes as if fully disclosed herein.

Other systems and/or modules that may be part of a cardboard-processing system and/or similar to the cardboard-processing system may comprise: coating systems (lamination coating, for instance); selective coating systems, printing systems, preprint systems, post-print systems; finishing systems; as well as other modules or systems and/or combinations of such modules or systems.

Figure 1C:
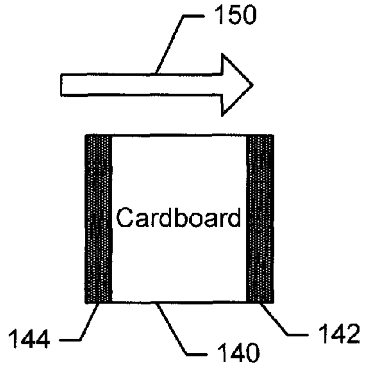
FIG. 1*c* is a conceptual drawing illustrating relevant elements of an example of a cardboard.

FIG. 1C is a conceptual drawing illustrating relevant elements of an example of a cardboard 140. Arrow 150 represents the machine-direction of a cardboard-processing system in which cardboard 140 is passed and pre-treated. The leading edge 142 of the cardboard 140 is the edge to first pass the through the machine, in reference to machine-direction 150. The trailing edge 144 of the cardboard 140 is the edge last to pass through the machine, in reference to machine-direction 150.

Figure 2A:
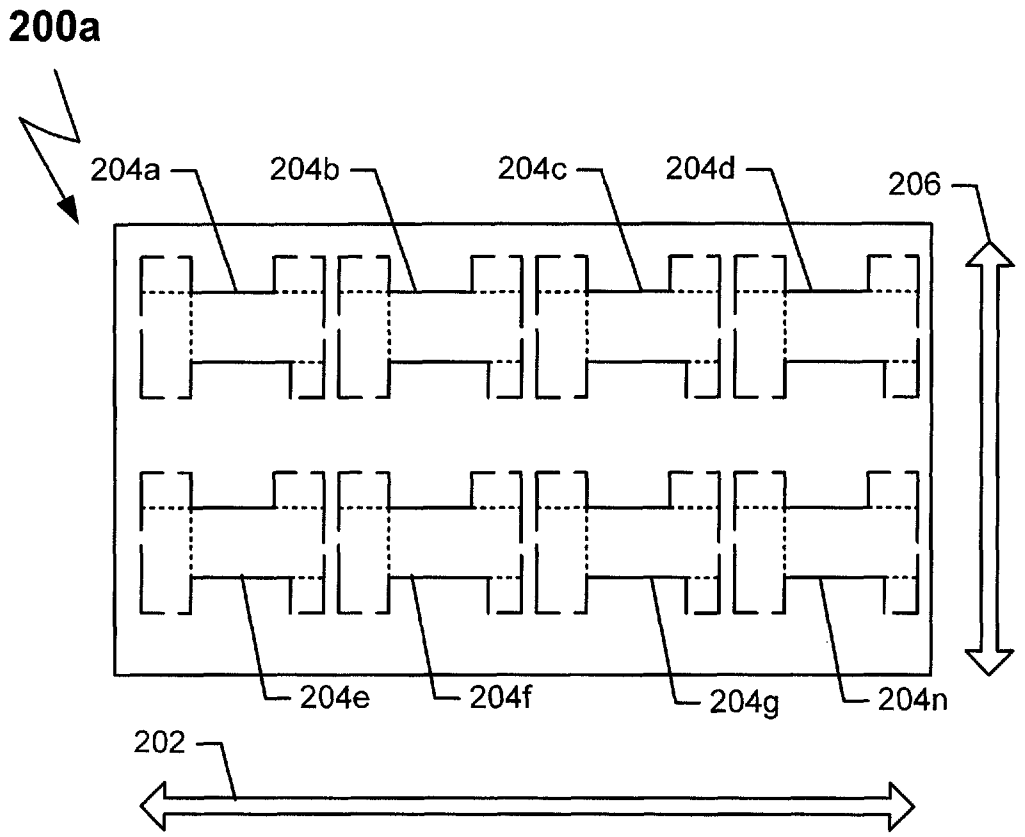
FIG. 2*a* schematically illustrates a simplified example of a design of a pretreated cardboard.

FIG. 2A schematically illustrates a simplified example of a design of a pretreated cardboard 200*a*. The pre-treated cardboard 200*a* may comprise a plurality of sections 204*a-n*. Each section 204*a-n* may represent: a package layout; a printed image; a laminated area, a processed area; as well as other configurations and/or a combination of two or more configurations. Henceforth throughout the description drawing and claims of the present disclosure the word 'section' may be used as a representative term for the above group and the like.

The operations and treatments, as well as settings and parameters of such that are applied to pre-treated cardboards 200*a* may vary between jobs. The parameters may include, but are not limited to: width 206, length 202, type of material, thickness (not shown in drawing), etc. Furthermore, each job may differ from another job in a variety of manners, such as the layout of the sections, the number of sections 204*a-n*, layout of the sections, the actions applied to the sections, the sections themselves, as non-limiting examples.

Figure 2B:
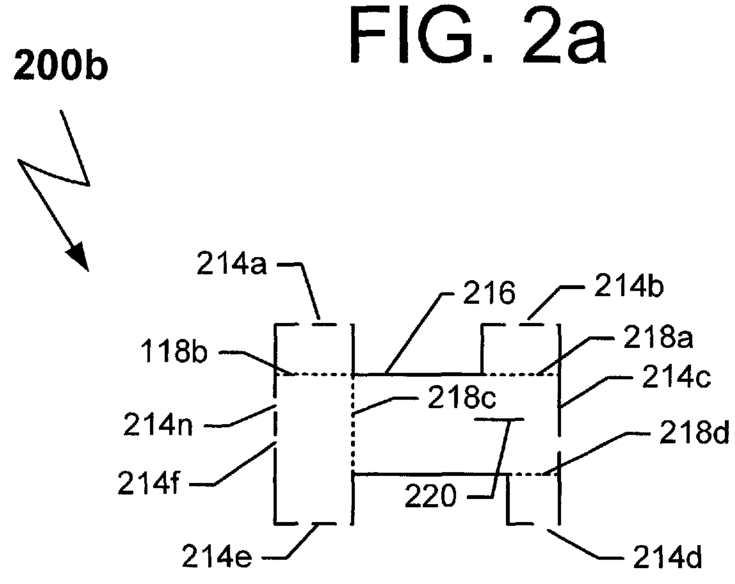
FIG. 2*b* schematically illustrates a simplified example of a section of the pretreated cardboard illustrated in FIG. 2*a*.

FIG. 2B schematically illustrates a simplified example of a section of the cardboard illustrated in FIG. 2A. The illustrated section 200*b* of cardboard 200*a* may be a package layout as a non-limiting example. The package layout 200*b* may comprise a plurality of creases 218*a-d*, which creases may operate to ease future folding of the cardboard at required places. The package layout's 200*b* surrounding may be an un-continuous cut line 216 comprising a plurality of joints 214*a-n* (un-cut areas in rib liked shapes, for instance). The joints 214*a-n* may be used to keep the package layout 200*b* connected to a pre-treated cardboard from which it is created. The section may also include cuts in the package layout, such as cut 220.

The throughput of a cardboard-processing system is an important aspect of a cardboard processing system. The throughput of a cardboard-processing system may be defined as the amount of cardboards it is able to pre-treat over a defined period of time (such as 1500 cardboards per hour, for example). The throughput of the cardboard-processing system has an effect on the economic-value of the system and may determine whether that system will be purchased/used in particular applications. Common cardboard handling systems for pre-treating cardboards typically require expensive and complex mechanics and electronics to provide the capabilities for acceleration, stopping, decelerating etc., while processing the cardboards through the different modules of the system.

In typical cardboard-processing systems for pre-treating cardboards, if a laser-beam (LB) scanner is one of the systems modules used for pre-treating the cardboards, the LB scanner may slow down the throughput of the cardboard-processing system and thus, may be a bottle neck in the productivity of a system, such as the cardboard-processing system similar to the cardboard-system 100*b* described in conjunction with FIG. IB.

Unlike die-cuts/die-creases that can operate to create a required layout in a single stroke (even for complex layouts) and in a plurality of sections on a cardboard (cardboard 200*a* in FIG. 2*a*, for example), a laser-beam (LB) scanner may require more time as it may need to go over each specific area that requires laser treatment. The power of a laser-beam hitting a certain area may decrease when the laser-beam is deflected in certain angles. Due to this phenomenon, additional dwell time may be required at those specific areas to create the required pre-treatment (cut, crease, pierce, etc.). This is even more so required if the laser power is already near the maximum power value. The additional dwell time required to perform these pre-treatments with an LB may slow down the system. When working near the maximum power strength of a laser, the LB scanner coverage area in which the LB can be steered for pre-treatment of a cardboard may be limited. More particularly, the coverage area of the LB scanner is a function of the scanner's field of view angle and the distance from object. The field of view of a scanner may be a function of mechanical limitations together with velocity requirements; placement of LB source in relation to the scanner's reflecting plane, the laser power, as well as other factors. In addition, the LB scanner itself may have limitations that may further slow down the production of a cardboard handling system. A few non-limiting examples of such limitations may include: the maximum coverage area; the maximum power specification; the mechanical limitation of the scanning system; and the mirror diameters. Mechanical limitations of the scanning system may be due to the placement of the LB scanner in the cardboard-processing system, the velocity of the different motors driving the various elements of the LB scanner, the precision of the LB scanner, the delay time when adjusting one or more reflector plans from one angle to another, as well as other limitations and/or combinations of any of these limitations.

Figure 3A:
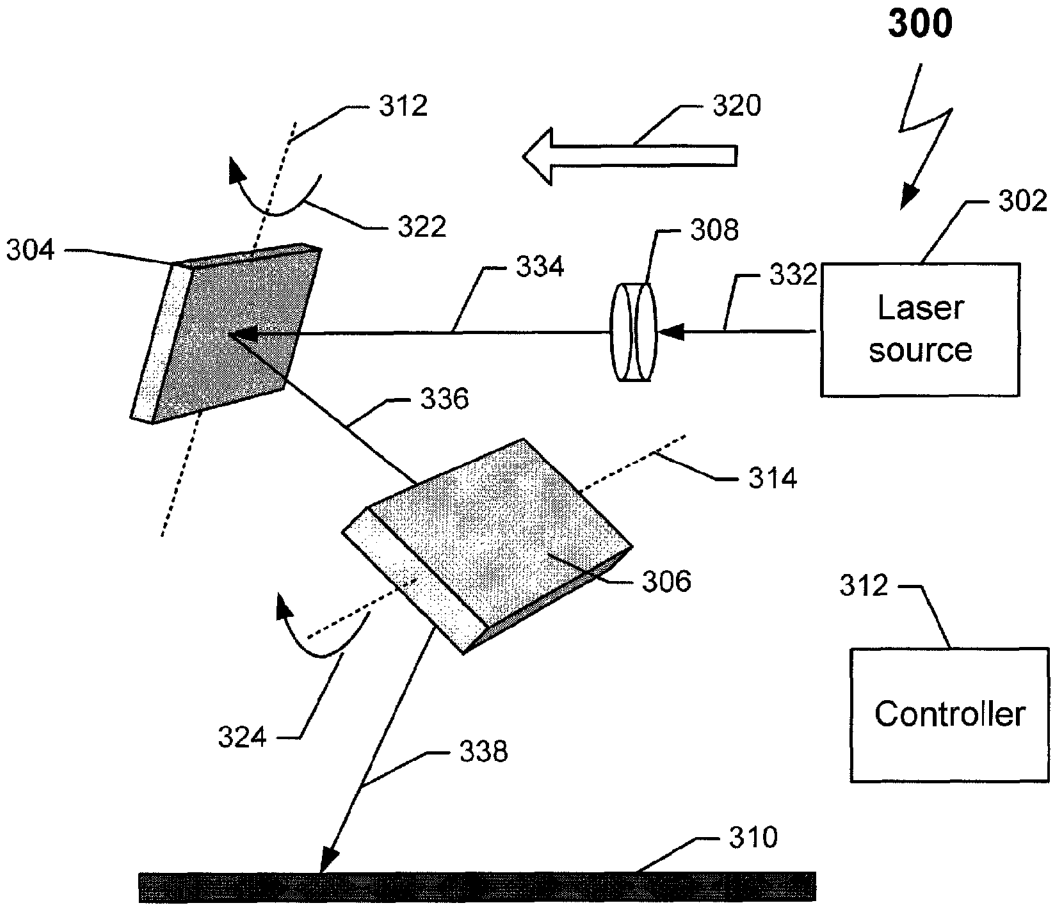
FIG. 3*a* is a schematic diagram illustrating a simplified block diagram with relevant elements of an exemplary laser scanning system (scanner).

Furthermore, in cardboard-processing systems in which the cardboard is in motion in one direction (machine direction, for example) while being pre-treated by the LB, there may a requirement of a pre-defined plan on the pre-treatment of the cardboard, in order not to miss any area that needs to be pre-treated by the LB. For each job, the pre-defined plan may need to be defined before the pre-treatment. Thus, the slowest area to be pre-treated in a cardboard may define the throughput for the whole system. FIG. 3A is a schematic diagram illustrating a simplified block diagram with relevant elements of an exemplary laser scanning system (scanner) 300. The scanner 300 may include: a laser-beam source 302 that may emit a laser-beam 332 and one or more moveable light reflecting planes 304 and 306 that may reflect and steer reflections (336 and 338) of the emitted laser-beam 332 toward one or more cardboards 310 or surfaces of one or more cardboards.

Some embodiments of a scanner 300 may require moving and positioning the focus of the laser-beam in three dimensions. This may be achieved by a servo-controlled lens 308, usually called a 'focus shifter' or 'z-shifter' for example. In some embodiments, the lens 308 may be placed between the emitted laser-beam and the reflecting plane 304. The lens 308 may move in direction similar or opposite to direction of arrow 320. In other embodiments the lens 308 may be placed between the reflecting plane 306 and the cardboard 310, between the reflecting plane 304 and the reflecting plane 306, and so on. Some embodiments may utilize multiple lenses as well.

The moveable light reflecting planes 304 may be provided through employment of: a mirror; a prism; an array of polygon mirrors; as well as other similarly suitable objects. In various embodiments, the reflected laser-beam may be steered in one, two or three dimensions. When steering the laser-beam, the reflecting planes 304 and/or 306 may be moved in a periodic motion, such as a step function, and/or in a continuous motion.

Some scanners 300 may utilize a rotary encoder (not shown in the drawing) and control electronics (not shown in the drawing) to move or position the light reflecting planes 304 and 306 to a required position and/or angle at a required velocity. The encoder and control electronics can provide a suitable electrical current to a motor or to a galvanometer for a desired angle or phase. Other embodiments may utilize piezoelectric actuators, or magnetostrictive actuator, or a combination of these as well as other options.

The scanner 300 may include or be associated with a controller 312. The controller 312 may control different modules of the scanner 300. Modules such as, but not limited to: the reflecting planes 304 and 306, the encoder, the control electronics, and so on.

In some embodiments, the scanner 300 may move and position a reflected laser-beam 334 in two dimensions. The scanner 300 may rotate the reflecting plane 304 around an axis 312 in the directions indicated by arrow 322, wherein axis 312 may be along the center of the length of the reflecting plane 304. Further, the scanner 300 may rotate the reflecting plane 306 around an axis 314 in the directions indicated by arrow 324, wherein axis 314 may be along the center of the width of the reflecting plane 306.

The emitted laser-beam 332 may be passed through the lens 308 to change the focus of the laser-beam. The focused laser-beam 334 may then be reflected and steered by reflecting plane 304 to create reflected laser-beam 336. Next the reflected laser-beam 336 may be reflected and steered again by reflecting plane 306 to create re-reflected laser-beam 338 which is guided toward the cardboard 310. The re-reflected laser-beam 338 may then strike the cardboard 310 to treat the cardboard 310 by cutting, piercing, creasing, or performing other actions as indicated above. The treatment of cardboard 310 may be performed in accordance with a job description. The controller 312 may determine and control the power level of the emitted laser-beam 332 according to different criteria, such as, but not limited to: the angle of the laser-beam when hitting a certain point in the cardboard, the required treatment (cut or crease, for example) the required velocity of the treatment, and so on. The source for the laser-beams 302 may adjust the parameters of the emitted laser-beam based on commands received from the controller 312.

It will be appreciated by one of ordinary skill in the art that although the configuration illustrated in FIG. 3A presents two reflecting planes, other embodiments may reflect the laser-beam with only one reflecting plane while other embodiments may utilize more than two reflecting planes. Some laser-beam scanners further allow changing the intensity of the laser-beam for different actions or desired results. By varying the intensity or power of the laser-beam, the influence of the laser-beam on a working piece can be modified. As a non-limiting example, if the power is increased to a sufficient level, the laser-beam can operate to completely remove a material. Advantageously cutting can be performed by the laser-beam when operated at a sufficient power level. Further, the power of the laser-beam can be lowered if it is desired to only score or remove only a partial surface.

Figure 4A:
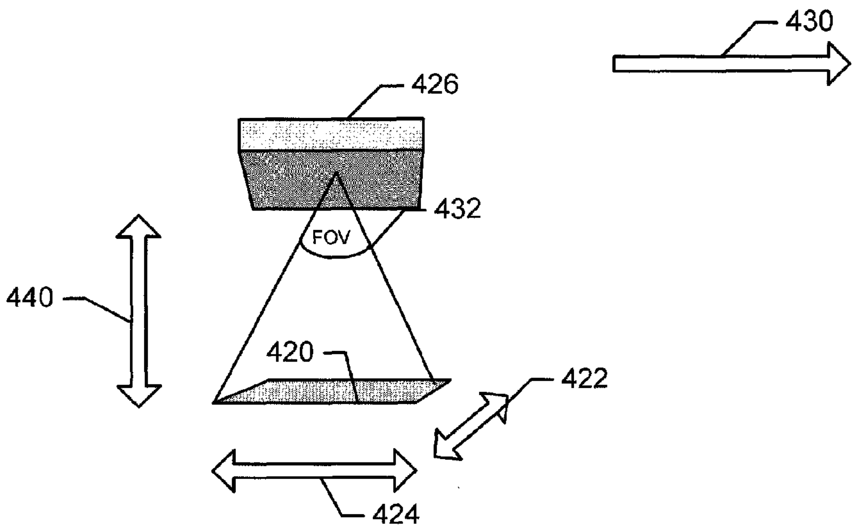
FIG. 4*a* schematically illustrates a portion of a simplified block diagram with relevant elements of an exemplary scanner coverage area.

FIG. 4A schematically illustrates a portion of a simplified block diagram with relevant elements of an example of a maximum coverage area 420 of a LB scanner 426, wherein the coverage area is a function of the field of view 432 angle and the distance 440 from the scanned object. The field of view of a scanner may be a function of mechanical limits together with velocity requirements placement of laser-beam source in relation to the scanner's reflecting plan, and laser power.

Figure 4B:
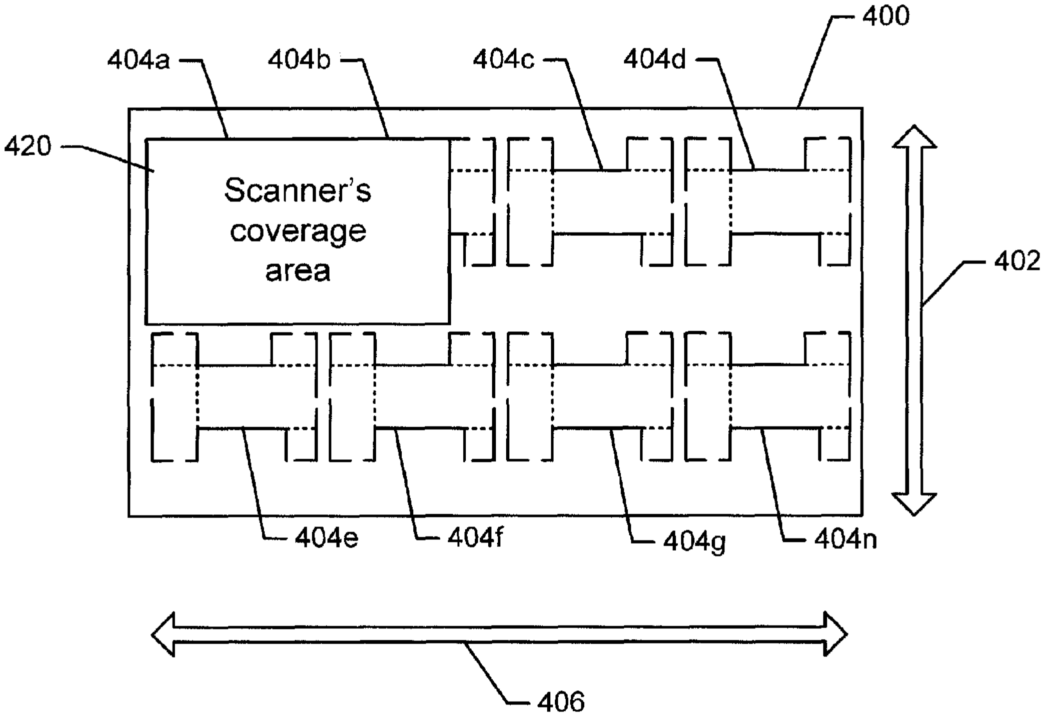
FIG. 4*b* is a conceptual drawing illustrating the maximum coverage area of an exemplary LB scanner.

FIG. 4B schematically illustrates a portion of a simplified block diagram with relevant elements of an exemplary pre-treated cardboard 400 The pre-treated cardboard 400 may include a plurality of pre-treated sections 404*a-n*. Some of the pre-treated sections 404*a-n* (or part of a section) may be created by the LB while the cardboard 400 is been conveyed in constant velocity in a direction similar to arrow 430 (machine direction that the laser is part of).

The cardboard 400 being pre-treated by an LB scanner may have dimensions larger than the LB scanner maximum coverage area. In some embodiments, the length 406 of the pre-treated cardboard 400 may be greater than the length 424 of the LB scanner maximum coverage area 420. In other embodiments, the width 402 of the pre-treated cardboard 400 may be greater than the width 422 of the LB scanner maximum coverage area 420. In yet other embodiments, both dimensions (402 and 406) of the pre-treated cardboard 400 may be greater than both dimensions (422 and 424) of the maximum coverage area 420 of the LB scanner.

Because a cardboard may have a predefined length and width, and a predefined layout comprising a plurality of a pre-treated sections, if only one LB scanner is used, then the throughput of the system may be greatly diminished. In some embodiments, the system may be required to accelerate and decelerate the cardboard. Such a requirement can result in a complex and expensive system.

The present disclosure presents embodiments of, among other things, a novel system and method of a dynamic, multiple scanner system that can be automatically and dynamically adjustable adjusted to modify the throughput of the method and system for each job and/or for each cardboard to be pre-treated. The dynamic, multiple scanner system (DMSS) includes pre-treating a cardboard with two or more LB scanners while the cardboard is been conveyed in the machine direction from one place to another in a substantially constant velocity between and through the majority of the different modules of the cardboard-processing system. Advantageously, the substantially constant velocity of conveying the cardboard may result in reducing the complexity of the mechanics of the cardboard handling system. Such complexity reductions may be realized because there may be no need for extreme acceleration, stopping deceleration and other actions. Thus, less expensive mechanisms may be used to control the movement of the cardboard. As non-limiting examples, less precise sensors, actuators with lower torque or strength may be employed.

In some embodiments, the DMSS may automatically and dynamically define, on a per job basis and/or on a per cardboard basis, areas of responsibility for one or more of the LB scanners. The area of responsibility of an LB scanner may be an area of a cardboard for which the LB scanner is responsible for pre-treatment of the cardboard. The responsibility area of a scanner may be smaller or similar to the maximum coverage area that scanner can cover, wherein coverage area is a function of the scanner's field of view angle and distance from cardboard been pre-treated, laser power, velocity requirements, and/or placement of laser beam.

In some embodiments, the DMSS may automatically and dynamically make adjustments such that an overlap occurs in the areas of responsibility of two or more LB scanners. The DMSS may automatically and dynamically define and change the areas of responsibility of one or more of the LB scanners according to different criteria. The automatic and dynamic changing of the areas of responsibility may be performed on a per job basis, and/or per cardboard being pre-treated basis, and/or during the pre-treatment of a cardboard.

When performing pre-treatment of cardboard areas in which the required layout of pre-treatment is complex, the DMSS may automatically and dynamically assign two or more LB scanners to pre-treat that area instead of it being pretreated by only one LB scanner. Advantageously, this capability may increase the throughput of the DMSS and/or improve the pre-treatment of a cardboard. After that area has been substantially pre-treated, the DMSS may automatically and dynamically re-define the areas of responsibilities for the different LB scanners. Thus, the different LB scanners can be utilized in a dynamic manner according to the specific layout of the cardboard being pre-treated.

Further, the DMSS may automatically and dynamically plan and change the order, method and/or algorithm of the pre-treatment actions performed in the pre-treatment of a cardboard according to the dynamic change of the areas of responsibility of one or more LB scanners, and/or vice versa.

As non-limiting examples of embodiments of a DMSS system and method, a cardboard that needs to be pre-treated by the DMSS while it is being conveyed, may be theoretically divided into a plurality of divisions or areas. For instance, a pre-treated cardboard may be theoretically divided into a plurality of even and/or un-even sized divisions in various shape, such as: rectangular, circular, hexagonal, square, as well as other shapes and/or combination of two or more of any of these shapes. Each section may include a sub-layout area to be pre-treated. Throughout the description, drawings and claims, the terms 'theoretically divided' and 'divided' can be used interchangeably.

As a non-limiting example of a DMSS in which the cardboard is being conveyed in a substantially constant velocity while being pre-treated, each division may have a predefined time slot to be pre-treated by an LB scanner. The time slot may be dependent on the size of the division, for example. If the sizes of the division are substantially the same, then the slot time may be substantially the same.

The DMSS may automatically and dynamically change the defined time slot to pre-treat different divisions. The change may be made in accordance with the difference in complexity of the sub-layout to be pre-treated, for example. If the next division to be pre-treated by an LB scanner is complex, then the DMSS may dynamically allocate that division more slot time at the expense of another division's time slot which has a simpler sub-layout. Advantageously, such capabilities can result in not changing the total time the cardboard has while passing through the laser module.

As a non-limiting example of a DMSS in which the cardboard is being conveyed at a substantially constant velocity while being pre-treated, each division may begin to be pre-treated when the division reaches a pre-defined point in the coverage area of an LB scanner (substantially middle of coverage area, for example). The DMSS may automatically and dynamically change the start of the pre-treatment of a division according to the sub-layout of that division and other divisions. For example, if a particular division has a simpler sub-layout than the sub-layout of the immediately preceding division, the DMSS may delay the pre-treatment of that particular division X cm after the originally pre-defined point in the LB scanner coverage area, advantageously enabling more time and resources to be devoted to the previous, more complex division.

Some embodiments of a DMSS may automatically and dynamically change the size of one or more divisions. The change in the size may be determined in accordance with the: layout, overlap in LB scanners, the sub-layout of that division, the sub-layout of the divisions near it, as well as other criteria. As non-limiting examples, in areas of a cardboard in which the layout is simpler than other areas of that cardboard, the size of the divisions may be bigger than the size of the divisions of the complex layouts.

Each LB scanner may be responsible to pre-treat a plurality of divisions in its area of responsibility. The responsibility areas may be changed automatically and dynamically between jobs and/or between one cardboard to another, and/or during the pre-treatment of a cardboard. In some examples, the number and/or size of the divisions may be changed between jobs and/or cardboards. In some examples, they may be changed during the pre-treatment of a cardboard.

The responsibility area of an LB scanner may be determined in accordance to different criteria/needs. A few non-limiting examples of such criteria/needs are the LB scanner coverage area, the velocity of scanning, the power capabilities of the laser, the mechanical movement capabilities, the cardboard layout that needs to be pre-treated by the laser, the velocity of the cardboard being conveyed, the various parameters of the cardboard (thickness, length, width, material, texture, etc.) the method of pre-treating the cardboard, as well as other criteria/needs and/or combination of two or more of these criteria/needs.

The method for pre-treating a cardboard by the DMSS while it is being conveyed may be selected based on one or more different parameters. As a non-limiting example, the method may be selected based on the size of each area, the overlap of the LB scanner areas (coverage area and/or responsibility), the velocity of the conveyed cardboard, the required layout of the pre-treated cardboard, the time it takes to pre-treat a part of a layout, the number and sizes of divisions, etc.

In various embodiments, an algorithm may be employed for the pre-treatment of a cardboard while it is being conveyed. As a non-limiting example, the algorithm may perform the actions of: (a) theoretically dividing the cardboard into a plurality of divisions, (b) assigning two or more of the LB scanner areas of responsibility and (c) automatically adjusting the coverage area to one or more of the LB scanners. For each division to be pre-treated, pre-treatment may be delayed until the cardboard is conveyed to a point at which the middle of a division substantially coincides with the middle of the coverage area of the LB scanner. At this point the pre-treatment for that division by the LB scanner may commence.

In divisions in which the layout is complex (i.e., many crease/cuts, etc), the LB scanner may be automatically adjusted to start pre-treatment of the division before the middle of the division reaches the middle of the coverage area. Further, another LB scanner may be adjusted to perform a pre-treatment of the same division as well by automatically and dynamically changing its responsibility area. In divisions that have simple layouts to be pre-treated, the responsible LB scanner may begin pre-treatment after the division has passed a few mm from the middle of the LB coverage area—thus enabling that LB scanner to work on other divisions before pre-treating this particular division. Thus the above automatic change of responsibilities and/or timing of pre-treatment of divisions are dynamically performed in accordance with the layout and/or job description.

When changing a responsibility area of a LB scanner and/or its coverage area, the DMSS may automatically adjust the laser power and the velocity of scanning of the LB scanner according to different criteria. As a non-limiting example, these criteria may include the angle of the reflected LB to the cardboard that needs to be pre-treated, the velocity of conveyed cardboard, the complexity of the layout and the required layout (i.e., creases or cuts for example).

Further, the present disclosure comprises among other things, a novel method and system for automatically and dynamically changing the coverage areas of one or more of the LB scanners while pre-treating a conveyed cardboard.

The DMSS may automatically and dynamically define, calibrate and change the coverage area of one or more of the LB scanners. The automatic and dynamic change of the coverage area may be performed on a per job basis and/or for each cardboard that is being pre-treated. The automatic and dynamic change of the coverage area may be performed during the pre-treatment of a cardboard and/or before pre-treatment of a cardboard. Advantageously, this capability may result in increasing the throughput of the DMSS and/or improve the pre-treatment of a cardboard.

An example of an embodiment of automatic and dynamic change of the coverage area of one or more LB scanners may include setting one of the LB scanners coverage areas to be as wide as the cardboard dimension (i.e., by changing the height of the reflecting plan and/or the height of the conveyor on which the cardboard is placed). In such an embodiment, the LB scanner with the widest coverage area may pre-treat the peripheral areas of the cardboard, while the other LB scanners pre-treat the internal areas of the cardboard.

Another example may be that the LB scanner with the widest coverage area may pre-treat a different cardboard then the other LB scanner(s). The in-coming and out-going cardboards on the conveyor may be pre-treated by one LB scanner while the other LB scanner(s) pre-treat a cardboard on the conveyor placed between the in-coming and out-going cardboards. Thus, two or more cardboards may be pre-treated in parallel.

The DMSS may automatically and dynamically plan and change the order, method and/or algorithm of the pre-treatment process in which it pre-treats a cardboard according to the dynamic change of the coverage area of one or more LB scanners, and/or vice versa.

In some embodiments in which the DMSS is part of a system that has automatic dynamic attributes itself, the DMSS and, that one or more other module of the system may automatically dynamically change in relation with and/or in accordance with the other. Advantageously, this functionality may further improve the overall throughput, and/or quality of pre-treatment of the cardboards. A surface-adhesive-rule die technology (SART) may be a module that may dynamically and automatically change its dies to pre-treat a cardboard.

Figure 5A:
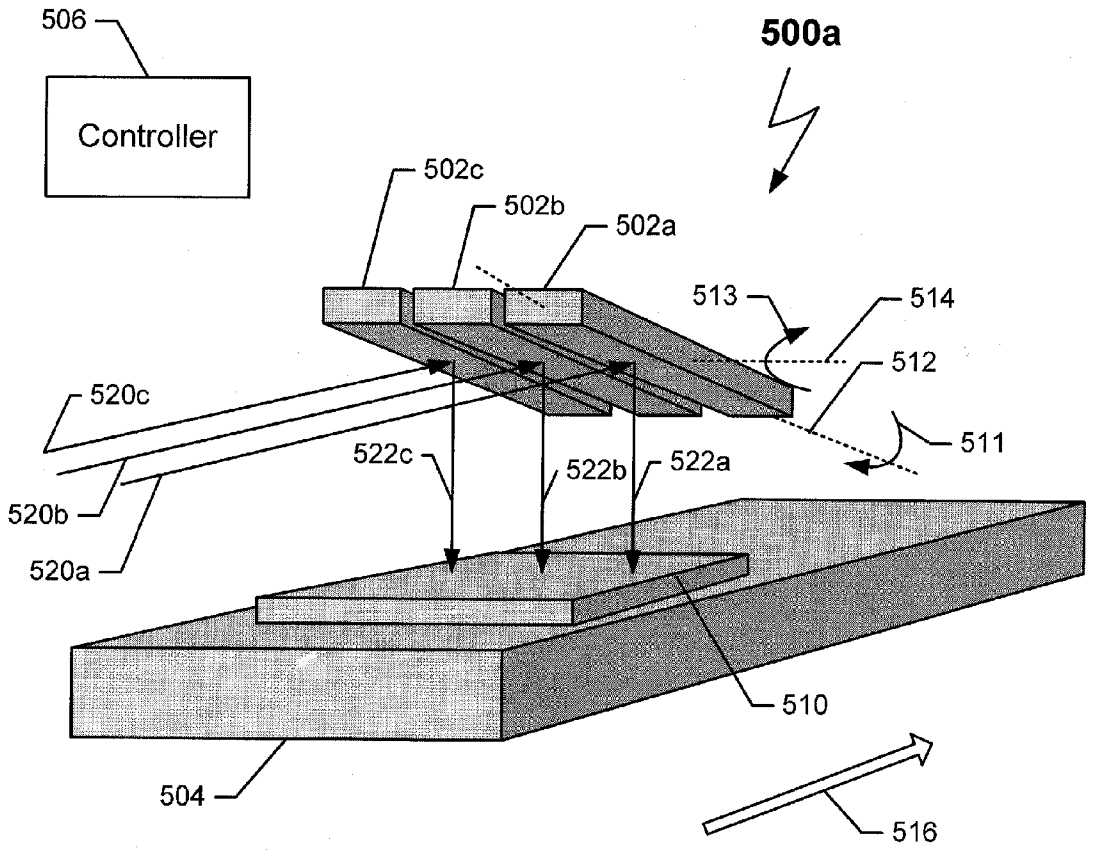
FIGS. 5*a*-5*b* are simplified block diagrams with relevant elements of an example of a DMSS, implemented according to teaching of the present disclosure.

FIG. 5A schematically illustrates a simplified block diagram with relevant elements of an example of embodiment of a DMSS. The DMSS 500*a* may include among other things: a plurality of LB scanners; a conveyor 504; a plurality of laser-beam sources (not shown in drawing); and a controller 506.

The number of scanners employed may be based on a variety of different criteria. Non-limiting examples of the criteria may include one or more of: the maximum size (width and/or length and/or thickness) of a cardboard that may need to be pre-treated; the minimum and maximum coverage areas of a scanner; material of a cardboard; and layout requirements.

For example, if the largest cardboard that the system has to pre-treat is 10.6 cm in length (measured along machine direction) and 75 cm in width (measured perpendicular to machine direction wherein machine direction is shown by arrow 516.), and the pre-treatment requires cutting the cardboard via the lasers; and each LB scanner has a coverage area of 32 cm by 32 cm, but when working with the laser at its high power settings, for fast throughput and/or high performance, has a maximum field of view of 25 cm by 25 cm, then three LB scanners placed next to each other side by side in a direction perpendicular to the machine direction can be used as shown in FIG. 5A.

Each scanner may have two or more moveable-light-reflecting planes, each operating similar to the scanner described in conjunction with FIG. 3A. For convenience and clarity of presentation, each scanner in FIG. 5A may have one moveable-light-reflecting plane 502 that may pivot around two axes. For example, a first LB scanner may have a moveable-light-reflecting plane 502*a* that may pivot around axis 512 in direction similar and/or opposite to the direction of arrow 511, and may also pivot around axis 514 in direction similar and/or opposite to the direction of arrow 513. Wherein axis 512 may be centered along the length of moveable-light-reflecting plane 502*a*, and axis 514 may be centered along the center of the width of moveable-light-reflecting plane 502*a* width.

The second and third LB scanners may each have a moveable-light-reflecting plane (502*b* and 502*c*, accordingly) that may pivot in a similar manner as described for moveable-light-reflecting plane 502*a*, around an axis along their length and width (axis not shown in drawing for each plane).

Each scanner may be associated with an LB source (not shown in the drawing). Each LB source may emit an LB 520*a-c* toward the relevant moveable-light-reflecting plane 502*a-c*. The moveable-light-reflecting planes 502*a-c* may reflect the LB and steer the reflected LB 522*a-c* toward and along a cardboard 510.

Furthermore, one or more of the LB scanners may include a 'focus shifter' lens or 'z-shifter' lens (not shown in drawing). The 'focus shifter' lens or 'z-shifter' lens may be placed between the LB source (not shown in drawing) and the moveable-light-reflecting plane 502*a-c*. In other embodiments, the 'focus shifter' lens or 'z-shifter' lens may be placed between the moveable-light-reflecting plane 502*a-c* and a cardboard 510 been pre-treated. In other embodiments of the DMSS 500*a*, each scanner may have two or more moveable-light-reflecting planes.

The multiple-scanner system (DMSS) 500*a* may pre-treat a cardboard 510 while the cardboard is being conveyed by the conveyor 504 by performing one or more actions such as: cutting, creasing, scoring, embossing, or other actions. The cardboard may be conveyed in a substantially constant velocity in the machine direction shown by arrow 516. Advantageously, enabling the cardboard to traverse through the system as a substantially constant velocity reduces the cost and complexity of the system due to the elimination or reduction of accelerating, stopping deceleration or otherwise modifying the movement of the cardboard. Further, precision due to stitching between the different scanners and timing of the pre-treatment is achieved.

Each scanner's moveable-light-reflecting plane 502*a-c* may be responsible to pre-treat a pre-defined area of the cardboard 510. The pre-defined area of the cardboard 510 may be determined based on the coverage area of each scanner. The responsibility area of a scanner may be smaller or similar to the maximum coverage area of the scanner.

In some embodiments of the DMSS 500*a*, there may be an overlap between the coverage area of two or more of the scanners (30 mm overlap, for example). Thus the responsibility areas of each scanner may be automatically and dynamically defined before and/or during the pre-treatment of the cardboard 510, such that some of the scanners may have an overlap in responsibility areas.

The DMSS may automatically and dynamically define and/or change the areas of responsibility of one or more of the LB scanners according to different criteria. The automatic and dynamic change of the areas of responsibility may be performed on a per job basis and/or for each cardboard being pre-treated, and/or during the pre-treatment process of a cardboard.

Exemplary criteria for automatic and dynamic change of responsibility areas of one or more LB scanners may be based on the complexity of the layout of the cardboard. In areas of cardboard 510 in which the required layout of pre-treatment is complex, the DMSS may automatically and dynamically assign two or more LB scanners to pre-treat that area instead of it been pretreated by only one LB scanner. Advantageously, this capability may increase the DMSS throughput and/or improve the pre-treatment of a cardboard. After that area has been substantially pre-treated, the DMSS may automatically and dynamically re-define the areas of responsibilities of the different LB scanners or revert to previous definitions or a default definition. Thus, the different LB scanners are utilized in a dynamic manner according to the specific layout of the cardboard being pre-treated.

The controller 506 may command, calibrate and synchronize the modules of the DMSS 500*a*. A calibration phase may comprise stitching between the coverage areas of the LB scanners. For example, when a layout includes a cut and/or crease line that passes along two or more scanner responsibility areas, then the calibration phase makes sure that the line will be straight and in the correct dimensions even if part of it is made by one scanner and the other part by another scanner. The calibration may be done automatically on a periodic basis, and/or before a job begins and/or dynamically during the performance of a job. Furthermore, the controller 506 may synchronize between the DMMS 500*a* and modules of cardboard-processing system that the DMSS 500*a* is part of.

Figure 5B:
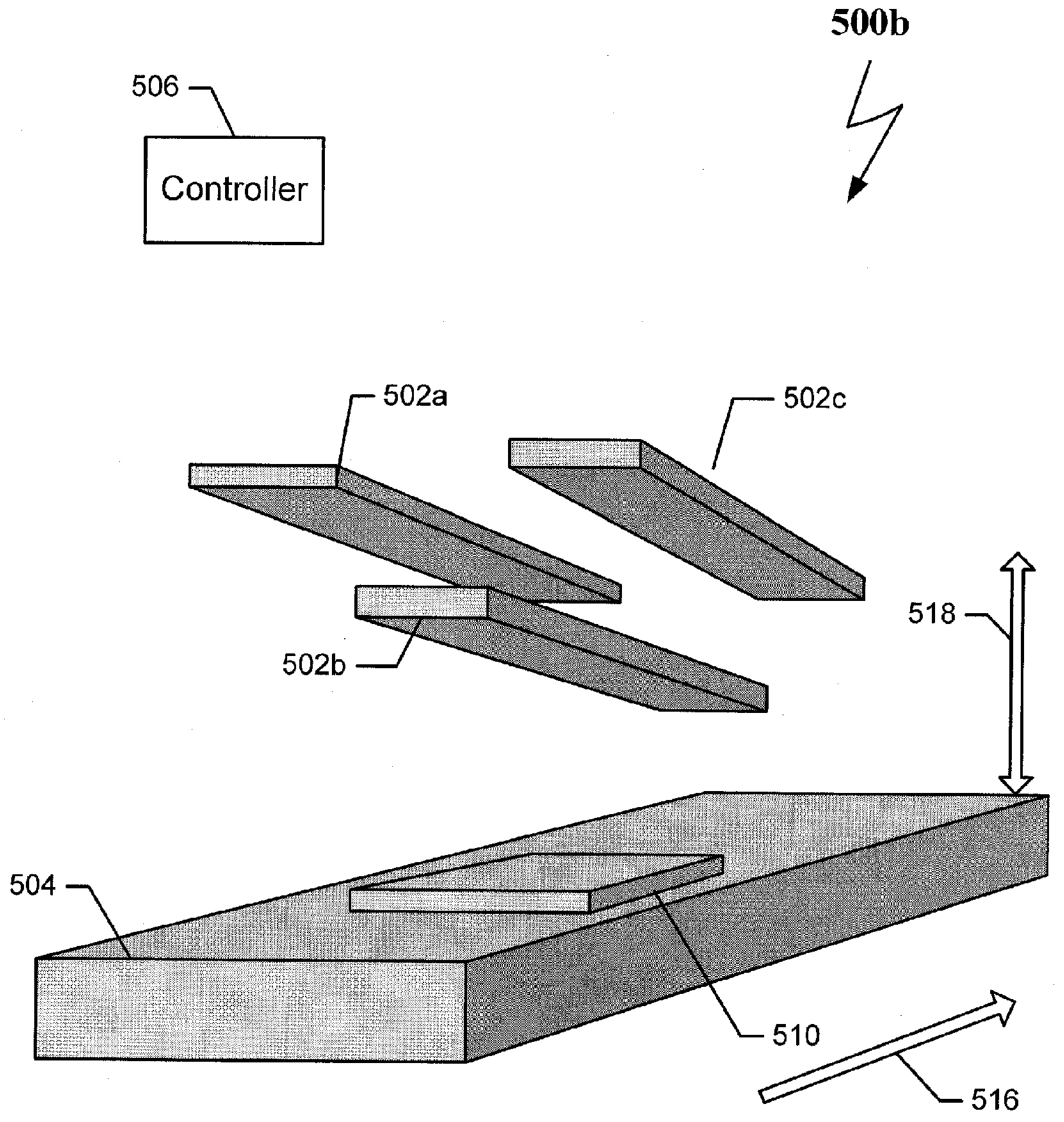

FIG. 5B schematically illustrates a simplified block diagram with relevant elements of an example of embodiment of a DMSS 500*b*. The DMSS 500*b* may be similar to the DMSS 500*a* (illustrated in FIG. 5A). At least one moveable light-reflecting plane 502*a-c* of the LB scanners in DMSS 500*b* may be automatically and dynamically moved in direction similar and/or opposite direction to arrow 518. The change in the planes 502*a-c* may be performed before and/or during the pre-treatment of a cardboard by the LB scanners of DMSS 500*b*. Advantageously, the coverage area of an LB scanner may automatically and dynamically change, thus coverage area of the cardboard 510 may change.

In various embodiments of the DMSS, one or more of the LB scanners may be placed at a distance further from the other LB scanner (not shown in drawing) along the machine direction 516. Advantageously, this capability may allow LB scanner to pre-treat a cardboard before the cardboard reaches the other LB scanners. In these as well as other embodiments of the DMSS, one or more of the LB scanners may have a larger dimension from the other LB scanners (not shown in drawing). In these as well as other embodiments of the DMSS, one or more of the LB scanners may be responsible to pre-treat the peripheral areas of the cardboard while the other LB scanners pre-treat the interior of the cardboard.

Figure 6A:
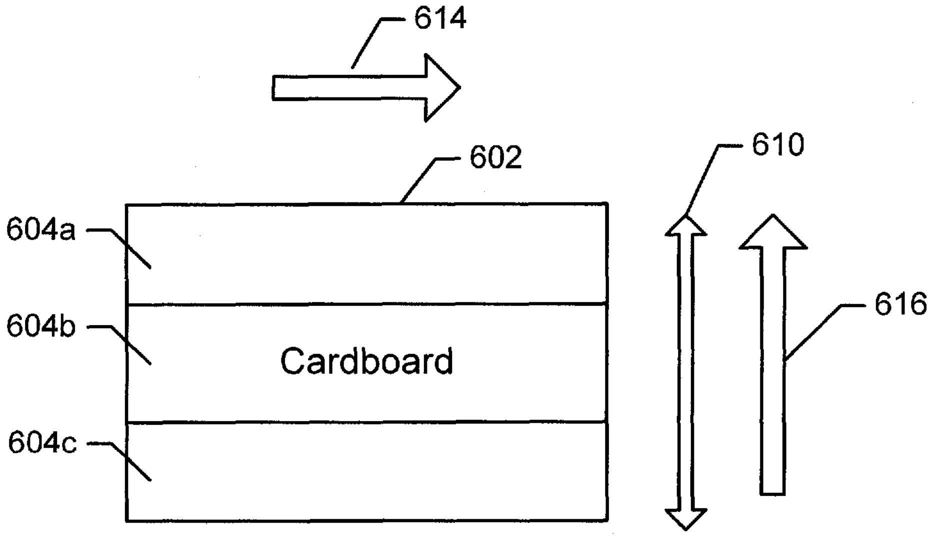
FIGS. 6*a*-6*b* schematically illustrate dynamic automatic responsibility areas of laser scanners of a DMSS, implemented according to teachings of the present disclosure.

FIG. 6A schematically illustrates a simplified example of a plurality of responsibility areas of LB scanners of a DMSS. The DMSS LB scanners may be placed substantially parallel to each other and side by side in an orthogonal direction (as shown by arrow 616) to the machine direction shown by arrow 614 of the cardboard-processing system.

In example FIG. 6A, a cardboard 602 is divided along its width 610 into three responsibility areas 604*a-c*, each belonging to an LB scanner of the DMSS. The responsibility area 604*a-c* of an LB scanner may be similar or smaller than the maximum coverage area of its LB scanner. The cardboard 610 may be conveyed while been pre-treated by the DMSS in direction similar to machine direction as shown by arrow 614. In some embodiments, the cardboard 610 may be conveyed in substantially continuous motion.

Figure 6B:
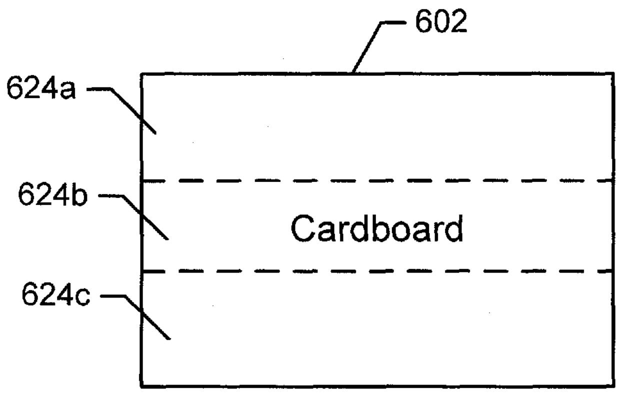

FIG. 6B schematically illustrates a simplified example of an automatic dynamic change of responsibility areas of one or more LB scanners of a DMSS. A DMSS may automatically and dynamically change the responsibility areas of one or more of its scanners according to different criteria.

In some jobs, the complexity of the required layout (cuts, creases, embossing, etc.) on a cardboard in the responsibility area of one of the DMSS' LB scanners is more complex than the required layout to be made on the cardboard in the responsibility area of another one of the DMSS' LB scanners. The LB scanner responsible for the complex layout area may slow down the throughput of the system.

If the layout required to be made in responsibility area 604*b* (FIG. 6A) is more complex than layout required to be made in responsibility area 604*a* and/or 604*c* (FIG. 6A), then a dynamic and automatic change of areas of responsibilities of some LB scanners may be made. The DMSS may automatically and dynamically enlarge the responsibility areas of the LB scanners responsible for 604*a* and/or 604*c* such that they may spread into the responsibility area 604*b* of the other LB scanner.

Thus, the new responsibility division of the LB scanners may automatically be: 624*a* and 624*b* and 624*c*, wherein area 624*b* is smaller than 624*a*, and 624*c*. Thus, an overlap between the responsibility divisions of LB scanners may occur. In some embodiments, the strength of the LBs may be changed, and/or the dwell time of the LB, as well as other attributes.

In some embodiments, the automatic dynamic change of responsibility divisions between the LB scanners may be performed on a per job basis and/or for each cardboard being pre-treated. In some embodiments, the automatic dynamic change may be performed before the pre-treatment of the cardboard by the LB scanner while in other embodiments it may be performed during the pre-treatment of the cardboard. Further, the automatic dynamic change of responsibility divisions may be performed multiple times during pre-treatment of cardboard and/or job.

Figure 7A:
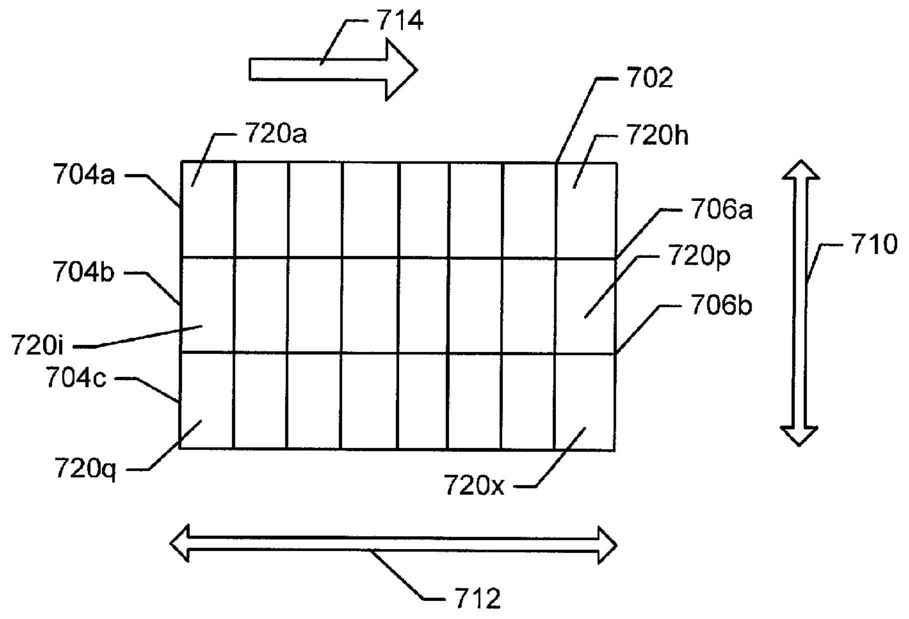
FIGS. 7*a*, 7*b*, 7*c*, 7*d*, 7*e* and 7*f* schematically illustrate a dynamic automatic division of a cardboard and a coverage area of DMSS scanner, implemented according to teachings of the present disclosure.

FIG. 7*a* schematically illustrates a simplified block diagram with relevant elements of an example of theoretical division of a cardboard by a DMSS in which each area of responsibility of an LB scanner is divided into a plurality of divisions. A cardboard 702 to be pre-treated by an LB scanner of a DMSS may be theoretically divided into a plurality of divisions. In FIG. 7A the cardboard is divided into three rectangles (indicated by lines 706*a* and 706*b*). Each rectangle may be a responsibility area of a DMSS LB scanner wherein the responsibility area may be similar to or smaller than the coverage area of that LB scanner.

Furthermore, each rectangle (responsibility area) may be divided into a plurality of divisions 720*a-x*. The number of division and the size of each division may be according to the different criteria. In FIG. 7A, the divisions 720*a-x* have a substantially similar size and dimension however, in other embodiments the dimensions may vary. The cardboard 702 may have a required layout to be pre-treated by the LB scanners of the DMSS. The layout may include one or more of the elements of: creases, cuts, embossings, scorings, as well as other actions as described in conjunction with FIG. 2A and FIG. 2B. Thus, each division may comprise a sub-layout of the whole required layout to be pre-treated. The cardboard 702 may be conveyed in direction similar to arrow 714 while been pre-treated by the LB scanners of the DMSS.

Figures 7B, 7C, 7D:
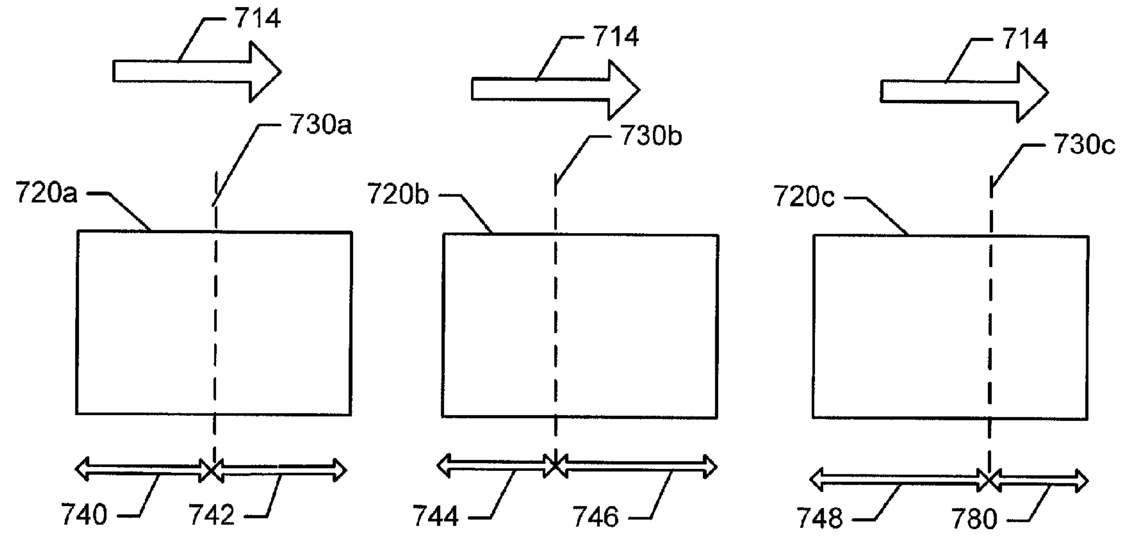

FIGS. 7B-7D schematically illustrate a simplified block diagram with relevant elements of an exemplary DMSS method for pre-treating a division by an LB scanner of a DMSS. In FIG. 7B, a division 720 may be conveyed in a direction similar to arrow 714 while being pretreated by an LB scanner. The LB scanner may begin pre-treating the division 720 when the center of the division substantial reaches the center of the LB scanner's coverage area. The center of the scanner's coverage area is indicated by dashed-line 730*a*.

FIG. 7C and FIG. 7D schematically illustrate an example of an automatic dynamic change at the beginning of pre-treating a cardboard by a DMSS LB scanner according to the division sub-layout required to be pre-treated by a LB. As illustrated in FIG. 7C, when the required sub-layout of a division 720*b* to be pre-treated by the LB scanner laser-beam is complex, the LB scanner may start the pre-treatment of that division 720*b* before the conveyed division 720*b* has reached the center of the scanner's coverage area marked by dashed-line 730*b*.

As illustrated in FIG. 7D, when the required sub-layout of a division 720*c* to be pre-treated by the LB scanner laser-beam is simple, the LB scanner may start the pre-treatment of that division 720*c* after the conveyed division 720*c* has reached the center of the scanner's coverage area marked by dashed-line 730*c*, thus enabling the LB scanner more time to pre-treat a more complex division.

The automatic and dynamic change of the beginning of pre-treating a sub-layout by an LB scanner may be done before the job begins and/or during the pre-treating of the cardboard.

An exemplary embodiment of a DMSS may receive inputs from a controller when the conveyed cardboard has reached a certain place and accordingly start its operation. In some embodiments the controller may get inputs from detectors sensing placement of the leading edge of the cardboard been conveyed. In other embodiments the controller may calculate the position of the conveyed cardboard from inputs on the velocity it is conveyed and its length/width. In yet other embodiments the controller may obtain information on cardboard placement from an encoder associated to the conveyor conveying the cardboard. Some embodiments may use a combination of the above techniques, as well as other.

Figure 7E:
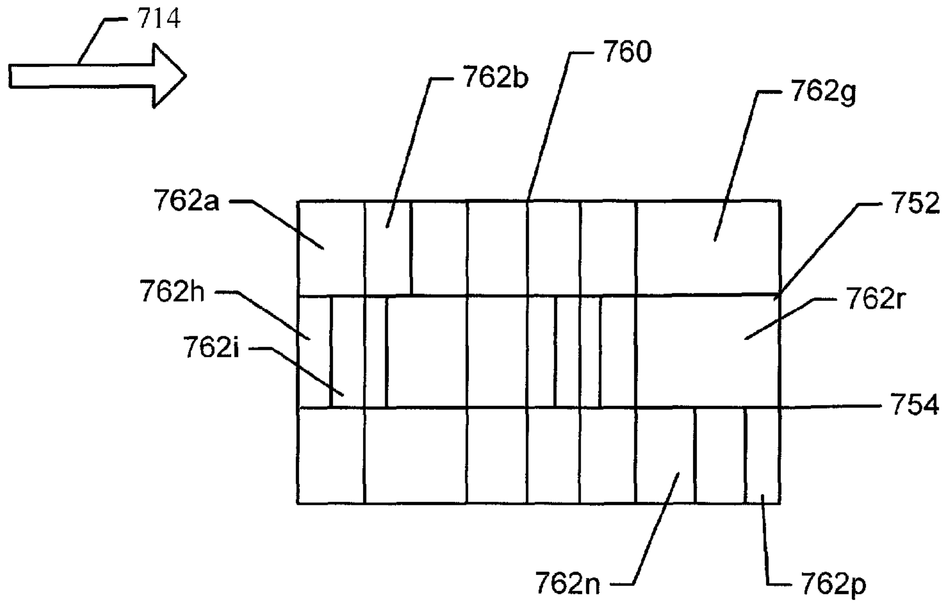

FIG. 7E schematically illustrates a simplified block diagram with relevant elements of an exemplary DMSS method for pre-treating a cardboard 760 while conveyed in a direction similar to the direction of arrow 714. The cardboard 760 may be theoretically divided into three rectangles (indicated by lines 752 and 754). Each rectangle may be a responsibility area of a DMSS LB scanner, wherein the responsibility area may be similar or smaller than the coverage area of that scanner. The DMSS may further automatically and dynamically theoretically divide cardboard 760 into a plurality of different sized divisions 762*a-p*.

The size of each division 762*a-p* may be determined based on the sub-layout required to be pre-treated in that division. Division 762*h* and 762*i* may have complex layouts, thus their size may be smaller than division 762*r*, for instance. Division 762*b* may have a more complex sub-layout than 762*g*, thus its size may be smaller than division 762*g*, for instance.

Figure 7F:
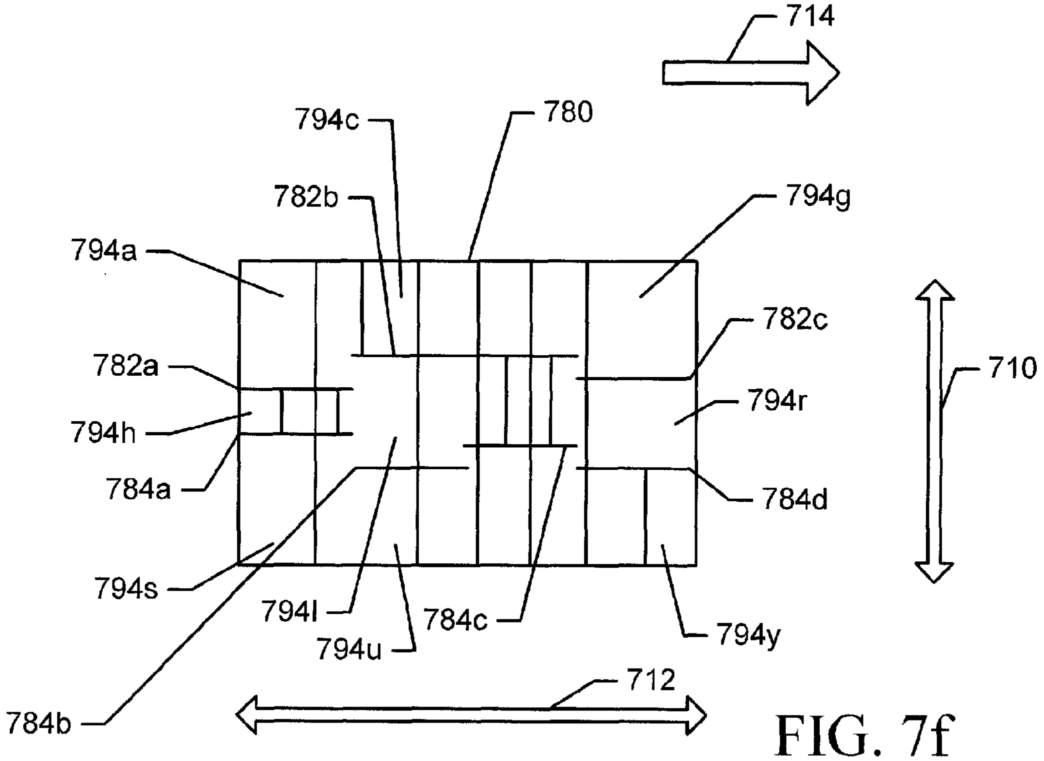

FIG. 7F schematically illustrate a simplified block diagram with relevant elements of an exemplary D SS method for pre-treating a cardboard 780 while it is conveyed in a direction similar to direction of arrow 714. The cardboard 780 may be automatically and dynamically theoretical divided into a plurality of divisions 794*a-y* where the size of each division may be determined based up on the sub-layout needed to be pre-treated by the LB scanner. Further, the responsibility areas of each scanner may change according to the sub-layout needed to be pre-treated by that LB scanner.

For example, division 794*h* may have a complex sub-layout to be pre-treated and thus it has a size this is smaller than division 794*g* which may have a simpler sub-layout to pre-treat. Further, three scanners may be responsible to pre-treat division 794*h*, thus their responsibility areas overlap marked 782*a* and 784*a*.

Division 7941 may have a sub-layout complexity similar to 794*u* and 794*c*, thus the size of the divisions may be similar, and each scanner may be responsible for one of the divisions. Borders of responsibility areas of each LB scanner is marked by 782*b* and 784*b*, etc.

Figure 8A:
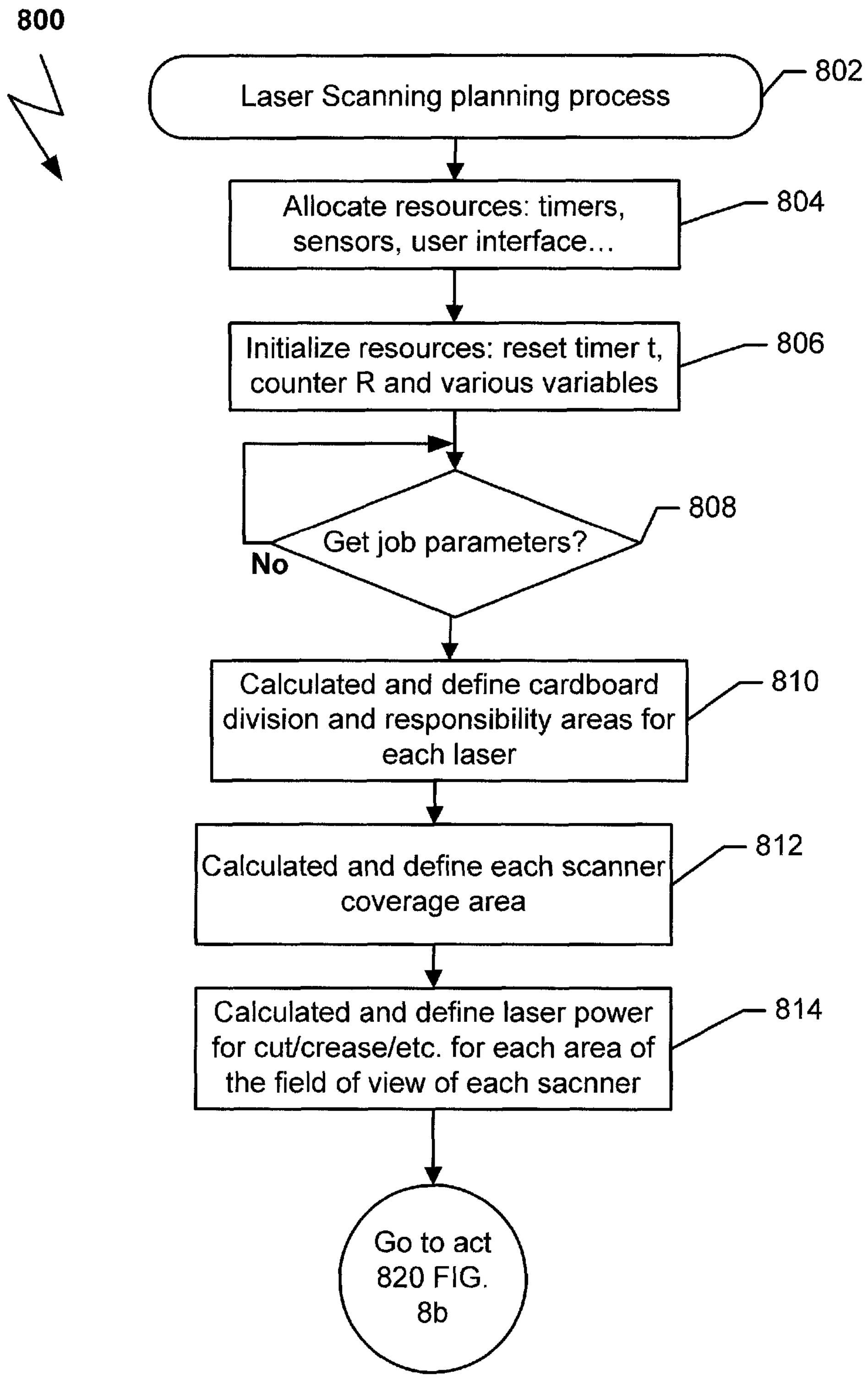
FIGS. 8*a*, 8B and 8*c* schematically illustrate a simplified portion of a flowchart with relevant actions of an example of a DMSS method for preplanning a cardboard pre-treatment, implemented according to teachings of the present disclosure.
Figure 8B:
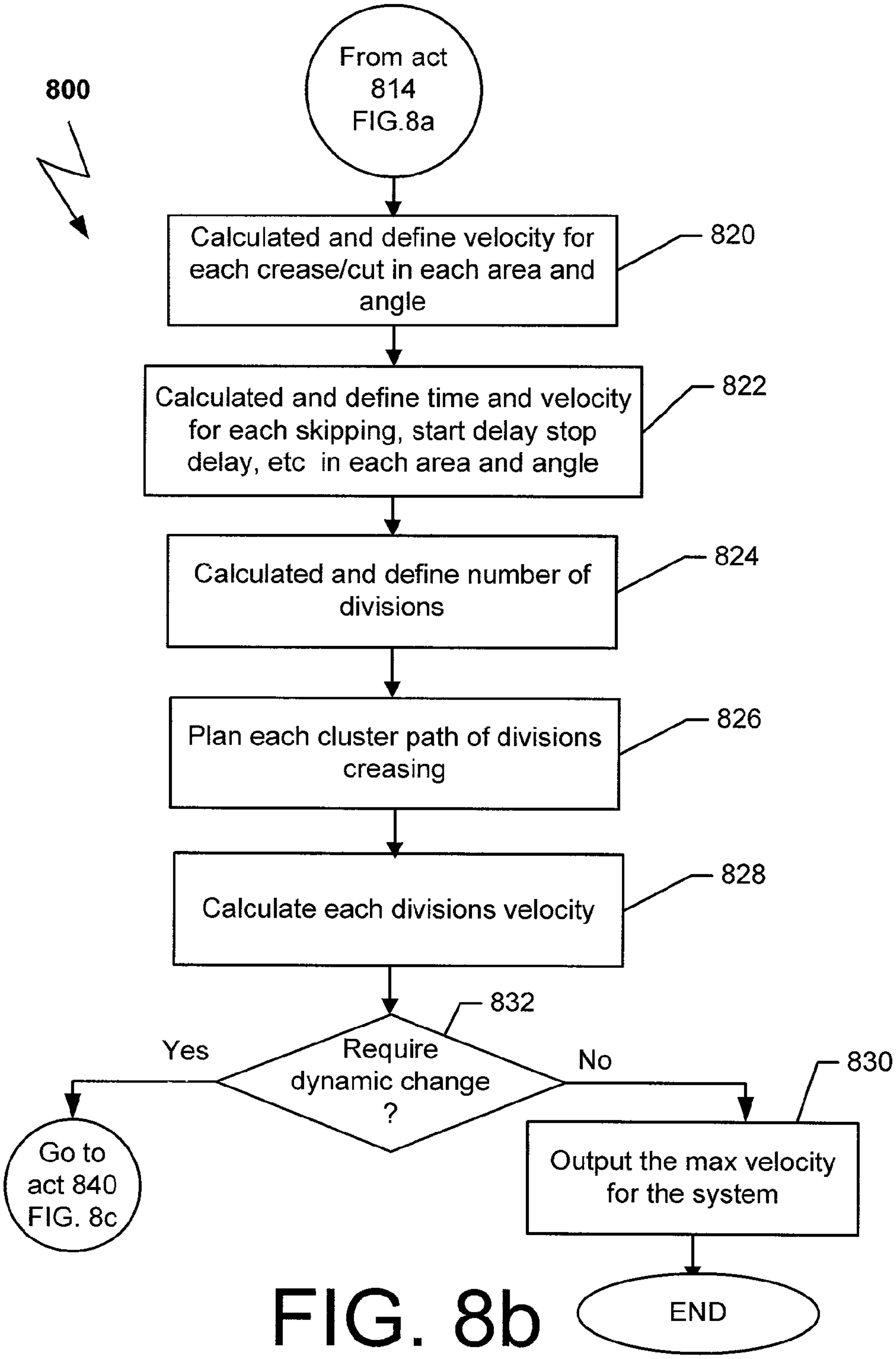
Figure 8C:
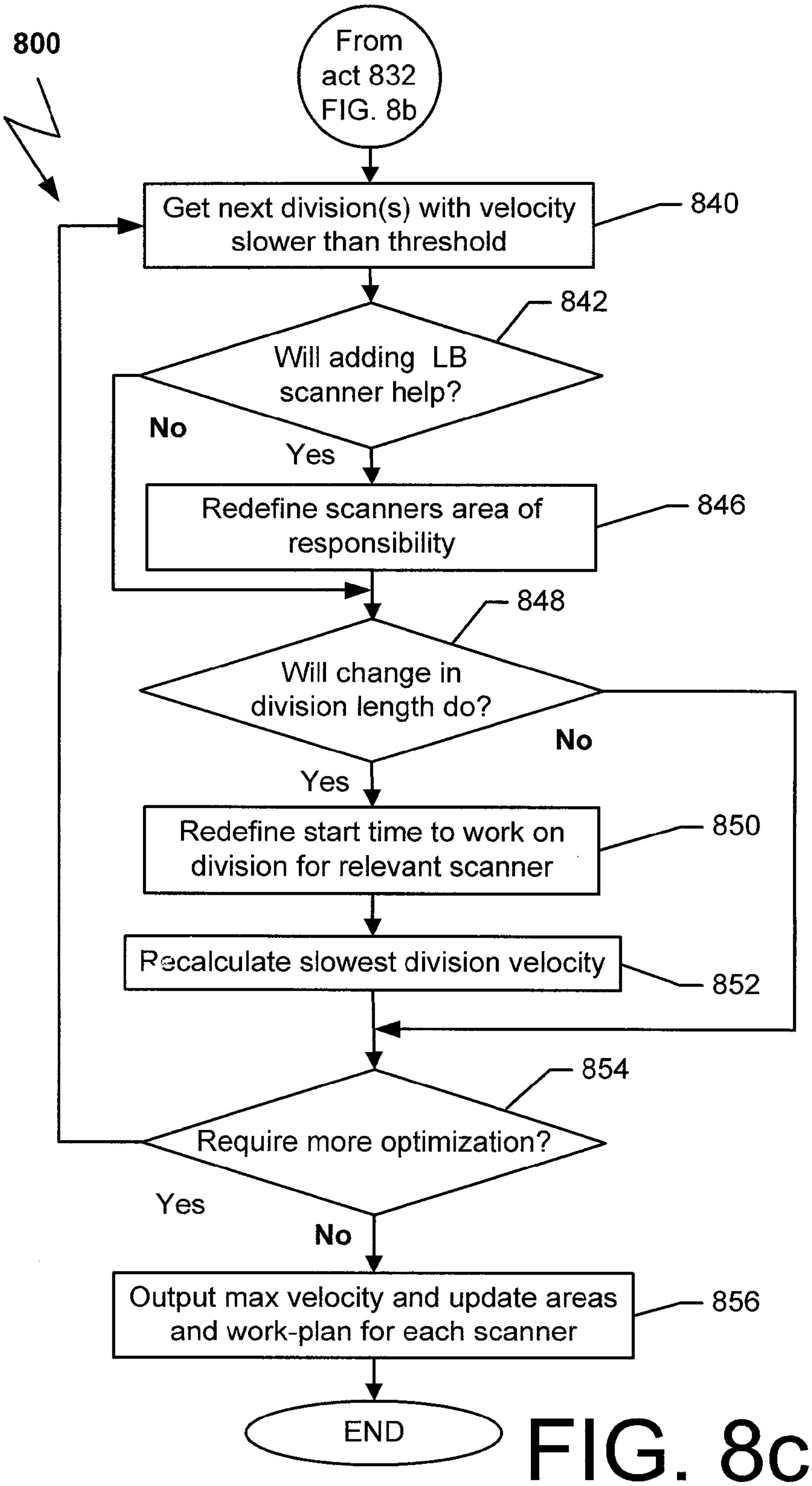

FIG. 8A-FIG. 8C schematically illustrate a simplified portion of a flowchart with relevant actions of an exemplary embodiment of a dynamic laser-beam-scanning system work-plan mode method 800. Method 800 may be executed 802 by a controller of a DMSS. At act 804, method 800 may allocate different resources, such as, but not limited to, sensors, timers, scanners, and input on job descriptions.

Next method 800 may set the resources. Exemplary settings may include, calibrations, resetting timers, etc. Method 800 may wait 808 until all required job parameters are obtained. Non-limiting examples of parameters may include layout required to be pre-treated by DMSS, and cardboard parameters (length, width, thickness, material type, etc.).

Once all parameters are obtained, method 800 may calculate and define 810 the number of theoretical divisions and there sizes of a cardboard to be pre-treated by the DMSS. Method 800 may further calculate and define 810 the responsibility areas of each scanner along the different divisions of the cardboard. Method 800 may calculate and define 812 the coverage area of each LB scanner. In some embodiments, a DMSS LB scanner may have its coverage area automatically and dynamically changed. The coverage area of a scanner may be a function of the field of view angle of the scanner and its distance from the cardboard need to be pre-treated.

Accordingly, method 800 may calculate and define 814 the laser power required for each LB source for the layout required. The laser power may be a function of the layout type (cut, crease, etc.), the cardboard parameters, the scanner working that area and its placement, etc. Next, method 800 may proceed to act 820 FIG. 8B.

At act 820 of FIG. 8B, the method 800 may calculate the required 820 scanning velocity of each scanner for the different pretreatment (cuts, crease, scoring, etc.). The velocity may be a function of the angle of the reflecting-plane and the cardboard, the type of pretreatment, the laser power, as well as others and combinations of such functions. The velocity of each skipping of the reflected steered LB from one place to another may also be calculated and/or defined 824. The delay of beginning and stopping each pre-treatment may be calculated and defined 824 as well.

Accordingly, method 800 may plan 826 each division order of pre-treating and accordingly calculate 828 the velocity required to convey the cardboard while pre-treating that division. If 832 the required velocity of all divisions require a velocity that is faster than a pre-defined threshold, then method 800 may output the substantially constant velocity at which the cardboard may be conveyed. The substantially constant velocity may be similar or slower than the minimum velocity calculated for the different divisions of the cardboard. Method 800 may proceed to act 902 of method 900 FIG. 9.

If 832 the required velocity of all divisions is faster than a pre-defined threshold, then method 800 may require an automatic change and go to act 840 FIG. 8C. The information relating to the division with a required velocity slower than the threshold velocity is obtained 840 from a memory, a storage/register. Method 840 estimates whether adding another LB scanner to work on that division together with the LB scanner assigned to a division that is already under its responsibility will improve velocity. If yes 846, then method 800 may automatically and dynamically change the required LB scanners responsibility area definitions, for that division's pre-treatment.

If 842 not, then method 800 may estimate if changing the length of the division (machine direction-wise) will help increase the required velocity of conveying cardboard while pre-treating that division. If 848 yes, then method 800 may redefine 850 the time to start pre-treating that division. Next, method 800 may recalculate 852 the slowest velocity required for pre-treating a division from all divisions. If 848 no, then method 800 may proceed to act 854. If 854 that calculated velocity is slower 854 than a threshold, method 800 returns to act 840 for more optimization.

If 854 no further optimization is required, then method 800 may output the maximum velocity required to pre-treat the cardboard. This velocity may define the substantially constant velocity the cardboard is being conveyed while pre-treated by the DMSS. Method 800 may further send commands to the required modules of the DMSS on new responsibility areas and theoretic division sizes. Next, method 800 may end.

Figure 9:
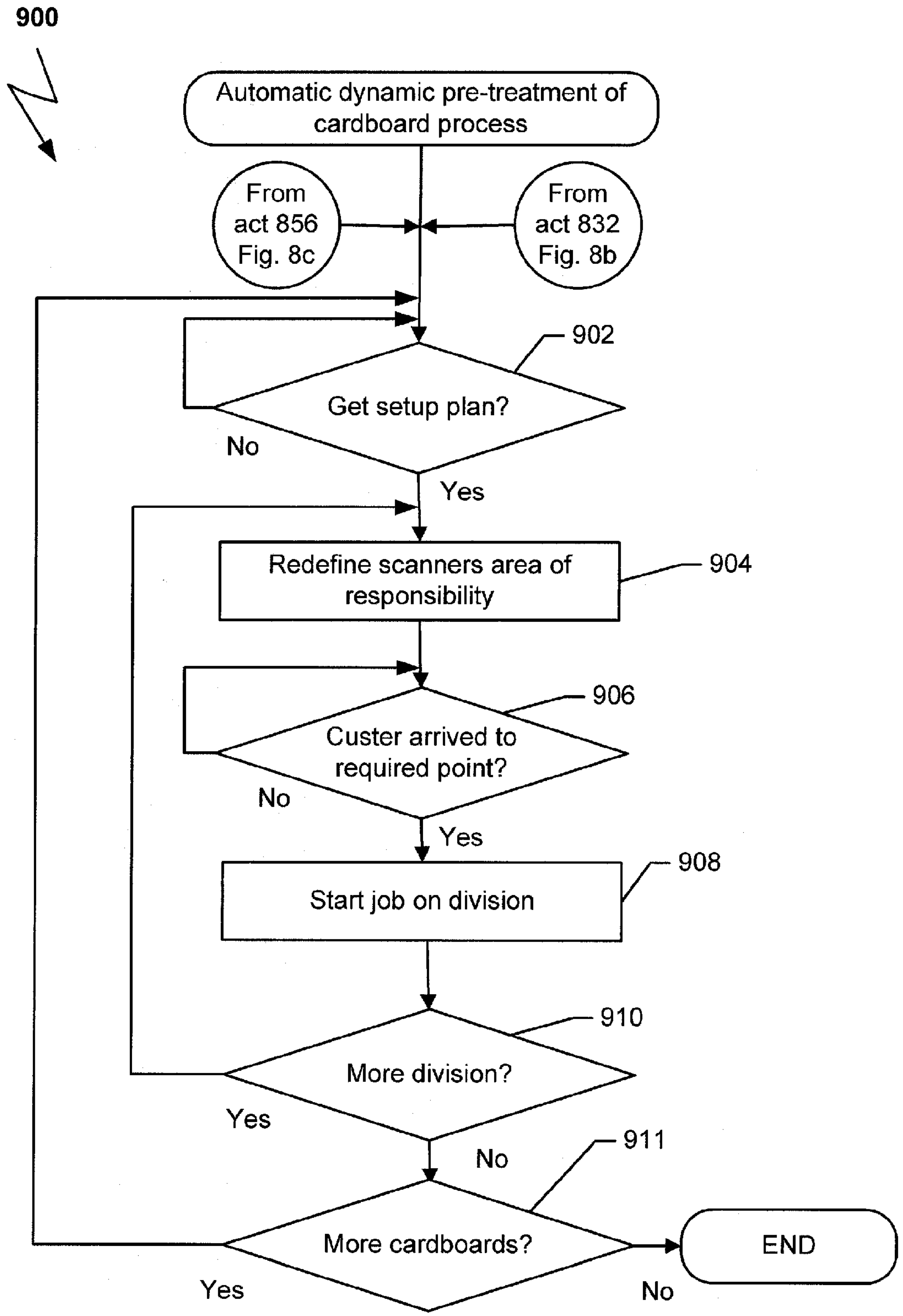
FIG. 9 schematically illustrates a simplified portion of a flowchart with relevant elements of an example of an automatic dynamic pre-treatment cardboard method by a DMSS, implemented according to teachings of the present disclosure.

FIG. 9 schematically illustrates a simplified portion of a flowchart with relevant actions of an example of embodiment of a DMSS automatic dynamic cardboard pre-treatment method 900. Method 900 may be executed by a DMSS controller. Method 900 may obtain 902*a* set up plan and work plan for pre-treating a cardboard. The work plan may comprise different information, such as cardboard division size and placement, DMSS LB scanner responsibility areas for each division, required layout to be pre-treated in the cardboard, time to start pre-treatment of each division.

Next, a loop from act 904 and extending to act 910 may start for each DMSS LB scanner. The responsibility areas of the DMSS LB scanners may be automatically and dynamically adjusted 904 for their next division to be pre-treated. Adjustments may be mechanical, laser power, etc. Each LB scanner of the DMSS may wait 906 until the division that it needs to pre-treat reaches a defined point in its coverage area. Once it is detected that the division has reached the predefined point, the LB scanner may start pre-treating the division required sub-layout. Once finished, method 900 checks if 910 another division needs to be pre-treated. If 910 another division is to be pre-treated, method 900 returns to act 904. If 910 another division does not need to be pre-treated, method 900 may check if 911 more cardboards are needed to be pre-treated (counter for example). If 911 no cardboards remain to be treated, then method 900 may end. If 911 additional cardboards need to be treated, then method 900 may return to act 902.

Figure 10:
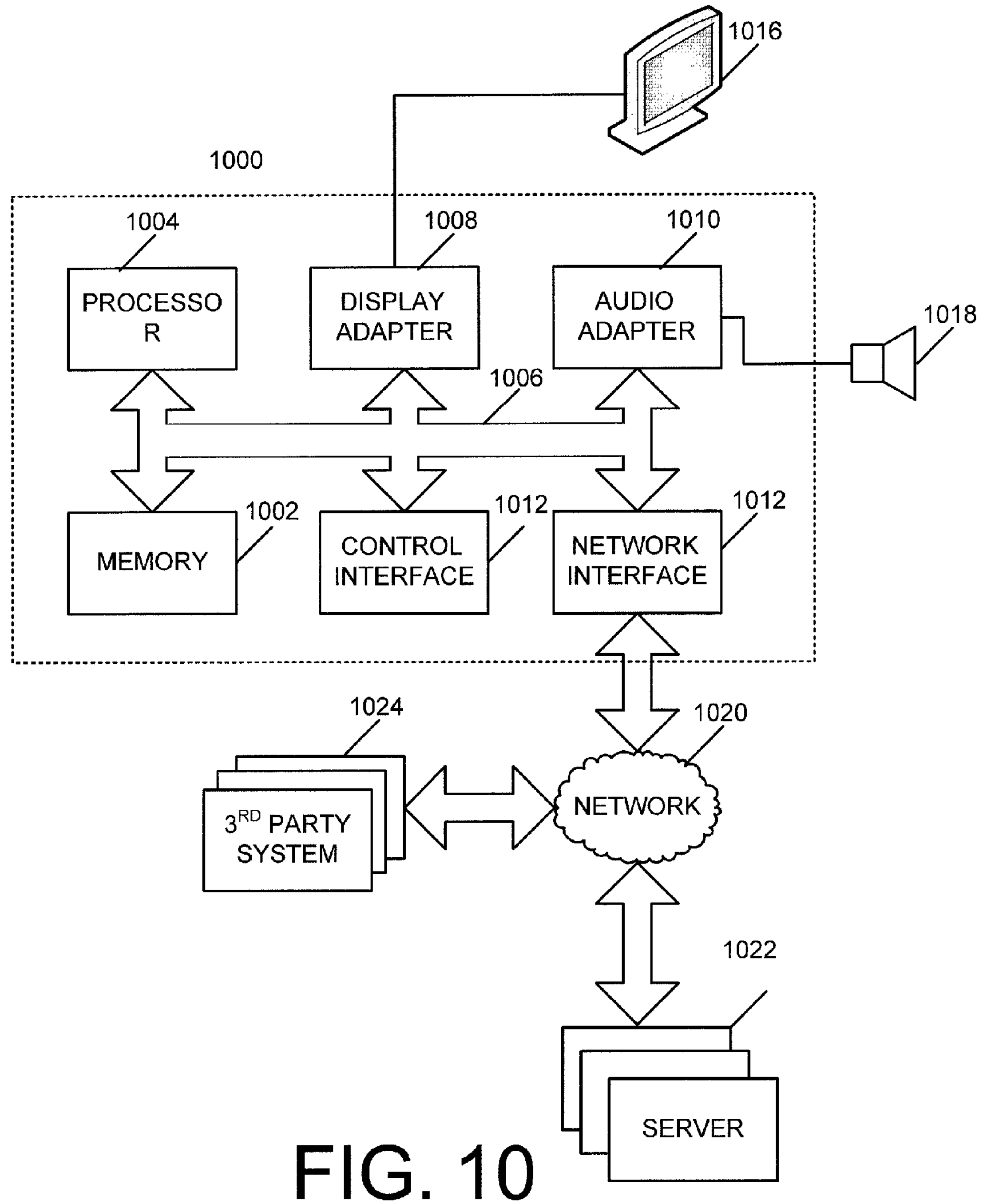
FIG. 10 is a functional block diagram of the components of an exemplary embodiment of system or sub-system operating as a controller or processor, implemented according to teachings of the present disclosure.

FIG. 10 is a functional block diagram of the components of an exemplary embodiment of system or sub-system operating as a controller or processor 1000 that could be used in various embodiments of the disclosure for controlling aspects of the various embodiments. It will be appreciated that not all of the components illustrated in FIG. 10 are required in all embodiments of the controllers, modules or other systems or subsystems, but each of the components are presented and described in conjunction with FIG. 10 to provide a complete and overall understanding of the components.

The controller can include a general computing platform 1000 illustrated as including a processor 1002 and memory device 1004 that may be integrated with each other or communicatively connected over a bus or similar interface 1006. The processor 1002 can be a variety of processor types including microprocessors, microcontrollers, programmable arrays, custom IC's etc. and may also include single or multiple processors with or without accelerators or the like. The memory element of 1004 may include a variety of structures, such as RAM, ROM, magnetic media, optical media, bubble memory, FLASH memory, EPROM, and EEPROM.

The processor 1002, or other components in the controller may also provide components such as a real-time clock, analog to digital converters, digital to analog converters, etc. The processor 1002 also interfaces to a variety of elements including a control interface 1012, a display adapter 1008, an audio adapter 1010, and network/device interface 1014. The control interface 1012 provides an interface to external controls such as but not limited to: sensors, actuators, drawing heads, multiple-orifice nozzles, cartridges, pressure actuators, leading mechanism, drums, step motors, a keyboard, a mouse, a pin pad, an audio activated device, as well as a variety of the many other available input and output devices, or another computer or processing device.

A display adapter 1008 can be used to drive a variety of alert elements 1016, such as, but not limited to: display devices including an LED display, LCD display, one or more LEDs or other display devices. An audio adapter 1010 may interface to and drive another alert element 1018, such as a speaker or speaker system, buzzer, bell, etc. A network/interface 1014 may interface to a network 1020 which may be any type of network including, but not limited to the Internet, a global network, a wide area network, a local area network, a wired network, a wireless network or any other network type including hybrids. Through the network 1020, or even directly, the controller 1000 can interface to other devices or computing platforms such as one or more servers 1022 and/or third party systems 1024. A battery or power source may provide power for the controller 1000.

Implementation of the method and/or system of embodiments of the disclosure can involve performing or completing selected tasks manually, automatically, or a combination thereof. Moreover, according to actual instrumentation and equipment of embodiments of the method and/or system of the disclosure, several selected tasks could be implemented by hardware, by software or by firmware or by a combination thereof and with or without employment of an operating system. Software may be embodied on a computer readable medium such as a read/write hard disc, CDROM, Flash memory, and ROM. In order to execute a certain task, a software program may be loaded into or accessed by an appropriate processor as needed.

Figure 11:
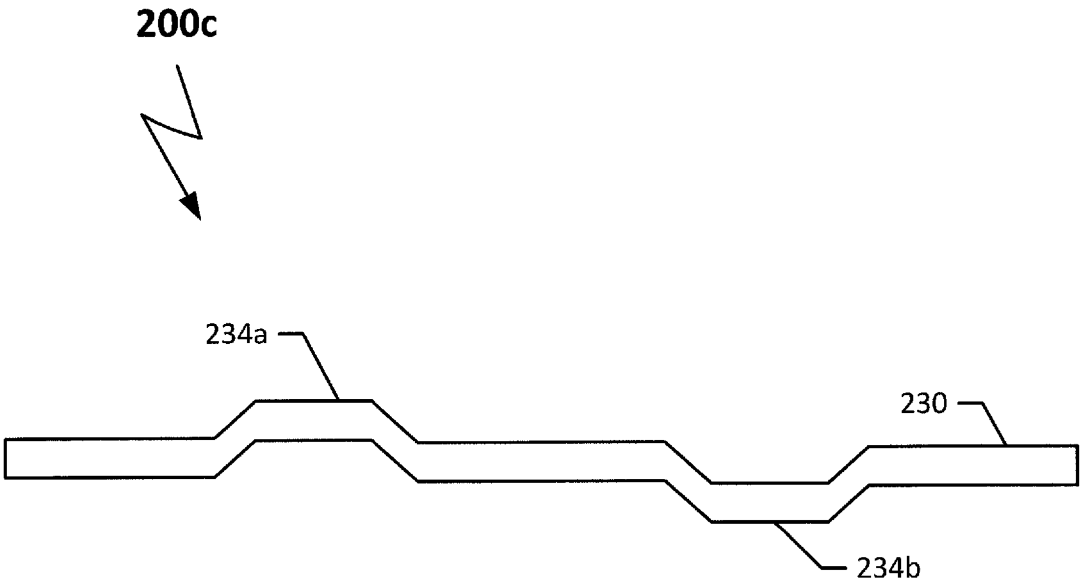
FIG. 11 schematically illustrates a simplified portion of an example of pretreated cardboard with a plurality of protruded sections.

FIG. 11 schematically illustrates a simplified portion of an exemplary embodiment of a pre-treated cardboard 230 having protruding sections 234*a* and 234*b*. The protruding section 234*a* may protrude upward and the protruded section 234*b* may protrude downward. It should be appreciated that in various pre-treated cardboard embodiments some of the sections may protrude at different angles, heights, widths, lengths and combinations thereof (not shown in drawings).

Figure 12:
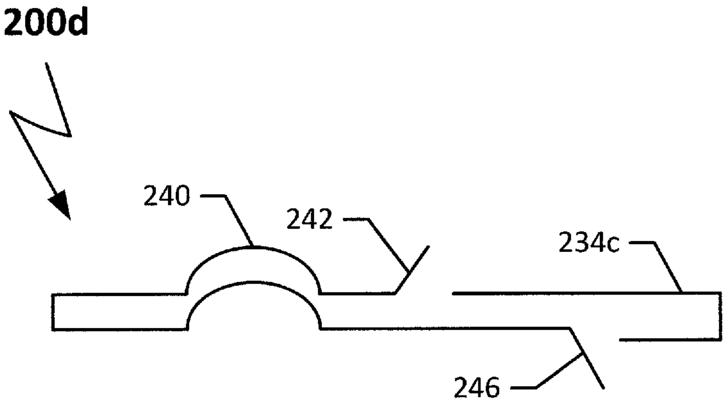
FIG. 12 schematically illustrates a simplified portion of an example of relevant elements of a section with protruding areas.

FIG. 12 schematically illustrates a simplified portion of an example of a section 234*c* having protruding areas 240, 242 and 246. The protruded areas may be creases 240, and/or cuts 242 and 246, for example. It should be appreciated that in various embodiments some of the sections may protrude at different angles and heights (not shown in drawings), etc.

The protruding sections 234*a*&*b* and/or one or more areas 240, 242 and 246 may tend to wrinkle and/or disconnect from the pre-treated cardboard they are part of, if they come into contact with another surface while the pre-treated cardboard is being transferred. Further, protruding sections 234*a-c* and/or one or more areas 240, 242 and 246 may damage a counter pre-treated cardboard (not shown in drawing) if they would come into contact therewith while being transferred, and vice versa.

With further reference to FIG. 2A, those of ordinary skill in the art will also appreciate that if a pre-treated cardboard 200*a* having a partially connected section and/or protruding areas comes into contact with another pre-treated cardboard and/or top surface of a pile while it is being transferred, and thus becomes damaged, the cardboard 200*a* may get jammed and thus may stop a production line, for instance. Contact that could result in such damage may include simply brushing against each other.

Further, contact between two or more pretreated cardboards 200*a* and/or between one pre-treated cardboard 200*a* and a surface may cause one or more sections 204*a-n* of a pre-treated cardboard 200*a* to protrude. Furthermore, the way the pre-treated cardboard is transferred may cause one or more sections 204*a-n* of a pre-treated cardboard 200*a* to protrude.

The above-described deficiencies in common die-cut/crease industries, printing industries, lamination industries, pre-printing, post printing industries, and the like, do not intend to limit the scope of the inventive concepts in any manner.

Among other things, the present disclosure provides a novel system and method for an automatic-adjustable stacker (AA stacker) that may be implemented in cardboard-handling systems such as, but not limited to: common steel-rule die industry, surface-adhesive-rule technology (SART), laser industry, printing industries, coating systems, selective coating systems, printing systems, pre-print systems, post-print systems; finishing systems, any of these as well as other systems.

An example of an embodiment of an automatic-adjustable stacker may operate to transfer a pre-treated cardboard from a required place (end of a pre-treating cardboard system) toward a pile of pre-treated cardboards while ensuring minimum contact between the transferred pre-treated cardboard and a top surface of the pile of pre-treated cardboards during the process of transferring the pre-treated cardboard.

In operation, the automatic-adjustable stacker (AA stacker) may transfer the pretreated cardboard to a point that is substantially close to the location at which the pretreated cardboard needs to be laid, and then release the pretreated cardboard. Such an embodiment of an automatic-adjustable stacker may thus transfer a pre-treated cardboard while preventing the separation of its different sections.

Furthermore, in some embodiments of the automatic-adjustable stacker, one or more parameters of the automatic-adjustable stacker (AA stacker) may be automatically adjusted according to different job requirements. A few examples of parameters of the adjustable stacker that may be automatically adjusted may include parameters regarding the cardboard, such as the length, the width, the height, the position near and/or along a cardboard-handling system.

A few non-limiting examples of job requirements for which an automatic-adjustable stacker (AA stacker) may be automatically adjusted to satisfy the requirements of may include: the pre-treated cardboard parameters as presented above (thickness, length, width, weight, etc.), the parameters regarding the sections of the pre-treated cardboard, the layout of the sections of the pre-treated cardboard, the speed, timing and placement of the pre-treated cardboard just before it reaches the AA stacker (automatic-adjustable stacker), the sorting requirements of different pre-treated cardboards, the number of piles of pre-treated cardboards, the number of pre-treated cardboards in a pile, the required minimum or maximum height of a pile of pre-treated cardboards, as well as a combination of two or more of the listed requirements.

A cardboard-handling system that pre-treats many different jobs and cardboard formats may benefit from the many advantageous that the various embodiments of an AA stacker offers. For example, an AA stacker may eliminate or at least greatly reduce the need or dependency for a human specialist. Further, an AA stacker may enable an automatic cardboard-handling system to automatically run for or span operations across several different jobs without requiring an operator to stop the machine processing so that manual adjustments can be made. As such, it will be appreciated that this allows for a continuously stacking operation.

Furthermore, as will be described in more details in conjunction with the description of the remaining figures, some embodiments of the AA stacker may further automatically sort, in real-time, different pre-treated cardboards while continuously stacking the pre-treated cardboards. The sorting may be performed according to a variety of factors. A few non-limiting factors may include the sorting being based on the different languages printed on the pre-treated cardboards, based on the different pre-treated cardboard format/layouts, collating sorting, and so on.

FIGS. 13*a-h* are schematics illustrating a conceptual portion of simplified block diagrams with relevant elements of an example of a novel system and method of an automatic-adjustable stacker (AA stacker) transferring a pre-treated cardboard. In FIG. 3*a*, a pre-treated cardboard 306 may be pre-treated at a cardboard pre-treatmenter 302. An example of cardboard pre-treatmenter may include: a rule-die and counter-die, a laser, a printer, a conveyor, a combination of two or more of these as well as other options. The pre-treated cardboard's leading edge is marked in the drawing as 306*a* and the pre-treated cardboard's trailing edge is marked in the drawing as 306*b*.

Some embodiments of the AA stacker may comprise a collector 304. A few non-limiting examples of collectors 304 that may be suitable include: a substantially flat plane, an open-top box, a belt, any of these as well as other. In some embodiments, the collector 304 may have an automatic-adjusted structure. In other embodiments, the collector 304 may have an automatic-adjusted placement. Yet in other embodiments, the collector may have an automatic-adjusted structure and placement.

A few non-limiting examples of an automatic-adjusted structure of the collector 304 may include: an automatic-adjustable length; automatic-adjustable width; automatic-adjustable height; and/or a combination of two or more of them as well as other automatic-adjusted parameters. One or more exemplary embodiments of the automatic-adjusted placement of the collector 304 may include wheels, rails, belts, and inherent extenders. In other embodiments, the collector 304 may have a fixed structure. Yet in some embodiments the collector 304 may be the ground.

An automatic adjustable stacker may comprise a gripper 308. The gripper 308 may have an automatic-adjustable placement. Advantageously, the gripper 308 may be automatically adjusted to get and/or to release the pre-treated cardboard at different places according to parameters of the pre-treated cardboard and\or job requirements. Some embodiments of the gripper 308 may include one or more of the following elements: mechanical grippers, vacuum grippers, clamps, vacuum belts, suction cups, side grippers, belts, chains, electrostatics, cyclic belts, and the like.

Advantageously, the AA stacker's automatic adjustable modules enable them to automatically-adjust themselves on the fly according to each pre-cardboard parameters and/or requirements; and/or according to the job requirements.

Some examples of an automatic adjustable stacker may further include a controller 390. The controller 390 may synchronize between different modules of the cardboard-pre-treatmenter 302 and the AA stacker's collector 304 and/or gripper 308. A controller 390 may obtain input from different sources. Sources such as, but not limited to: sensors; one or more modules of the cardboard pre-treatmenter 302; one or more modules of the automatic-adjustable stacker; an operator; one or more other modules of a cardboard-handling system that the cardboard pre-treatmenter 302 is part of; a combination of these as well as other options. A few non-limiting examples of sensors may include: optic sensors and mechanical sensors.

The AA stacker may control and ensure a continuous motion of the movement of the pre-treated cardboard 306 toward a pile of pre-treated cardboards 340 while ensuring minimum contact between the transferred per-treated cardboard 306 and the pile of pre-treated cardboards 340, up and to the point that the transferred pretreated cardboard 306 is at its final required place.

In some embodiments, the controller may automatically control the position of the collector 304 in reference to the cardboard pre-treatmenter 302. In some embodiments, the controller may automatically control the width of the collector 304 in reference to the pre-treated cardboard's 306 parameters. The adjustments may be done automatically as the controller 390 obtains information on the pre-treated cardboards parameters.

In some examples the controller may automatically control the position of the gripper 308 relative to the cardboard pre-treatmenter 302 and/or pre-treated cardboard and/or collector 304 and/or pile of pre-treated cardboards 340. The controller may control the timing and/or placement that the gripper 308 obtains the cardboard and/or releases the pre-treated cardboard. The adjustments may be done automatically as the controller 390 gets information on the parameters of the pre-treated cardboards and/or on placement of the collector 304 and/or on placement of a pile 340.

The input on the pre-treated cardboard may be automatically measured by one or more sensors along the path of the cardboard-handling system that the cardboard pre-treatmenter 302 is part of, and/or entered by an operator, for instance. Sensors that may be used to make such automatic measurements may include, but are not limited to: optic sensors, mechanical sensors, etc. The differences from one pre-treated cardboard to another pre-treated cardboard may be measured in real time and/or from one job to another.

The collector 304 may include, in at least some embodiments, an automatic mechanical movement mechanism and/or an automatic mechanical expansion mechanism. The automatic mechanical movement mechanism may include elements such as, but not limited to: wheels, belts, movable layers, cyclic belts, chains, etc. The automatic mechanical expansion capabilities (i.e., length-wise and/or width-wise) may include elements such as, but not limited to: belts, cyclic belts, movable layers, chains, etc. Yet in some embodiments the AA stacker's collector 304 may simply be a non-mobile platform or the ground.

The controller 390 may operate to control the placement of the front edge of the collector 304 (point C) in accordance to the cardboard pre-treatmenter 302. For example, the front edge of the collector 304 (point C) may be automatically placed in proximity to the final edge (point B) of the cardboard pre-treatmenter 302.

In some embodiments, the collector 304 may be automatically adjusted in a way that the distance from the collector's farthest edge (point D) from the cardboard pre-treatmenter 302 to the cardboard pre-treatmenter 302 end edge (point B) is substantially similar to the length of the pre-treated cardboard 306. As such, the automatic adjustments may include, as non-limiting examples, one or more of the following adjustments: automatically adjusting the length of the collector 304; automatically adjusting the placement of the collector 304; a combination of these adjustments as well as other adjustments. The automatic adjustment may be done before a job starts or it may be performed dynamically and/or in real-time (on the fly). Further the width of the collector 304 may be automatically adjusted according to the width of the pre-treated cardboard 306. The automatic adjustment may be performed prior to commencement of a job or it may be performed dynamically and/or in real-time (on the fly).

The automatic adjustments of the collector 304 and/or gripper 308 may be for different variations of parameters between the pre-treated cardboards, for instance. Variances of parameters of pre-treated cardboards of the same job may be around a few mm difference (20 mm, for example) in: width; thickness; weight, fiber direction, and so on. Variances of parameters of pre-treated cardboards of different jobs may be of higher variance, such as a few cm (20 cm, for example).

Figure 13A:
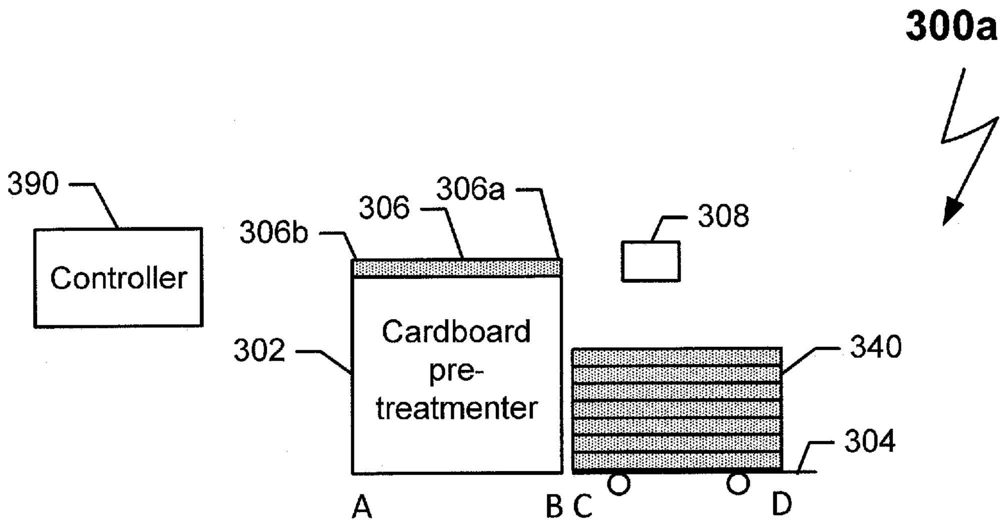
FIGS. 13*a*, 13*b*, 13*c*, 13*d* and 13*e* schematically illustrate a conceptual portion of simplified block diagrams with relevant elements of an example of a novel system and method of an automatic-adjustable stacker (AA stacker) transferring a pre-treated cardboard, according to teachings of the present disclosure.
Figure 13B:
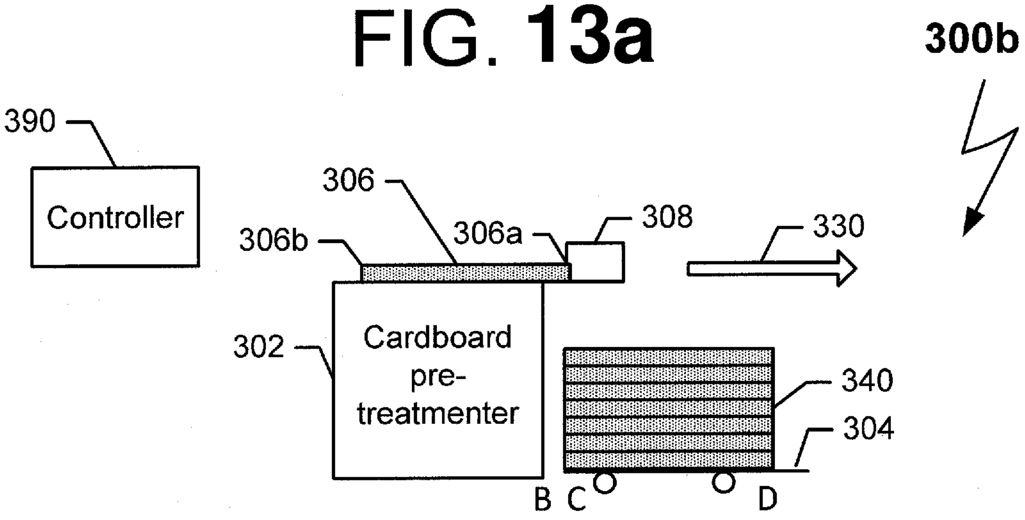

FIG. 13*b* illustrates the operation of the pre-treated cardboard 306 being grabbed at its leading edge 306*a* by the gripper 308AA stacker which his located near the end edge (point B) of the cardboard pre-treatmenter 302. The gripper 308 may pull the pre-treated cardboard 306 toward the collector 304 in the direction shown by arrow 330, for example.

Figure 13C:
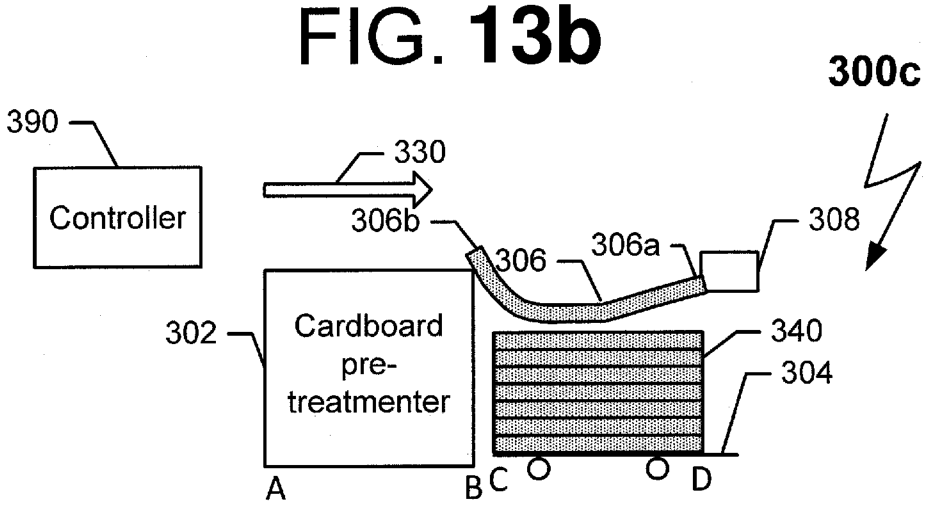

FIG. 13*c* illustrates the operation of the pre-treated cardboard 306 being transferred by the gripper 308 of the AA stacker in such a way that the pre-treated cardboard 306 has no contact with a pile 340 of pre-treated cardboard in the collector 304 until its trailing edge 306*b* reaches the end edge of the cardboard pre-treatmenter 302 (point B). When the trailing edge 306*b* of the pre-treated cardboard 306 reaches the end edge of the cardboard pre-treatmenter 302 (point B) the gripper 308 may release the leading edge 306*a* of the pre-treated cardboard 306.

Advantageously, the pre-treated cardboard 306 reaches its destination with minimum contact with the top surface of the piled pre-treated cardboards 340, while being held at its two edges, leading edge 306*a* held by the gripper 308 and trailing edge 306*b* laid on the top of the cardboard pre-treatmenter 7 nodule 302 before the AA stacker 304, through substantially most of the transfer toward its destination to the pile 340. Thus, advantageously preventing or alleviating potential damages during the conveying of the pre-treated cardboard 306. Damages such as, but not limited to: friction induced damage, printed-image damages, static electricity damage; wrinkling, tearing, jamming, separations, a combination of two or more of the above as well as other damages.

The pre-treated cardboard 306 may have a concavity-like shape while being transferred. Advantageously, this may create a controlled landing of the pre-treated cardboard 306 over the surface of the collector 304 or the surface of a pile 340 of pre-treated cardboards laid on the collector 304.

Figure 13D:
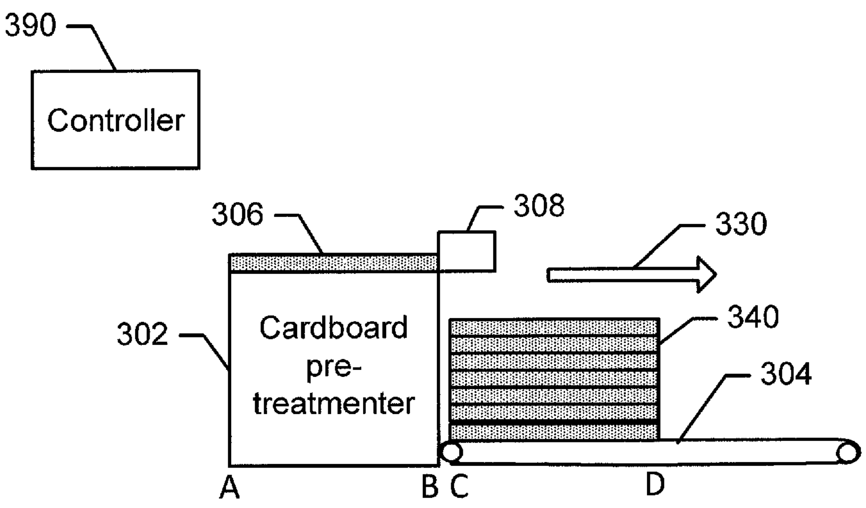

FIG. 13*d* schematically illustrates a simplified portion of a block diagram with relevant elements of an example of embodiment of an automatic-adjustable stacker 300*d*. AA stacker 300*d* may be similar to the AA stacker illustrated in FIG. 3*a-c*. AA stacker 300*d* schematically illustrates an example of an embodiment of a cyclic belt collector 305. In this embodiment, the location of the pile of cardboards, as well as the relative position of the pile with regards to the cardboard pre-treatmenter 302 can be easily adjusted.

Figure 13E:
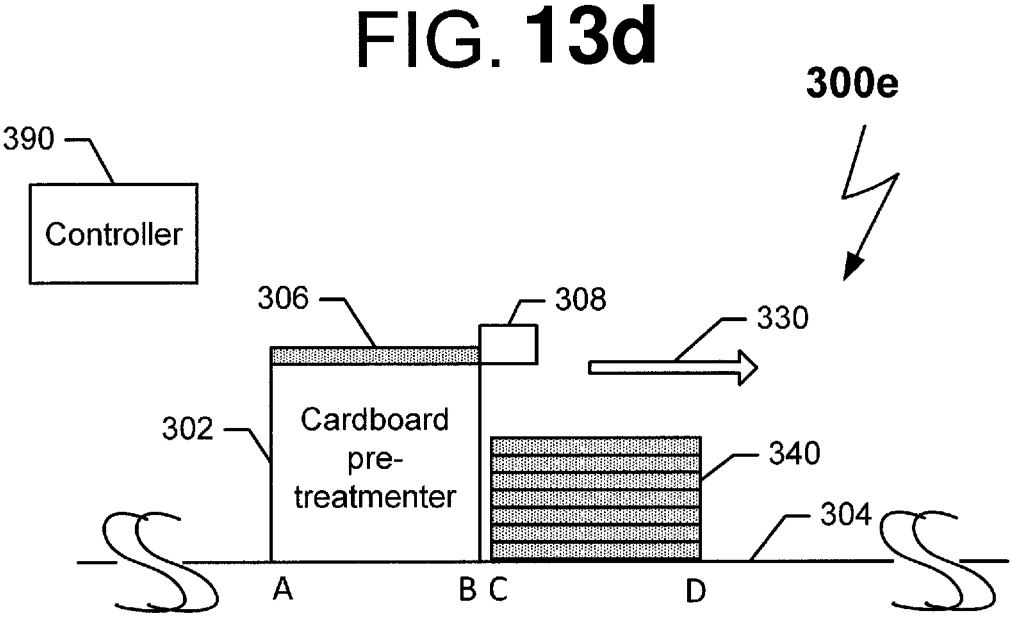

FIG. 13*e* is a schematic illustration a simplified portion of a block diagram with relevant elements of yet another exemplar embodiment of an automatic-adjustable stacker 300*e*. In the illustrated embodiment, the AA stacker 300*e* may be similar to AA stacker in FIG. 3*a-c*. However, the AA stacker 300*e* schematically illustrates an example of an embodiment of a collector 304 that is the ground.

Figure 14:
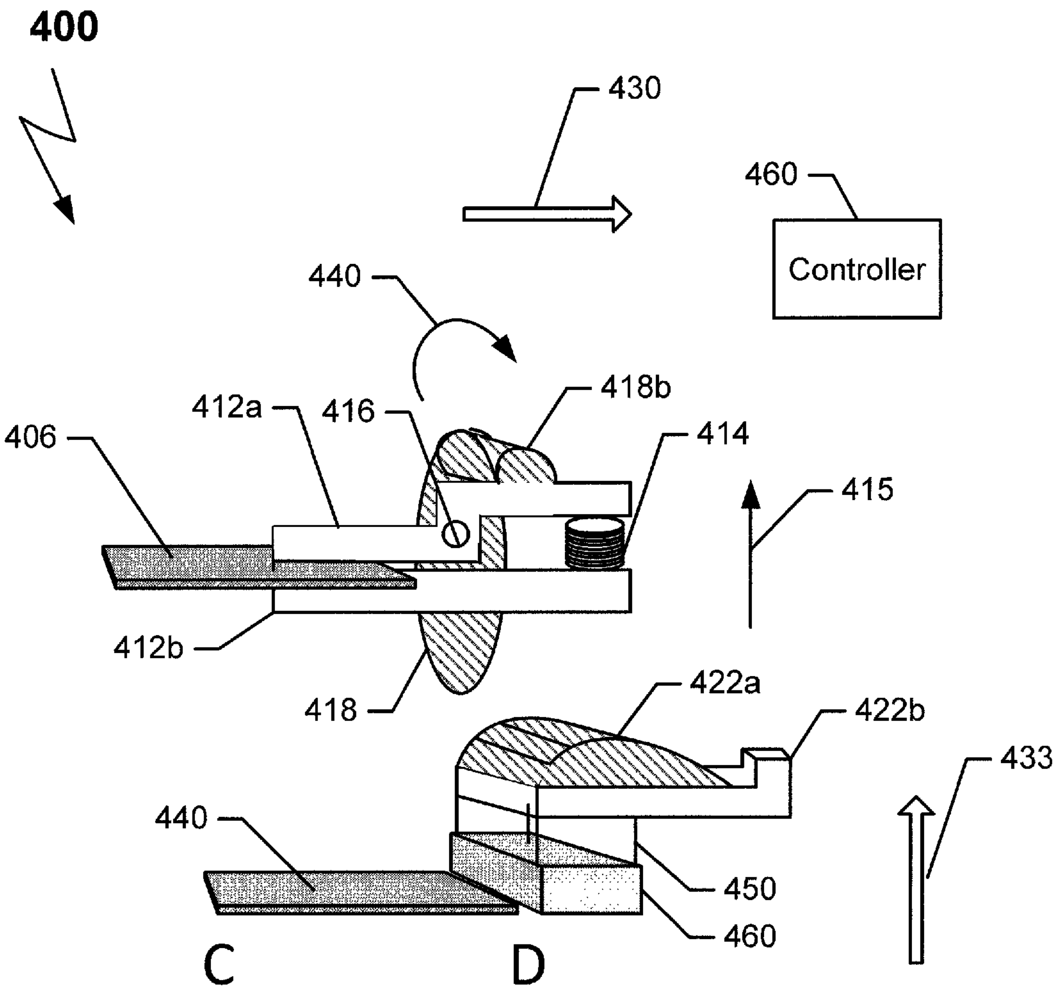
FIG. 14 schematically illustrates a simplified portion of a block diagram with relevant elements of an example of an embodiment of a gripper mechanism, according to teachings of the present disclosure.

FIG. 14 schematically illustrates a simplified portion of a block diagram with relevant elements of an example of embodiment of a gripper mechanism 400. Gripper mechanism 400 may include: a gripping mechanism 412*a&b* having a clip-like shape as shown in the drawing with elements 412*a* and 412*b* surrounding an axis 416, for example. The length of the clip-like shape gripping mechanism may be such that it may easily and securely allow gripping a pre-treated cardboard 406. Advantageously, this element may result in easing of synchronization.

The clip-like shape gripping mechanism may be associated with, or operate in conjunction with a counter spring 414 that may act as a biasing or closing mechanism, narrowing the gap between the clips 412*a* and 412*b*, of the clip-like shape gripping mechanism. The counter spring 414 may create or apply a force against the back side of clip 412*a* in a direction similar to direction of arrow 415, for example. A rod 418*b* with a D-like shape, for instance, may be associated with an arm 418*a*.

The D-like shape of the rod 418*b* may be in contact with one of the clips 412*a*. The arm 418*a* may pivot the rod 418*b* in a direction similar (or reversal) to direction of arrow 440. Thus, when the arm 418*a* pivots, it can pivot the rod 418*b* such that the arch of the D-like shape creates a counter force to the counter spring 414 force and thus, cause the opening of the gripping mechanism 412*a&b* by widening the gap between the ends of 412*a* to 412*b* that are distal from the counter spring 414.

The gripping mechanism 412*a&b*, may grip a pre-treated cardboard. Once the gripping mechanism 412*a&b* has gripped a pre-treated cardboard 406, the arm 418*a* may pivot in direction similar to arrow 440 (or counter-wise), consequently pivoting the rod with the D-like shape to have the flat area of the D-like shape counter the clip 412*a*, and thus closing the clips 412*a* and 412*b* (narrowing the gap between 412*a* and 421*b*).

The gripping mechanism 412*a&b* may pull the pre-treated cardboard 406 toward a pile of pre-treated cardboards (not shown in drawing) in a direction similar to arrow 430, for example.

Further, this exemplary embodiment of the automatic-adjustable stacker 400 may further comprise a gripping-mechanism opener 422*a* and 422*b*. The gripping-mechanism opener 422*a* and 422*b* may comprise a gradual arch cam shape. When the arm 418*a* comes against the gripping-mechanism opener 422*a* the arm will tend to follow the shape of the arch and thus pivot in a direction similar to arrow 440. This action has the consequences of opening the clip-like shape gripping mechanism 412*a* and *b* and releasing the pre-treated cardboard at its required place.

The gripping-mechanism opener 422*a* and 422*b* may be automatically moved or placed substantially near the locations at which the gripping mechanism 412*a* and 412*b* is required to be opened. For example, the gripping-mechanism opener 422*a* and 422*b* may be placed substantially near the location at which the gripping-mechanism 412*a* and 412*b* is required to open such that it can grip a pretreated cardboard. Further, the gripping-mechanism opener 422*a* and 422*b* can be automatically moved to the location at which the gripping-mechanism 412*a* and 412*b* is required to release the pre-treated cardboard 440.

The placement of the gripping-mechanism opener 422*a* and 422*b* may be adjusted automatically according to the pre-treated cardboard parameters. The parameters include a variety of settings, such as length of the cardboard as a non-limiting example. The placement of the gripping-mechanism opener 422*a* and 422*b* may also, or alternatively be adjusted automatically according to the job requirements. The job requirements may include adjustments such as the height of piles, sorting, placement of pile, and pre-treated cardboard parameters.

The gripping-mechanism opener 422*a* and 422*b* may be automatically adjusted in its placement. The automatic placement may result in moving the gripping-mechanism opener 422*a* and 422*b* in a direction similar or opposite to arrow 430, in a direction similar to or opposite to arrow 433, or in a combination of these directions. The placement of the gripping-mechanism opener 422*a* and 422*b* may be by electric actuators, pneumatic actuators motor, linear positioning mechanism, a combination of two or more of these as well as other options including computer controlled, electro-mechanical as well as mechanical.

The gripping mechanism 412*a* and 412*b*, with the arm 418*a* and the rod 418*b* may be automatically adjusted in there placement. The adjustment placement may be: in a direction similar or opposite to arrow 430, in direction similar to or opposite to arrow 433, a combination of these directions, etc. The placement of the gripping-mechanism opener 422*a* and 422*b* may be by electric actuators, pneumatic actuators motor, linear positioning mechanism, a combination of two or more of these as well as other options including computer controlled, electro-mechanical as well as mechanical.

In some embodiments there may be a plurality of gripping mechanisms 412*a* and 412*b*, and there may be a plurality of gripping-mechanism openers 422*a*. Other embodiments may comprise a plurality of gripping mechanisms 412*a* and 412*b* associated to a mutual long rod 418*b* and arm 418*a*, and having one gripping-mechanism opener 422*a*.

The gripping-mechanism opener 422*a* may be associated with a limiter 465. The limiter 465 may be a straightedge-like material. Pre-treated cardboards that are released from the gripping mechanism 412*a* and 412*b* by the gripping-mechanism opener 422*a* may be limited and stopped at the required place one hitting the limiter 465. The limiter 465 parameters may be constant and/or adjustable. Parameters such as but not limited: height, length, etc. The limiter 465 material may be wood, metal, plastic, etc. The association of the limiter to the gripping-mechanism opener 422*a* may be chains, belts, rods, etc. 450. In some embodiments the distance from the limiter 465 to the gripping-mechanism opener 422*a* may be automatically adapted according to different criteria. Criteria such as job description, height of the piled pre-treated cardboards 420, and cardboard pre-treatmenter 402 height.

Some embodiments of the gripper mechanism 400 may further comprise a controller 460. The controller 460 may operate to coordinate or synchronize the different modules of the cardboard-handling system (not shown in the drawing) and the gripper mechanism 400. Examples of a controller 460 operation may be to obtain input from an operator; from sensors of one or modules of the cardboard-handling system; or from the automatic-adjustable stacker.

The synchronization may be between the arrival of a pre-treated cardboard 406 and the gripper mechanism 400 of the automatic-adjustable stacker; and/or the placement and/or height of the gripper mechanism 400 modules according to the pre-treated cardboard length/width/placement/velocity; and the like. The controller 460 may command one or more actuators of the gripper mechanism 400 and/or other one or more other modules of the AA stacker.

Some embodiments of automatic-adjustable stackers (AA stackers) may further act as sorters. Advantageously enabling a continuous stacking procedure with no need to stop and readjust for each pile, and/or pretreated cardboard, and/or job. The AA stacker may even act as a collating sorter by providing further control with regards to the adjustments, positioning and movements of the gripper mechanism 400.

Figure 15A:
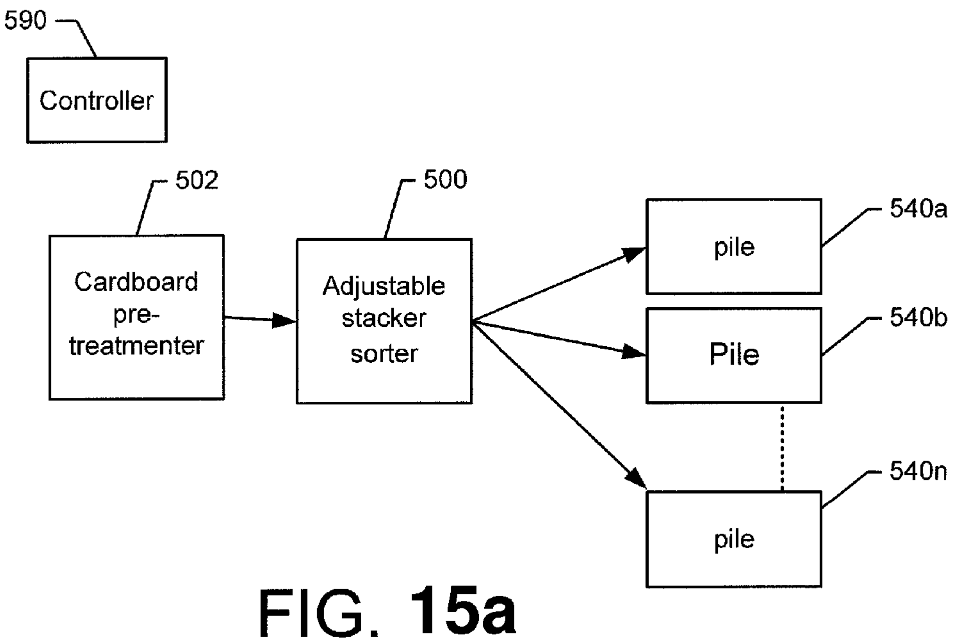
FIG. 15*a* is a schematic illustration of a conceptual portion of a block diagram with relevant elements of an embodiment of an AA stacker acting as a sorter as well as a stacker.

FIG. 15*a* is a schematic illustration of a conceptual portion of a block diagram with relevant elements of an embodiment of an AA stacker 500 acting as a sorter as well as a stacker. The AA stacker 500 may obtain pre-treated cardboards (not shown in drawing) from a cardboard pre-treatmenter 502. The AA stacker 500 may automatically adjust itself to transfer the pre-treated cardboard to a relevant pile of pre-treated cardboards 540*a*, 504*b* or 504*n*, while ensuring substantially no contact between the transferred pre-treated cardboard and the pile while the cardboard is being transferred and until it reaches its required position. The AA stacker 500 may automatically sort and transfer the pre-treated cardboards according to different criteria. Non-limiting examples of such criteria may include: different piles for different jobs; limitations on the number of pre-treated cardboards that each pile may have; various sorting requirements such as sorting according to languages printed in the pre-treated cardboards; collating and sorting; a combination of two or more of these as well as other options. A controller 590 may control the AA stacker modules and operation. The controller 590 may get information on a job and/or pre-treated cardboard from different modules of the cardboard pre-treatmenter 502, an operator, sensors, etc.

Figure 15B:
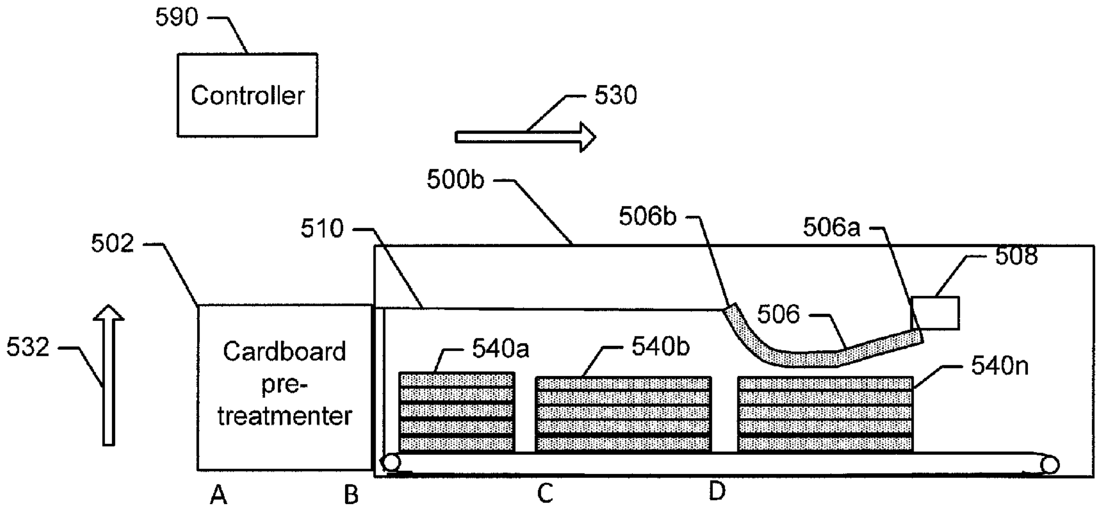
FIG. 15*b* schematically illustrates a simplified portion of a block diagram with relevant elements of an AA stacker that includes the functionality of sorting, transferring, and stacking pre-treated cardboards; according to teachings of the present disclosure.

FIG. 15*b* schematically illustrates a simplified portion of a block diagram with relevant elements of an AA stacker 500*b* that includes the functionality of sorting, transferring, and stacking pre-treated cardboards. Automatic-adjustable stacker (AA stacker) 500*b* may include a collector 504, a gripper mechanism 508, and an automatic-adjustable extender 510. The automatic-adjustable extender 510 may be used in a variety of different cases, such as when the collector 504 has a fixed length, when the collector 504 may be required to stay in a fixed position and different lengths of pre-treated cardboards may be used, when two or more piles 540*a*, 540*b*, and 540*n* are required, or when different jobs are required to be stacked separately.

The collector 504 may be placed according to the length of the longest pre-treated cardboard to be piled, and the adjusted extender 510 length may be adjusted (in a direction similar to the direction indicated by arrow 530) to the pre-treated cardboard length being piled at each time.

In some embodiments of the adjusted extender 510, the extender may have the capability for an automatic adjustment to the height (direction similar or opposite to direction of arrow 532). Thus the height of the automatic adjusted extender 510 may be adjusted according to the height of the highest pile of pre-treated cardboards and/or according to the height of the module before the automatic-adjustable stacker, etc. The automatic adjusted extender 510 may be made of metal, plastic, wood, etc. Its adjusted length and height may be by: electric actuators; pneumatic actuators motor; linear positioning mechanism; a combination of two or more of these as well as other options such as computer control, electro-mechanical controls and simply mechanical. A controller 590 may control the parameters of the automatic adjusted extender 510 according to the pre-treated cardboard and/or job. The collector may get information from: a cardboard pre-treatmenter 502 preceding the AA stacker; from other modules of the cardboard-handling system (not shown in the drawing) that the cardboard pre-treatmenter 502 is part of; from an operator; from sensors along the path; as well as a combination of two or more these sources.

Figure 16:
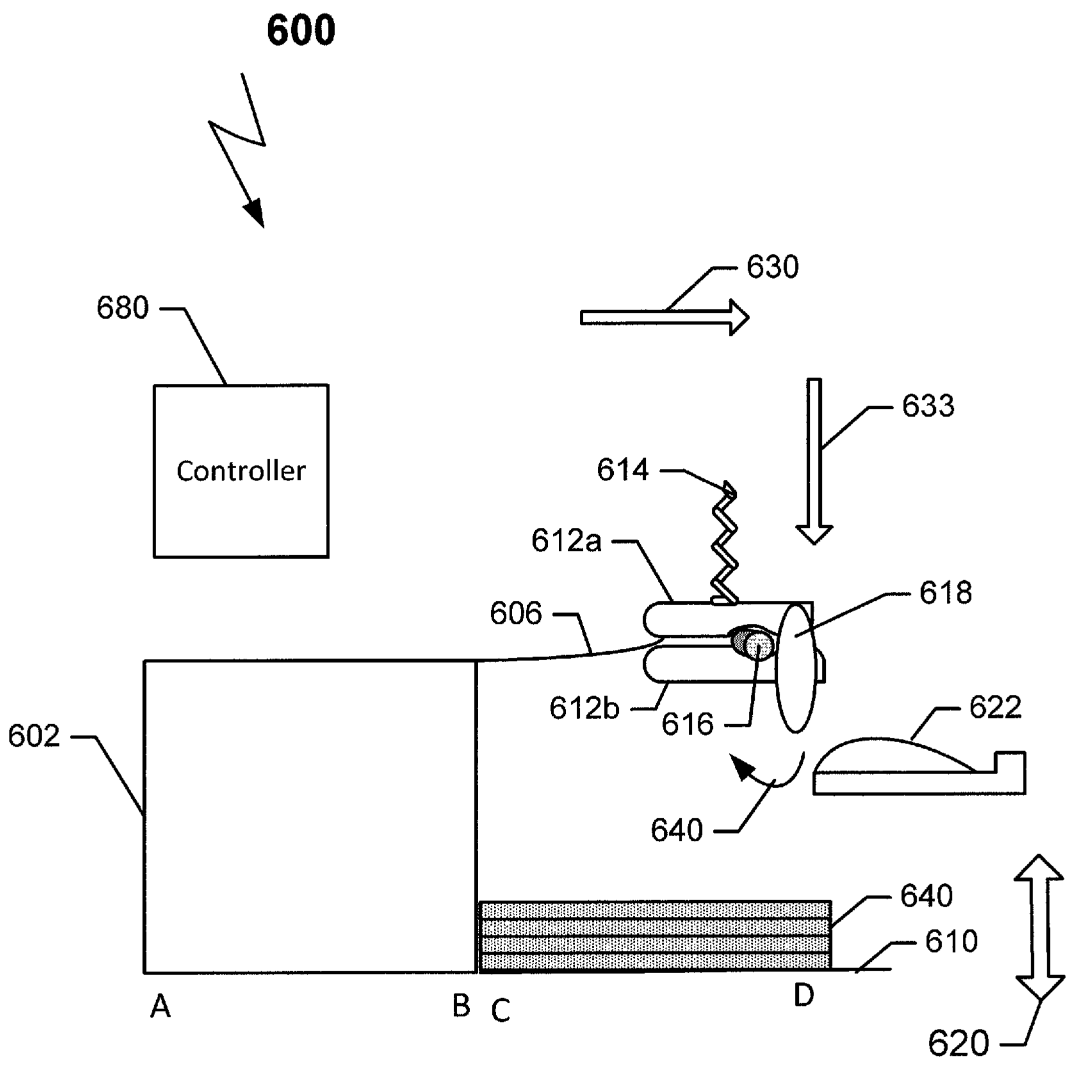
FIG. 16 schematically illustrates another simplified portion of a block diagram with relevant elements of an example of an embodiment of an automatic-adjustable stacker; according to teachings of the present disclosure.

FIG. 16 schematically illustrates another simplified portion of a block diagram with relevant elements of an example of an embodiment of an automatic-adjustable stacker 600. The automatic-adjustable stacker 600 may transfer a pre-treated cardboard 606 from a cardboard pre-treatmenter 602, for example, to a pile of pre-treated cardboards 640 piled in a collector 610. In some embodiments, the automatic-adjustable stacker 600 may be placed after a different module of a cardboard-handling system. For instance, the automatic-adjustable stacker 600 may be placed, after modules such as a laser, a die-rule and counter die, a conveyor, a printer, as well as other modules or elements of a cardboard-handling system or similar systems that operate with other media that may have similar characteristics.

The automatic-adjustable stacker 600 may transfer the pre-treated cardboard 606 to the top surface of the pre-treated cardboard pile 640, while ensuring minimum contact between the transferred pre-treated cardboard 606 and the surface of the pile 640 (or the collector 610 for the firsts processed cardboard) until the transferred pre-treated cardboard 606 reaches a required place. An example of a required place may be when the leading edge of the pre-treated cardboard 606 has reached point D of the collector 610.

In some embodiments, an automatic-adjustable stacker 600 may automatically adjust the placement of the collector 610 (in directions similar to arrow 630 or in the opposite direction) to a required place, relative to the cardboard pre-treatmenter 602.

The required place for the collector 610 may be placement of point C of the collector 610 adjacent to the final edge (point B) of the cardboard pre-treatmenter 602.

Other examples of the required placement may be based on the length of the pre-treated cardboard. For example, the point D of the collector 610 may be adjusted to a certain distance from point B of the pre-treatmenter 602 based on the length of the pre-treated cardboard 606 that needs to be transferred. The length of the pre-treated cardboard 606 may be entered by an operator and/or may be measured by one or more sensors along the cardboard-handling system of which the cardboard pre-treatmenter 602 is operating.

An automatic-adjustable stacker 600 may get the leading edge of a pre-treated cardboard 606 that needs to be transferred by a gripping mechanism 612*a* and 612*b*, for example. The gripping mechanism 612*a* and 612*b* may grip the pre-treated cardboard leading edge from substantially the end edge (point B) of the cardboard pre-treatmenter 602, and lead or guide it toward the pile 640 of pre-treated cardboards piled in the collector 610 (or the collector 610 for the first fed cardboard) in a direction similar to direction shown by arrow 630, while the trailing edge is supported on the pre-treatmenter 602.

The gripping mechanism 612*a* and 612*b* may release the pre-treated cardboard 606 when its leading edge reaches a required place or position. For example, the required place may be: when leading edge of the pre-treated cardboard 606 is substantially close to point D of the collector 610; and/or when the trailing edge of the pre-treated cardboard 606 is substantially close to point B of the pre-treatmenter 602.

Some embodiments of the gripping mechanism 612*a* and 612*b* may comprise a clip-like shape as shown in the drawing: 612*a* and 612*b* surrounding an axis 616. The clip-like shape gripping mechanism may further comprise a counter spring 614 that may act as a closing mechanism of the clip-like shape gripping mechanism, by imposing force in a direction similar to direction of arrow 633 or biasing the upper portion of the clip 612*a* in the direction of arrow 633. The length of the clip-like shape gripping mechanism may be such that it may allow gripping a pre-treated cardboard 606 easily. An arm 618 may be associated with one of the portions of the clip, such as the upper portion of the clip 612*a*, for instance. The arm 618 may pivot in a direction similar to arrow 642, thus creating a counter force to the spring 614 and opening the gripping mechanism 612*a* and 612*b*. The automatic-adjustable stacker 600 may further include a gripping-mechanism opener 622. The gripping-mechanism opener 622 may comprise a gradual arch cam. When the gripping mechanism grips the pre-treated cardboard 606 from its leading edge and pulls it toward the pile of pre-treated cardboards 640 in a direction similar to direction shown by arrow 630, the gripping-mechanism opener 622 may be placed automatically substantially near the place where the pie-treated cardboards 606 is required to be released (point D for, example). The arm 618 may follow the gradual arch cam of the gripping-mechanism opener 622 when the arm 618 comes in contact with the gripping-mechanism opener 622 and thus, cause the arm 618 to pivot in a clockwise direction similar to arrow 642. The interaction of the arm 618 against the cap 622 results in opening the clip-like shape gripping mechanism 612*a* and 612 *b* and releasing the pre-treated cardboard 606 at its required place. The placement of the gripping-mechanism opener 622 may be adjusted automatically according to the length of the pre-treated cardboard 606, for example.

The gripping-mechanism opener 622 placement may be automatically adjusted to open the gripping mechanism 612*a* and 612*b* when the gripping mechanism 612*a* and 612*b* gets the pre-treated cardboard from the edge of the cardboard pre-treatmenter 602. The gripping-mechanism opener 622 placement may be automatically adjusted to open the gripping mechanism 612*a* and 612*b* when the pre-treated cardboard 606 needs to be released. The gripping-mechanism opener 622 placement may be automatically adjusted by auto electric actuator; pneumatic actuator; motor linear positioning mechanism, computer controlled devices, electro-mechanical as well as mechanical devices, etc.

In some embodiments in which there may be a plurality of sets of gripping mechanisms 612*a* and 612*b* there may be a plurality of gripping-mechanism openers 622. Other embodiment may comprise a single gripping-mechanism opener 622 and have the arm 618 associated to the plurality of clip-like shapes 612*a* the plurality of gripping mechanisms. The association may be via a mutual rod (not shown in drawing) that may be long and pass through the plurality of clip-like shape gripping mechanism.

The height 626 of the gripping mechanism 612*a* and 612*b* and/or the gripping-mechanism opener 622 may be automatically adapted according to different criteria. Criteria such as, but not limited to: job description, the height 620 of the piled pre-treated cardboards, the height of the cardboard pre-treatmenter 602, etc. Basically, the gripping-mechanism 612*a* and 612*b* and the gripping-mechanism opener 622 can be adjust automatically during operation to help reduce destructive forces that may be imposed on the cardboard 606.

Some embodiments of an AA stacker 600 may further comprise a controller 680. The controller 680 may synchronize between the different modules of the cardboard pre-treatmenter 602 and the automatic-adjustable stacker 600. The controller 680 may obtain inputs from: an operator; sensors along the path of the cardboard pre-treatmenter 602; the AA stacker 600; and so on.

The synchronization may be: between the arrival of a pre-treated cardboard 606 and the gripping mechanism 612*a* and 612*b* of the AA stacker 600; and/or the placement and/or height of the AA stacker modules (gripping mechanism 612*a* and 612*b* and/or opener 622) according to the length, width, placement and/or velocity of the pre-treated cardboard 606; or the like. The controller 680 may command one or more actuators of the AA stacker modules 600 and/or one or more other modules of the cardboard pre-treatmenter 602.

Figure 17:
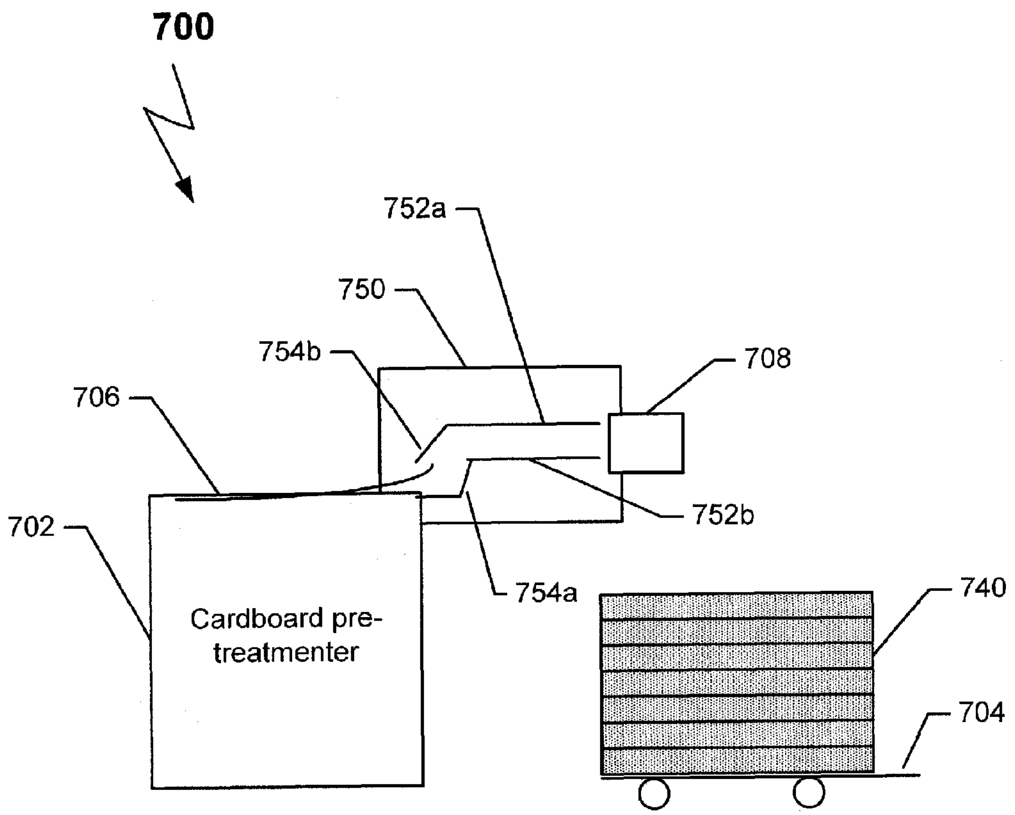
FIG. 17 schematically illustrates a simplified portion of a block diagram with relevant elements of an example of an embodiment of an AA stacker's cardboard guide.

FIG. 17 schematically illustrates a simplified portion of a block diagram with relevant elements of an example of an embodiment of an AA stacker 700. AA stacker 700 may be similar to the AA stacker illustrated in FIG. 13*a-e* and may further comprise a cardboard-guider 750. Some embodiments of a cardboard-guider 750 may comprise a lifter 754*a* and a director 754*b*.

The lifter 754*a* and the director 754*b* may be substantially flat objects with a pre-defined angle that corresponds to and interfaces with the cardboard pre-treatmenter's 702 surface to which the cardboard-guider 750 may be automatically associated. As a non-limiting example, the angle may be 15 degrees for both the lifter 754*a* and the director 754*b*. The angel may be automatic adjustable in some embodiments. The adjustments may be based on parameters of a pre-treated cardboard 706, for example, such as but not limited to: fiber direction, thickness, width, length, layout, etc.

The angle of the lifter 754*a* may be such that a when a pre-treated cardboard 706, conveyed toward the cardboard-guider 750 via a module of the pre-treatmenter 702, encounters the angle of the lifter 754*a* it will be forced to rise or be lifted. Once lifted, it will encounter the director 754*b* which angle will lower the pre-treated cardboard 706 toward a guider 752*a* and 752*b*. Through the guider 752*a* and 752*b* the pre-treated cardboard 706 may move forward toward the automatic-adjustable gripper mechanism 708 of the automatic-adjustable stacker 700. The gripper mechanism 708 may then grab the pre-treated cardboard 706 and convey it toward a pile 740 of pre-treated cardboards previously received and placed on a collector 704.

Figure 18A:
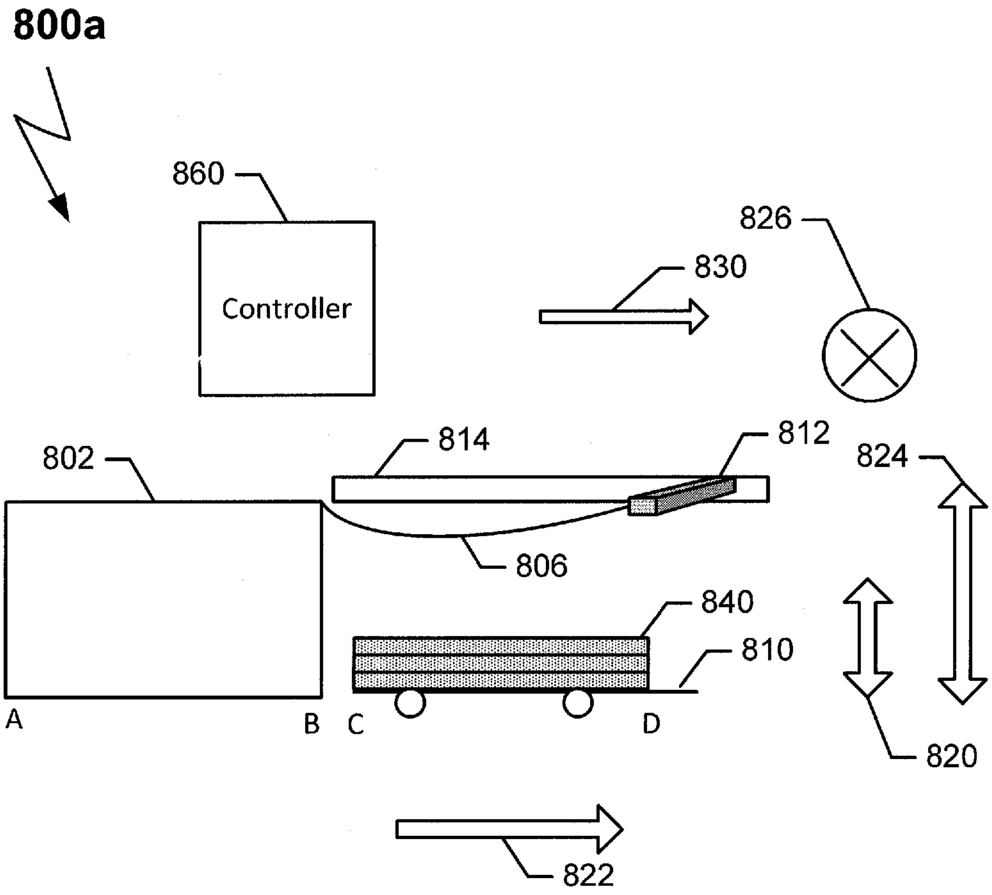
FIG. 18*a* schematically illustrates a simplified portion of a block diagram with relevant elements of another example of an embodiment of an AA stacker; according to teachings of the present disclosure.

FIG. 18*a* schematically illustrates a simplified portion of a block diagram with relevant elements of another exemplary embodiment of an AA stacker 800*a*. The AA stacker 800*a* may transfer a pre-treated cardboard 806 from a cardboard pre-treatmenter 802, for example, to a pile 840 of pre-treated cardboards piled in a collector 810. In some embodiments, AA stacker 800*a* may be placed after different or additional modules of a cardboard pre-treatmenter 802.

Thus, AA stacker 800*a* may be placed, after modules such as a laser, a die-rule and counter die, a conveyor, or a printer.

AA stacker 800*a* may transfer the pre-treated cardboard 806 to the top surface of the pre-treated cardboard pile 840, while ensuring minimum contact between the transferred pre-treated cardboard 806 and the surface of the pile 840 until the transferred pre-treated cardboard 806 reaches a required place. The required place or position may when the leading edge of the pre-treated cardboard 806 has reached point D of the collector 810, for instance.

In some embodiments, AA stacker 800*a* may automatically adjust the placement of the collector 810 (in directions similar to arrow 822 or in the opposite direction) to a required place or position, relative to the cardboard pre-treatmenter 802. The required place or position may be placement of point C of the collector 810 adjacent to the final edge (point B) of the cardboard pre-treatmenter 802, or a certain distance relative to the front edge (point A) of the cardboard pre-treatmenter 802.

Other examples of placement may be based on the length of the pre-treated cardboard 806 and the distance point D of the collector 810 needs to be from point B of the pre-treatmenter 802 to accommodate the lengths of the pre-treated cardboard 806 dimension parameters that are being transferred. The length of the pre-treated cardboard 806 may be entered by an operator and/or may be measured by one or more sensors along the cardboard pre-treatmenter 802.

Exemplary AA stacker 800*a* may receive the leading edge of a pre-treated cardboard 806 that needs to be transferred, by a gripping mechanism 812, for example. The gripping mechanism 812 may grip the leading edge of the pre-treated cardboard 806 from substantially the edge of the cardboard pre-treatmenter 802, and lead or guide it toward a pile 840 of pre-treated cardboards piled in the collector 810 in a direction similar to direction shown by arrow 830, while the trailing edge is supported on the pre-treatmenter 802.

The gripping mechanism 812 may release the pre-treated cardboard 806 when the leading edge of the pre-treated cardboard 806 reaches a required place or position. Examples of required positions may be point D of the collector 810 and/or when the trailing edge of the pre-treated cardboard 806 passes point B of the pre-treatmenter 802.

The gripping mechanism 812 may be associated to a bar 814. The association may be by wheels on a track, a belt, rotating chain mechanism, linear guide motor, rails, rollers, etc. The gripping mechanism 812 may move along the bar 814 in a direction similar to arrow 830 and/or reversal. The height 824 of the gripping mechanism 812 and the bar 814 may be adapted according to different criteria, such as job description, height of the piled pre-treated cardboards 820, cardboard pre-treatmenter 802 height, and job layout.

In some embodiments the bar 814 and/or gripping mechanism 812 may move in direction similar or opposite to arrow 826 (perpendicular to arrow 830). In other embodiments a combination of the different directions may be embodied. The gripping mechanism 812 may comprise a plurality of automatic-adjustable grippers. Examples of grippers may be clamps, grippers, vacuum, and combinations thereof. In some embodiments the plurality of automatic-adjustable grippers 812 may be individual sub units, and/or an array of automatic-adjustable grippers 812 connected to a single rod.

Some embodiments may further comprise a controller 860. The controller may synchronize between the different modules of the cardboard pre-treatmenter 802 and the AA stacker 800*a*. An exemplary controller 860 may obtain input from: an operator; sensors; one or modules of a cardboard-handling system of which the cardboard pre-treatmenter 802 is part; from the automatic-adjustable stacker 800*a*; etc.

The synchronization may be between the arrival of a pre-treated cardboard 806 and the gripping mechanism 812 of the automatic-adjustable stacker; and/or the placement and/or height of the automatic-adjustable stacker modules according to the length, width, placement and/or velocity of the pre-treated cardboard 806. The controller 860 may command or control one or more actuators of the automatic-adjustable stacker modules and/or other one or more other modules of the cardboard-handling system that the cardboard pre-treatmenter 802 is part of.

Thus, the controller may control a continuous motion the AA stacker 800*a* and the movement of the pre-treated cardboard 806. Advantageously, the pre-treated cardboard 806 does not have to be stopped and accelerated which helps to alleviate or prevent separation and damage of the pre-treated cardboard 806. Advantageously, such handling results in the benefit of using less joints 214*a-e* (FIG. 2*b*) in the cardboard.

Figure 18B:
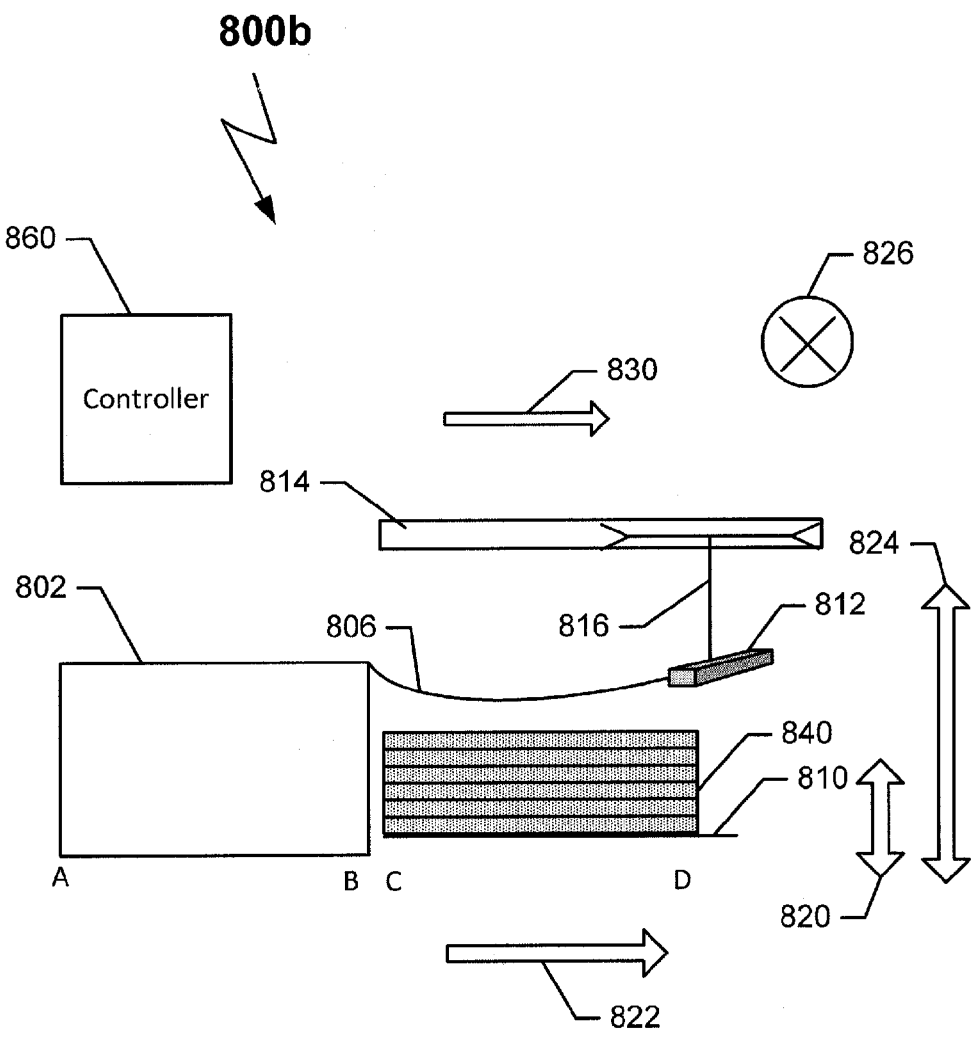
FIG. 18*b* schematically illustrates a simplified portion of a block diagram with relevant elements of yet another example of an embodiment of an AA stacker; according to teachings of the present disclosure.

FIG. 18*b* schematically illustrates a simplified portion of a block diagram with relevant elements of yet another exemplary embodiment of an AA stacker 800*b*. The illustrated AA stacker 800*b* may be similar to AA stacker 800*a*. In the illustrated AA stacker 800*b*, the gripper mechanism 812 may be associated with the bar 814 using one or more links linear guide 816, for example. The one or more links linear guide 816 may be associated with the bar 814 by wheels on a track, for example. The gripping mechanism 812 may move along the bar 814 in a direction similar to arrow 830 and/or reversal, for instance.

The height 824 of the gripping mechanism 812 may be automatically adjusted based on different criteria, such as, but not limited to the job description, the pile height of the pre-treated cardboards 820, and the height of the cardboard pre-treatmenter 802. The gripping mechanism 812 may comprise a plurality of automatic-adjustable grippers.

Figure 18C:
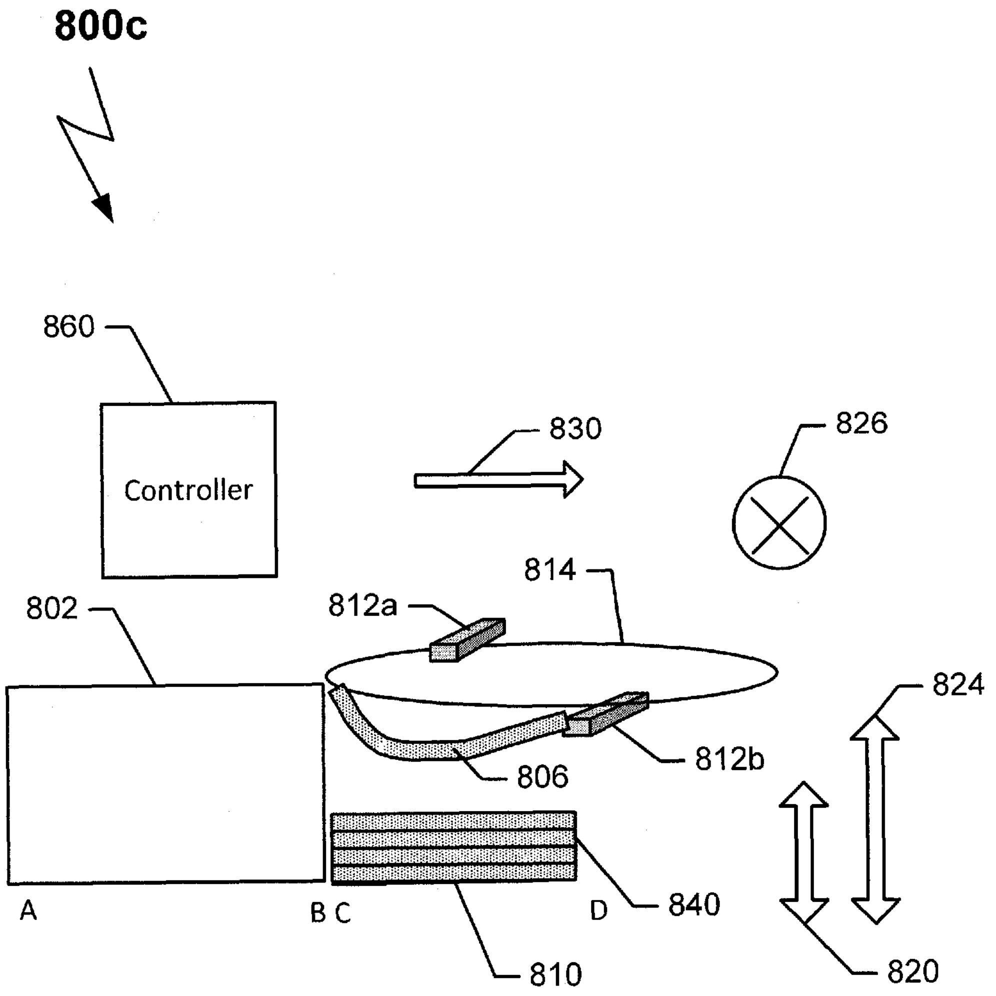
FIG. 18*c* schematically illustrates a simplified portion of a block diagram with relevant elements of yet another example of an embodiment of an AA stacker; according to teachings of the present disclosure.

FIG. 18*c* schematically illustrates a simplified portion of a block diagram with relevant elements of yet another exemplary embodiment of an AA stacker 800*c*. The AA stacker 800*c* may be similar to the AA stacker 800*a* illustrated in FIG. 18*a*. In AA stacker 800*c*, the gripper mechanism 812*a* and 812*b* may be associated with a cyclic belt 814. The cyclic belt 814 may be automatically adjusted in its length, in its height 824, in its placement similar or opposite to the direction of arrows 830 and/or 826. Associated with the cyclic belt 814 may be one or more gripper mechanisms 812*a* and 812*b*. The distance between the two or more gripper mechanism 812*a* and 812*b* may be automatically adjusted according to the maximum length of the pre-treated cardboard 806 that needs to be transferred from the cardboard pre-treatmenter 802 to the collector 810, for instance.

Other embodiments of the AA stackers may operate to get the pre-treated cardboard at both of its edges.

Figure 19A:
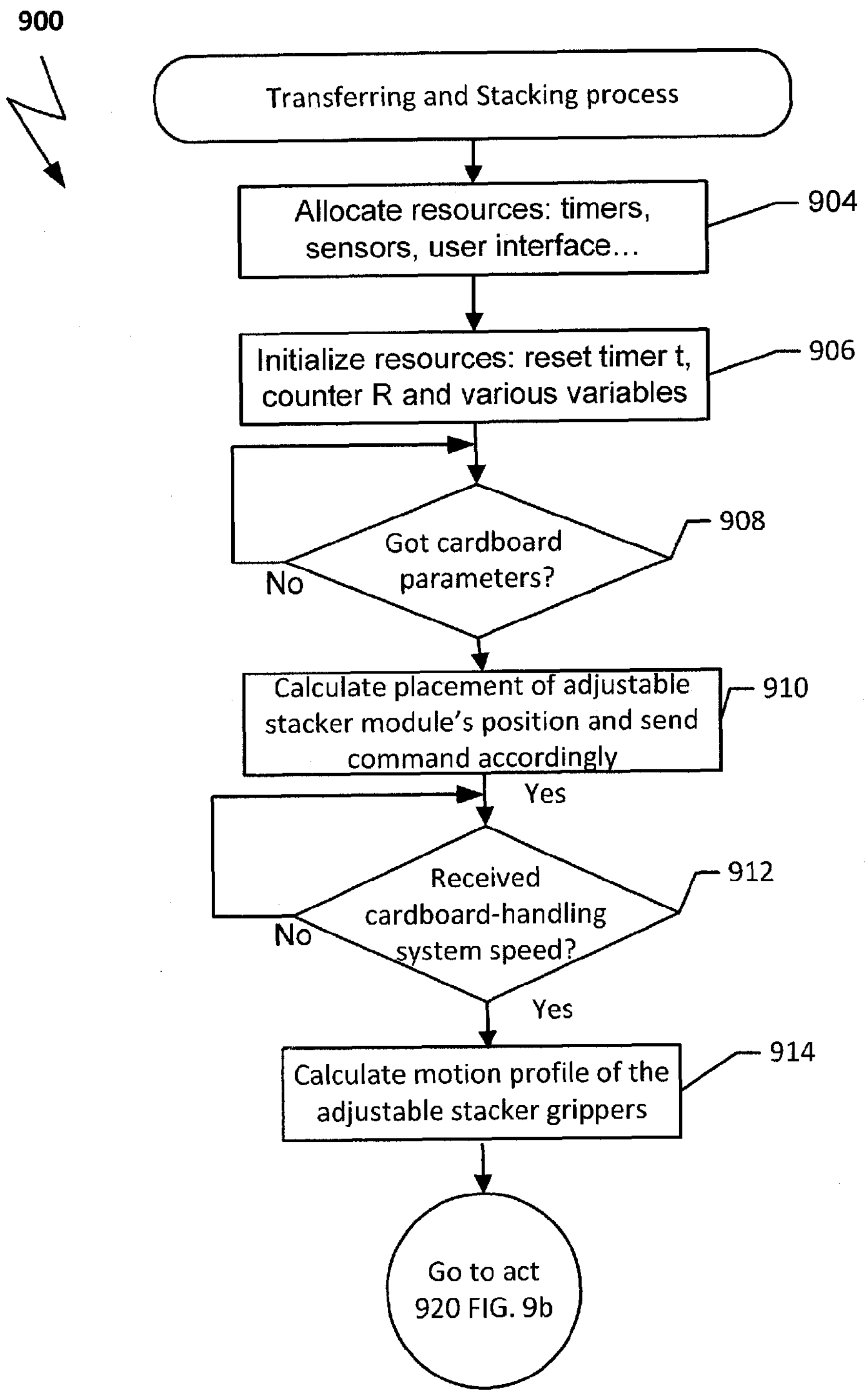
FIG. 19*a* and FIG. 19*b* are flowchart diagrams illustrating various relevant actions of an exemplary embodiment of method that may be implemented by various embodiments of the AA stacker, according to teachings of the present disclosure.
Figure 19B:
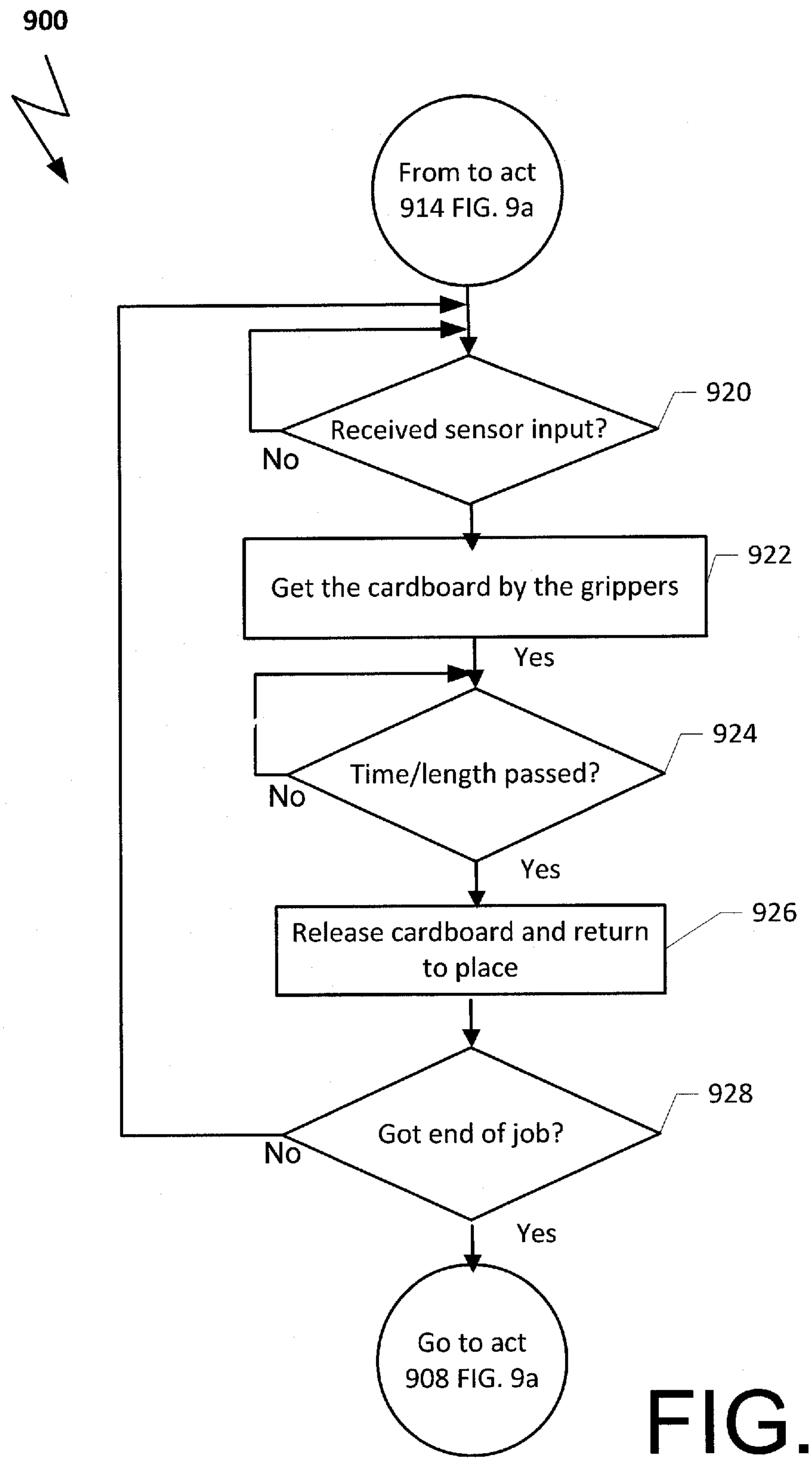

FIG. 19*a* and FIG. 19*b* are flowchart diagrams illustrating various actions of an exemplary embodiment of method 900 that may be implemented by various embodiments of the AA stacker. Method 900 can be used for transferring and stacking pre-treated cardboards while ensuring minimum contact between the transferred pre-treated cardboard and the pile of pre-treated cardboards, until the moving cardboard reaches its final destination.

Method 900 may begin at power up of a system in which it is part of, and/or when stacking of pre-treated cardboard is required. Method 900 may be software instructions, stored in a memory element and read out and executed by a controller, for example. At act 904, method 900 may allocate different resources. The allocated resources may include resources such as, but not limited to: timers, sensors, memory storage, inputs from a user, etc. Inputs from a user may be pre-treated cardboard parameters, for instance. Pre-treated cardboard parameters may include metrics such as the: length, thickness, width, velocity, etc. Other inputs may be the number of pre-treated cardboards that need to be piled in each pile, and the number of proof (sampling pre-treated cardboards) in another place for sampling (sampling tray, for instance).

After such allocations, an initialization sequence 906 may begin. Initialization may include: resetting one or more timers, counters, commands for placement of modules, homing position, etc. Next, the method 900 may wait 908 for information on pre-treated cardboards parameters and/or on pile requirements, etc. According to information thus obtained, the method 900 may determine 910 the required placement of different modules of an AA stacker and send the appropriate commands may be sent 910 toward the relevant modules. For example: the placement of the collector of the AA stacker; placement of a gripping mechanism opener 822; placement a gripping mechanism, etc.

Information regarding the pre-treated cardboard arriving from a module before the automatic-adjustable stacker may be obtained 912. For instance, this information may include the velocity, speed, weight, etc. of the pre-treated cardboard. Accordingly, velocity of the gripping mechanism and/or gripping-mechanism opener 822 of the AA stacker may be determined and/or obtained 914 by the relevant modules. A motion profile may be calculated and determined. Motion profile may include placements of modules, their velocity, accelerations and so on.

Next method 900 may wait 920 for a pre-treated cardboard to pass a certain area. A sensor may detect that the pre-treated cardboard has passed the certain area and up-date method 900. Placement may be substantially the end edge of a module right before the AA stacker.

The automatic-adjustable grippers of the AA stacker may then grab the pre-treated cardboard and pull 922 it toward the required place. Examples of a required place may be the point at which the trailing edge of the pre-treated cardboard reaches substantially the end of the end edge of a module right before the AA stacker, for example. This may be determined 924 according to information on the pre-treated cardboard's length, the velocity of the automatic-adjustable gripper of the AA stacker, the time passed, input from one or more sensors, and a combination thereof.

Accordingly, the pre-treated cardboard may be released 926 from the automatic-adjustable grippers. If 928 more pre-treated cardboards are needed to be transferred, the method 900 may return to act 920 to receive the next cardboard. Otherwise, if no additional cardboards remain to be transferred 928 the method 900 may return to act 908 FIG. 19*a*.

Figure 20:
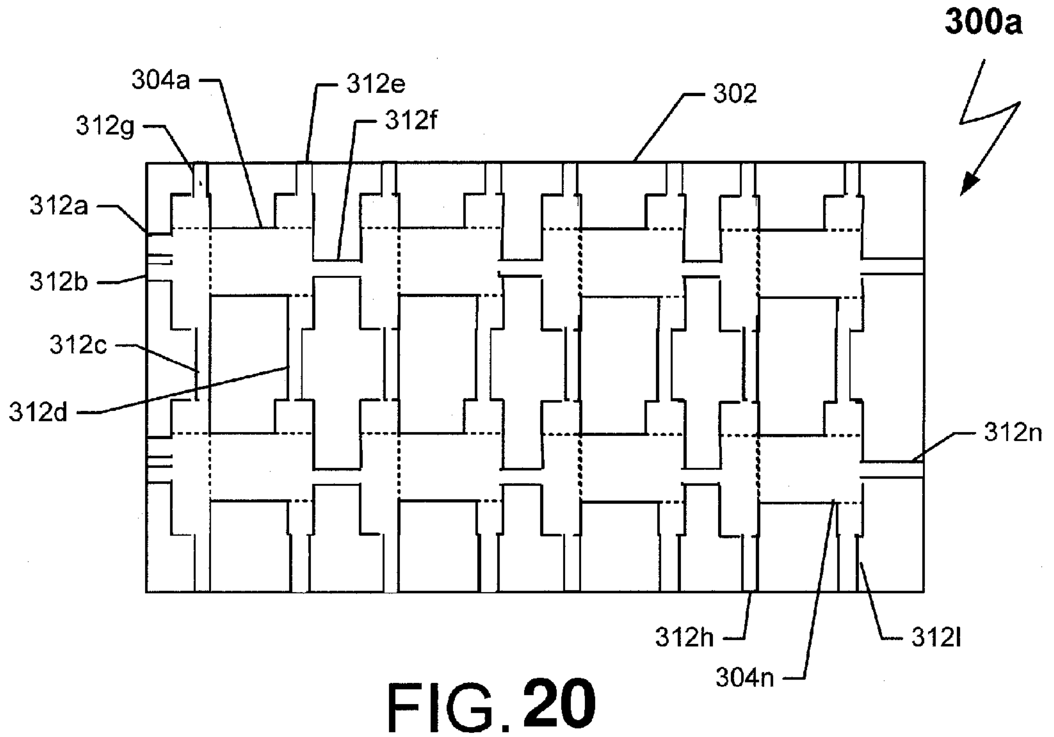
FIG. 20 schematically illustrates a simplified example of a design of a stripped pretreated cardboard.

FIG. 20 schematically illustrates a simplified example of a design of a stripped pretreated cardboard 300*a*. A plurality of sections 304*a-n* are illustrated as being connected to one or more adjacent sections and connected to a surrounding border 302 by joints 312*a-n*. The stripped pretreated cardboard 300*a* can incorporate any of a variety of pretreated cardboards such as the pretreated cardboard 200*a* (FIG. 2A) stripped from the cardboard areas surrounding the sections and the joints. The stripping may be done by cutting the pretreated cardboard 200*a* along the borders of each section 304*a-n* and its joints 312*a-n*; and separating the connected sections and joints from the excess waste cardboard (not shown in drawing).

Figure 21:
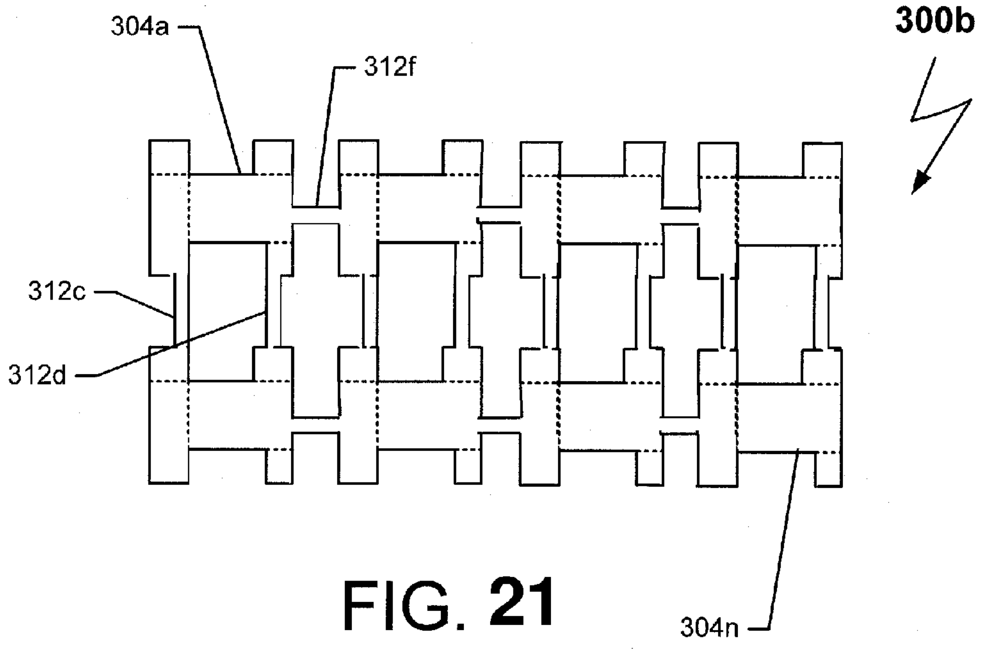
FIG. 21 schematically illustrates a simplified example of a design of a stripped and blanked pre-treated cardboard.

FIG. 21 schematically illustrates a simplified example of a design of a stripped and blanked pretreated cardboard 300*b*. A plurality of sections 304*a-n* are illustrated as being connected to one or more other sections by one or more joints 312*a-n*. The stripped and blanked pretreated cardboard 300*b* may be the pretreated cardboard 200*a* (FIG. 2A) stripped from the cardboard areas surrounding the sections and the joints, and stripped (blanked) from the surrounding boarder. The stripping and blanking may be done by cutting the pretreated cardboard 200*a* along the borders of each section 304*a-n* and its joints 312*a-n*; and separating the connected sections and joints from the excess waste cardboard (not shown in drawing) including the joints connecting the pre-treated cardboard's boarder to the sections.

Figure 22:
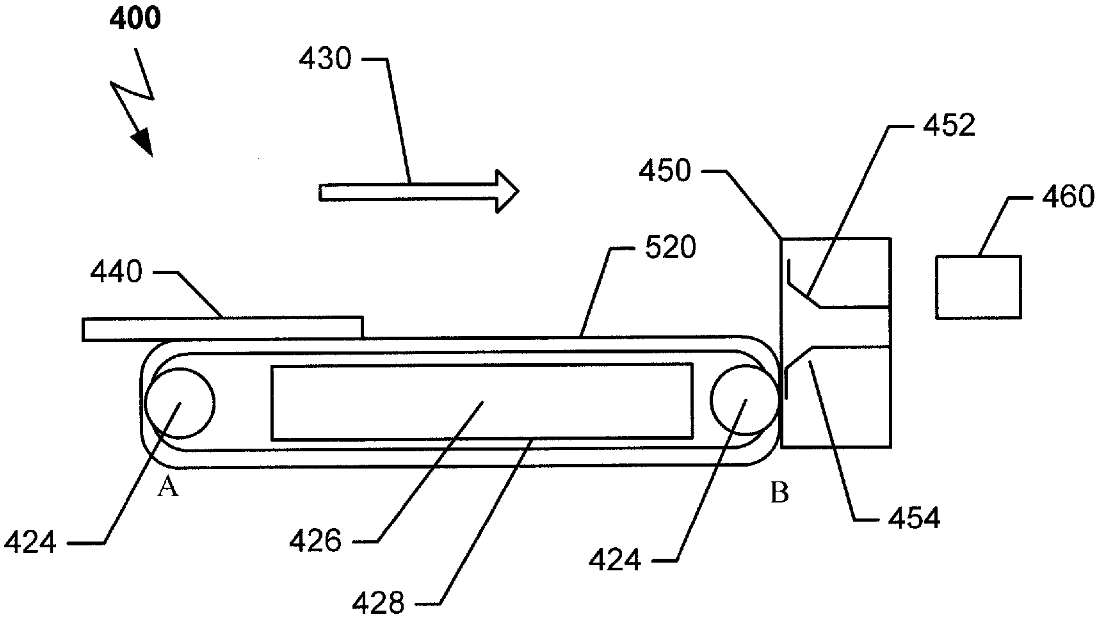
FIG. 22 depicts a schematic illustration of a simplified block diagram with relevant elements of an example of an embodiment of a vacuum sorter, according to teachings of the present disclosure.

FIG. 22 depicts a schematic illustration of a simplified block diagram with relevant elements of an example of an embodiment of a vacuum sorter 400. The illustrated vacuum sorter 400 may be part of a cardboard-handling system. In other embodiments the vacuum sorter 400 may be an independent system that may or may not be incorporated or operated in conjunction with specific systems of the present invention.

The illustrated embodiment of the vacuum sorter 400 is shown as including: a vacuum chamber 426 that may generate vacuum and a belt 420 with a plurality of openings or apertures that fully penetrate through the belt 420 from the top surface and to the bottom surface (openings not shown in drawing). The belt 420 can be moved by two pulleys 424 at points A and B.

The vacuum sorter 400 may be synchronized with one or more modules of the cardboard-handling system. In some exemplary embodiments, the synchronization may be realized by using a timing belt that is associated with or mechanically coupled to the belt 420 and to another module of the cardboard handling system, for instance. Thus, the belt 420 may start its movement and maintain a particular speed or velocity according to synchronizing inputs or controlling mechanisms.

Other synchronizing mechanisms may include one or more servo drivers and electronic synchronization. Two or more axis 422 may be used by the belt 420 as axis points to pivot around when moving in directions similar to arrow 430.

In some embodiments, the belt 420 may be constructed of a plurality of straps and the straps may include holes, apertures or other opening entirely extending through the straps. In other embodiments, the straps may be constructed without holes and rather, include gaps between two or more straps for the application of suction pressure underneath to secure the cardboard 440.

Some embodiments may further comprise a leader 450. A pre-treated cardboard 440 may be obtained at point A and conveyed by the belt 420 toward the other end (point B). On the other edge (point B) the leader 450 may receive the pre-treated cardboard 440.

An example of an embodiment of a leader 450 may comprise an upper arm with an angle 452 (15 degrees, for instance) and a lower arm with an angle 454 (15 degrees, for instance). When the pre-treated cardboard arrives to the edge (point B) it may hit one of the arms of the leader 450 and bounce toward the center of the leader 450, and/or bounce toward the other arm and then enter the leader 450. The angle of the arms may be configured according to different criteria and the illustrated embodiment is simply a non-limiting example. Non-limiting examples of the criteria that may affect the configuration of the leader 450 include cardboard parameters and velocity of the cardboard. Thus, in some embodiments the upper and lower arms may be constructed as illustrated, utilize a different angle, utilize an arching transition rather than an angle, use only an upper angle and ensure the lower arm is below the belt 420, or utilize only a lower angle and ensure that the upper arm is substantially above the belt.

A peeler 460 may get the pre-treated cardboard from the leader 450. The peeler may in corporate a gripping mechanism or some other technique to secure the cardboard 440. The peeler 460 may grip an area of the pre-treated cardboard and encourage or bias it toward a collector (not shown in drawing) in the direction of arrow 430, for example. Advantageously, the area of the pre-treated cardboard gripped by the peeler 460 and the attached joints and their sections are peeled from the vacuum belt 420. The waste is left on the vacuum belt 420.

The waste may be removed from the vacuum belt 420 (such as a vacuum needle belt) by employing one or more different techniques. A non-limiting example of one such technique includes ensuring that the lower surface 428, or at least substantial portions thereof, of the vacuum chamber 426 may have no openings. Thus, when waste attached to the belt arrives to the lower surface 428 that does not include a fluid communication to the vacuum chamber 426, it may fall due to gravitation and no vacuum.

Figure 23:
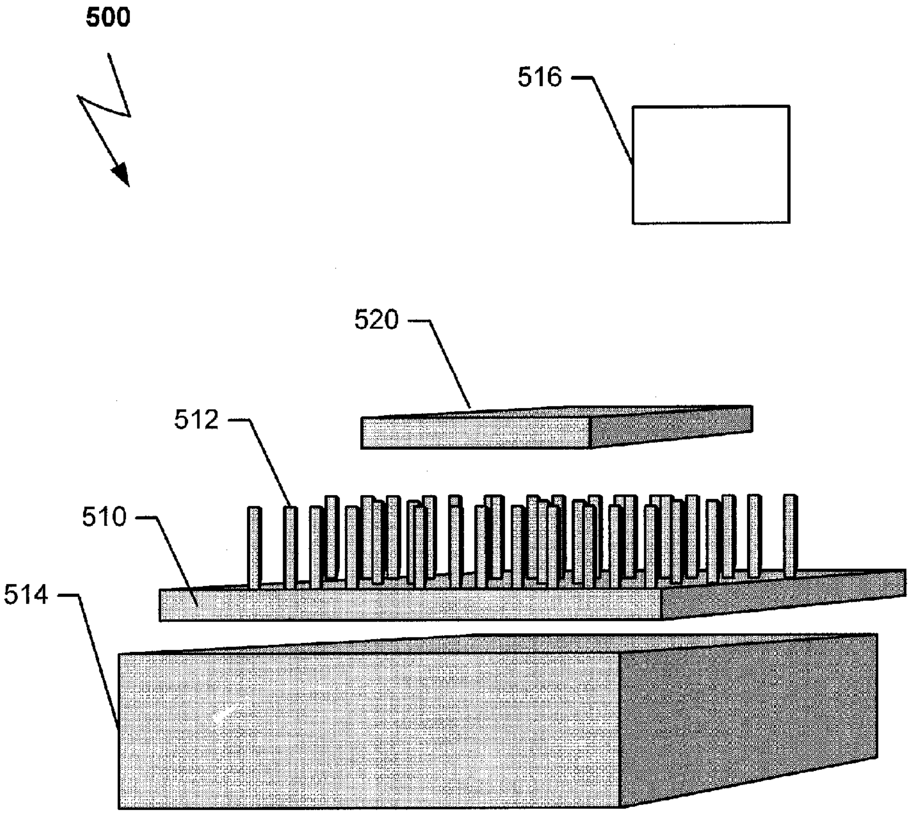
FIG. 23 depicts a schematic illustration of a simplified block diagram with relevant elements of an example of an embodiment of an under-laser vacuum sorter, according to teachings of the present disclosure.

FIG.-23 depicts a schematic illustration of a simplified block diagram with relevant elements of an example of an embodiment of an under-laser vacuum sorter 500. The under-laser vacuum sorter 500 may stabilize a cardboard 520 in a fixed position while a laser 516 applies a pre-treatment to the cardboard 520. The under-laser vacuum sorter 500 may be similar to the vacuum sorter 400 of FIG. 22 and may further comprise: a plurality of protruding elements 512, positioned substantially parallel to each other.

The plurality of protruding elements 512 may be extended from a base 510. Exemplary protruding elements 512 may have a needle-like shape, for example. Exemplary base 510 may be a polymer based material as a non-limiting example. In some exemplary embodiments, the material of the base 510 may be a glass fiber weaved to a textile. Other non-limiting examples of material that may be used for the base 510 include nano-structured surfaces and carbon fiber material.

The cardboard 520 may be placed in a substantially horizontal position on the top of the protruding elements 512. A coupling and stabling mechanism may be used to couple and stabilize the cardboard to the top of the protruding elements 512. An example of a coupling and stabling mechanism may comprise a plurality of openings in the base 510 (not shown in drawing) and a suction mechanism may be used. The suction mechanism may be a vacuum generator 514, for example. The suction mechanism may couple and stabilize the cardboard to the top of the protruding elements 512.

In some embodiments the base may be constructed of or configured as a plurality of straps. The straps may include holes that fully penetrate through the belt. In other embodiments, the straps may not include holes, but rather include gaps between two or more straps for the suction underneath to be applied to the surface of the cardboard 520.

Figure 24:
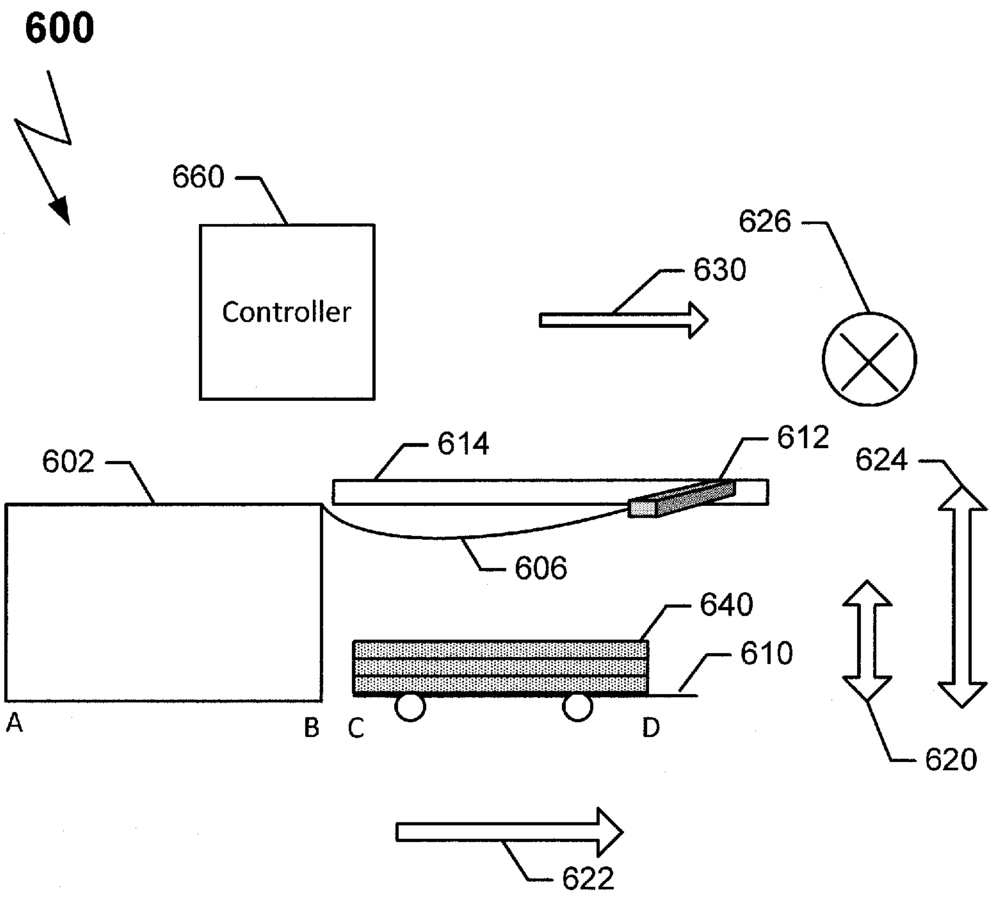
FIG. 24 schematically illustrates a simplified portion of a block diagram with relevant elements of an example of an embodiment of a peeler, according to teachings of the present disclosure.

The base 510 of the under-laser vacuum sorter 500 may be a conveying belt, as a non-limiting example. The base 510 can travel conveying the cardboard 520 under the laser 516. Synchronization may be implemented between the under-laser vacuum sorter 510 and one or more modules of the cardboard-handling system, for example. FIG. 24 schematically illustrates a simplified portion of a block diagram with relevant elements of an example of an embodiment of a peeler 600. The peeler 600 may transfer or assist in the transfer of jointed sections and/or sections, for example, to a pile 640 in a collector 610.

One embodiment of a peeler 600 may include a gripping mechanism 612. The gripping mechanism 612 may get an area of a pre-treated cardboard, such as the leading edge of a pre-treated cardboard 606 for instance. The various sections of the pre-treated cardboard 606 is attached to the leading edge of the pre-treated cardboard by one or more joints. The gripping mechanism 612 may grip the leading edge of the pre-treated cardboard 606 from substantially the edge of a vacuum sorter 602, and lead or guide the pre-treated cardboard 606 toward a pile 640 that may accumulate in collector 610, the movement being in the direction of arrow 630. Advantageously, the waste can be maintained on the vacuum sorter belt rather than accumulating in the collector 610.

The gripping mechanism 612 may be associated with a bar, trail or track or other conveyance mechanism 614. The association may be by wheels on a track, a belt, rotating chain mechanism, linear guide motor, rails, rollers, etc. The gripping mechanism 612 may move along the conveyance mechanism 614 in a direction similar to arrow 630 and/or reversal. The height 624 of the gripping mechanism 612 and the conveyance support 614 may be adapted according to different criteria, such as, but not limited to job description, height of the pile 620, vacuum sorter 602 height, or job layout.

In some embodiments, the conveyance mechanism 614 and/or gripping mechanism 612 may move in direction similar or opposite to arrow 626 (perpendicular to arrow 630). In other embodiments a combination of the different directions may be embodied. The gripping mechanism 612 may comprise a plurality of automatic-adjustable grippers. Examples of grippers may include, but are not limited to: clamps, grippers, vacuum, and a combination of two or more such techniques. In some embodiments, the plurality of automatic-adjustable grippers 612 may be individual sub-units, and/or an array of automatic-adjustable grippers 612 connected to a single rod.

Some embodiments may further comprise a controller 660. The controller 660 may synchronize between the different modules of the vacuum sorter 602 and the peeler 600. An exemplary controller 660 may obtain input from: an operator; sensors; and one or more modules of a cardboard-handling system of which the vacuum sorter 602 is part of.

The synchronization may be: between the arrival of a pre-treated cardboard 606 and the gripping mechanism 612; and/or the placement and/or height of the gripping mechanism 612 according to the length, width, placement and/or velocity of the pre-treated cardboard 606; as well as other parameters. The controller 660 may command or control one or more actuators of the peeler modules and/or other one or more other modules of the cardboard-handling system that the cardboard pre-treatmenter is part of.

As previously noted in connection with FIG. 20, the pre-treated cardboard includes sections 304*a-n* treated by dies and/or laser. Each section 304*a-n* may be held to the surrounding cardboard and/or to one or more other sections 304*a-n* by joints 312*a-n*.

Figure 25:
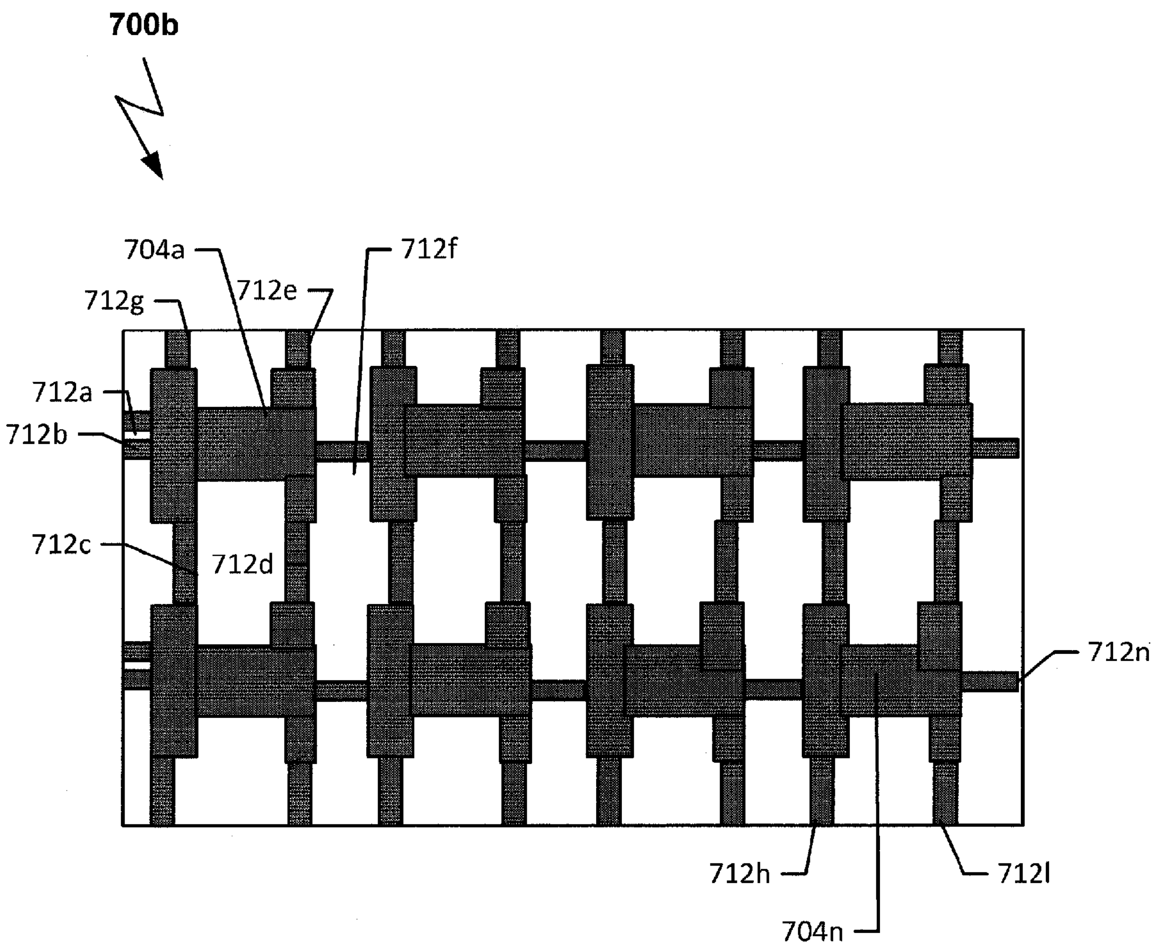
FIG. 25 schematically illustrates a simplified portion of a block diagram with relevant elements of an example of an embodiment of a selective mask, according to teachings of the present disclosure.

The novel system and method to separate the required sections from the pre-treated cardboard may further comprise creating a separating mask. FIG. 25 is a schematic diagram that illustrates an exemplary separating mask 700*b*. Exemplary separating mask 700*b* may have a substantially similar shape as a pretreated cardboard layout of the sections 304*a-n* and their joints 312*a-n*. In other exemplary embodiments, the separating mask 700*b* may have a substantially negative image of the shape of the layout of the sections 704*a-n* and their joints.

The separating mask 700*b* material may be cardboard, plastic, PET, etc. The separating mask 700*b* may be produced by the cardboard-handling system itself (dies and/or laser.), such as the cardboard-handling system similar to the ones depicted in FIGS. 1*a-b*.

Figure 26A:
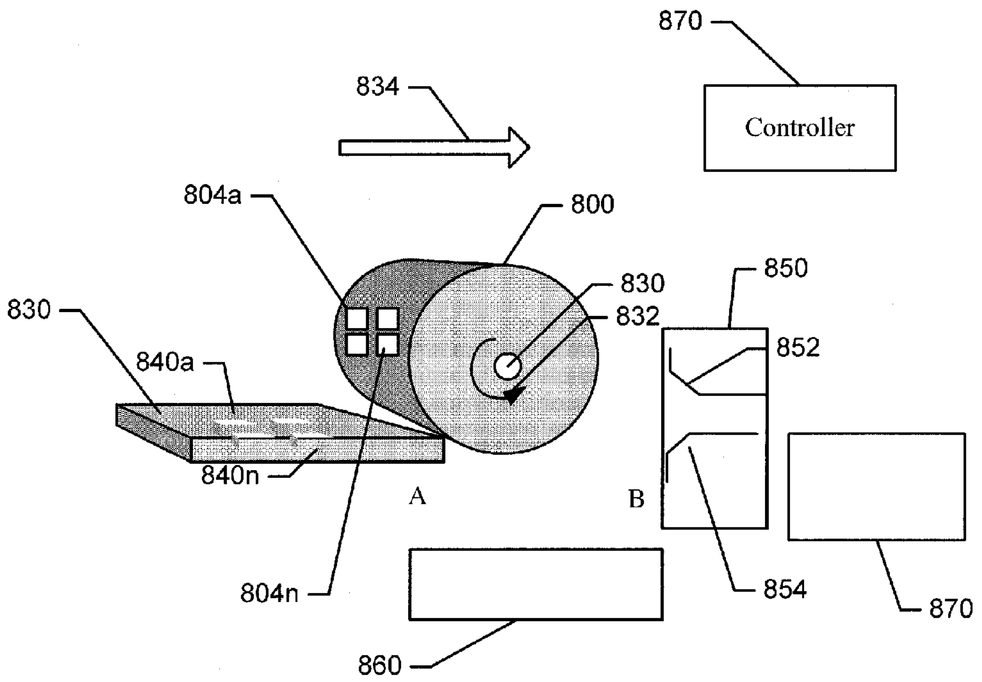
FIG. 26*a* schematically illustrates a simplified portion of a block diagram with relevant elements of an example embodiment of a selective drum, according to teachings of the present disclosure.

The separating mask 700*b* may be placed on the surface of a selective drum similar to the selective drum described in FIG. 26*a*, which schematically illustrates a simplified portion of a block diagram with relevant elements of an example embodiment of a selective drum 800, according to teaching of the present disclosure. Selective drum 800 may be part of a cardboard-handling system 800*a*, for example. In other embodiments it may be a standalone unit. An exemplary embodiment of a selective drum 800 may comprise a vacuum chamber existing within or applying the vacuum force within the interior of the selective drum 800. The surface of the selective drum 800 may comprise a plurality of openings that extend to the interior of the selective drum 800 (not shown in drawing). The selective drum 800 may pivot in the direction of arrow 832 around a center axis 830.

A pre-treated cardboard 830 may be moved to a position adjacent to the selective drum 800 (point A) by a conveyor or other mechanism. The pre-treated cardboard 830 may have one or more sections 840*a-n*. A separating mask 700*b* may be associated with the surface of the selective drum 800. The association may be by grippers, vacuum, etc. The separating mask 700*b* layout may be a negative image to the sections 840*a-n* of the pretreated cardboard 830 and include areas 704*a-n* that corresponds with sections 840*a-n*. In other embodiments the separating mask 700*b* layout may be a similar to the sections 840*a-n* of the pre-treated cardboard 830.

The pre-treated cardboard 830 may be pulled or encouraged or biased by the selective drum 800 from point A to point B. The movement of the cardboard 830 may be created by the cooperation of the vacuum and movement of the drum, for example. In another exemplary embodiment, the movement may be realized by the use of a gripper (not shown in drawing). At point B, a leader 850 may be implemented.

An example of a leader 850 may comprise an upper arm with an angle 852 (15 degrees, for example) and a lower arm with an angle 854 (15 degrees, for example). When a pre-treated cardboard hits one of the arms, it may bounce toward the center of the leader 850, and/or bounce toward the other arm and then enter the leader 850, and so on. The angle of the arms may be according to different criteria. Exemplary criteria may be cardboard parameters and velocity of the cardboard. The other variations of the leader mentioned above with reference to FIG. 22 also apply here.

At the end of the leader 850, a pile 870 of separated pre-treated cardboard may be accumulated. In some embodiments, the leader 850 may move toward the drum in order to pull the pre-treated cardboard. The waste left on the surface of the drum may be removed by a brush (not shown in drawing) at a low point of the drum toward pile 860, and/or at the low point of the drum there may be an area with no vacuum.

In embodiments that the separating mask 700*b* is a negative image of sections together with their joints, the sections together with their joints may cling to the selective drum 800 toward point B. The remaining parts of the pre-treated cardboard may be masked from the vacuum by the separating mask 700*b* and thus fall by gravitational force toward a basket 860, for example. At point B the leader may scrape and lead the sections together with their joints toward a pile of other sections together with their joints, and/or toward another module. Other modules may operate in conjunction with the illustrated embodiment, such as, but not limited to a conveyor, or stacker.

Some exemplary embodiments may further comprise a controller 870. The controller may synchronize between the selective drum 800 and different modules. Exemplary different modules may be modules of a cardboard-handling system, a stacker, a conveyor, etc. An exemplary controller 870 may receive indications from mechanical sensors, electro/optical sensors, and/or electro/mechanical sensors, and/or a user, exemplary sensors may be indicate the placement of the pretreated cardboard before it reaches point A. Accordingly, the controller can command the selective drum 800 to pivot in a way that the separating mask 700*b* on its surface will match the incoming pretreated cardboard.

The controller may further synchronize between the arrival of output of the selective drum 800 and a gripping mechanism of a stacker, and so on. The controller may send commands toward the one or more actuators incorporated into the one or more modules of the cardboard handling system and/or the selective drum 800.

In other exemplary embodiments, where the separating mask 700*b* is similar to the sections together with their joints, then basket 860 may collect the sections together with their joints, and pile 870 may accumulate the remaining areas of the pretreated cardboard.

Figure 26B:
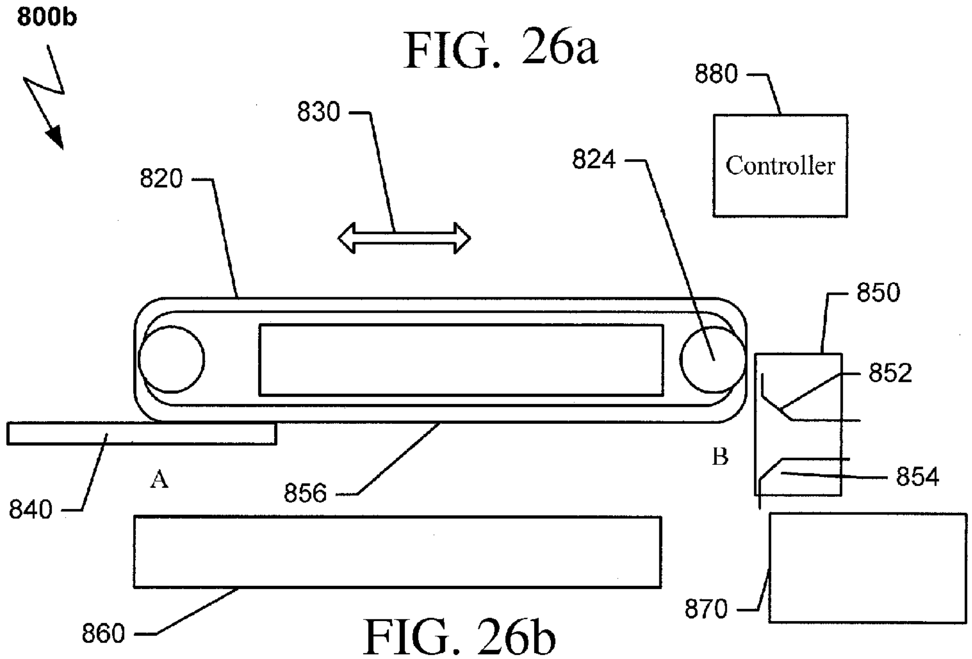
FIG. 26*b* schematically illustrates a simplified portion of a block diagram with relevant elements of an exemplary embodiment of a selective belt, according to teachings of the present disclosure.

FIG. 26*b* schematically illustrates a simplified portion of a block diagram with relevant elements of an exemplary embodiment of a selective belt 800*b*, according to teaching of the present disclosure. The illustrated embodiment of the exemplary selective belt 800*b* may be part of a cardboard-handling system, for example. The selective belt 800*b* may convey a pretreated cardboard 840 on the bottom surface of the selective belt 800*b*.

An exemplary embodiment of a selective belt 800*b* may comprise a vacuum chamber 826 that may generate a vacuum. An exemplary embodiment of a vacuum chamber may further comprise a vacuum belt 820 with a plurality of openings penetrating through the belt (openings not shown in drawing) for example. A separating mask may be associated with the surface of the vacuum belt 820 (not shown in drawing). The association may be by grippers, vacuum, etc. The separating mask layout may be a negative image to the sections of the pretreated cardboard 840. In other embodiments the separating mask layout may be similar to the sections of the pretreated cardboard 840.

The pretreated cardboard 840 may be encouraged, biased or otherwise pulled by the vacuum belt 820 from point A toward point B. The pulling may be by the cooperation of the vacuum and movement of the belt, for example, in another exemplary embodiment, the pulling may be effected by at least one gripper (not shown in drawing), and so on. At point B, a leader 850 may be implemented. An exemplary embodiment of a leader may be similar to the one described in FIG. 26*a*. At the end of the leader 850, a pile of separated pre-treated cardboard may be accumulated.

Thus, the pretreated cardboard 840 may be transmitted by the vacuum belt 820 from point A toward point B. In embodiments that the separating mask is a negative image of sections together with their joints, the sections together with their joints may cling to the vacuum belt 820 toward point B. The remaining parts of the pre-treated cardboard may be masked from the vacuum by the separating mask and thus fall by gravitation toward a basket 860.

At point B, the leader may scrape and lead the sections together with their joints toward a pile of other sections together with their joints, and/or toward another module, such as, but not limited to: a conveyor or a stacker.

The selective belt 800*b* may be synchronized with one or more modules of a cardboard-handling system. One exemplary embodiment of synchronization may be by a timing belt associated to the vacuum belt 820 and to a side gripper. Thus, the vacuum belt 820 may start its movement and velocity according to synchronizing inputs, and so on. Other exemplary synchronizing mechanism may be by applying one or more servo drivers and electronic synchronization. Two or more axes 822 may be used by the vacuum belt 820 as axis points to pivot around when moving in directions similar to arrow 830.

Some exemplary embodiments the vacuum belt 820 may be made of a plurality of straps. The straps may be with wholes. In other embodiments the straps may be without holes but with gaps between two or more straps for the suction underneath to affect the cardboard.

Some exemplary embodiments may further comprise a controller 880. The controller 880 may synchronize between the selective belt 800*b* and different modules. Examples of such different modules may be modules of a cardboard-handling system, a stacker, or a conveyor. An exemplary controller 880 may receive indications from mechanical sensors, electro/optical sensors, and/or electro/mechanical sensors, and/or a user, exemplary sensors may be indicate the placement of the pretreated cardboard before it reaches point A. Accordingly, the controller can command the selective belt 800*b* to pivot in a way that the separating mask on its surface will match the incoming pretreated cardboard.

Figure 27A:
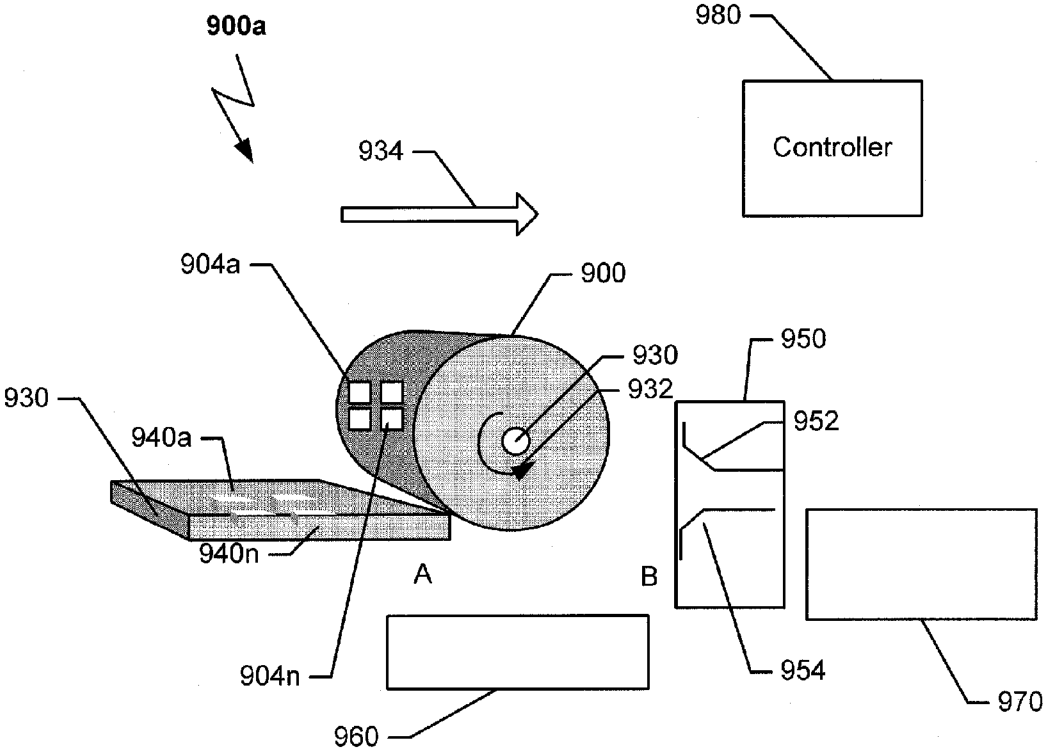
FIG. 27*a* schematically illustrates a simplified portion of a block diagram with relevant elements of an exemplary embodiment of an electrically charged drum separator, according to teachings of the present disclosure.

The controller 880 may further synchronize between the arrival of output of the selective belt 800*b* and a gripping mechanism of a stacker. The controller 880 may send commands toward the one or more actuators at one or more modules of the cardboard handling system and/or the selective belt 800*b*. In other exemplary embodiments, where the separating mask is similar to the sections together with their joints, then basket 860 may accumulate the layout of the package together with their joints, and pile 870 may accumulate the remaining areas of the pre-treated cardboard. FIG. 27*a* schematically illustrates a simplified portion of a block diagram with relevant elements of an exemplary embodiment of a electrically charged drum separator 900*a*. The illustrated electrically charged drum separator 900*a* may be charged with electric charged. The electric charged drum separator 900*a* may then be uncharged at predefined areas by a laser beam, for example. The predefined areas to be uncharged may be similar to the layout of the package together with their joints. In other embodiments, the predefined areas may be a negative image of the layout of the package together with their joints. The structure and operation of a system comprising an electrically charged drum separator 900*a* may be similar to that of the system shown in FIG. 26*a* and detailed above.

Figure 27B:
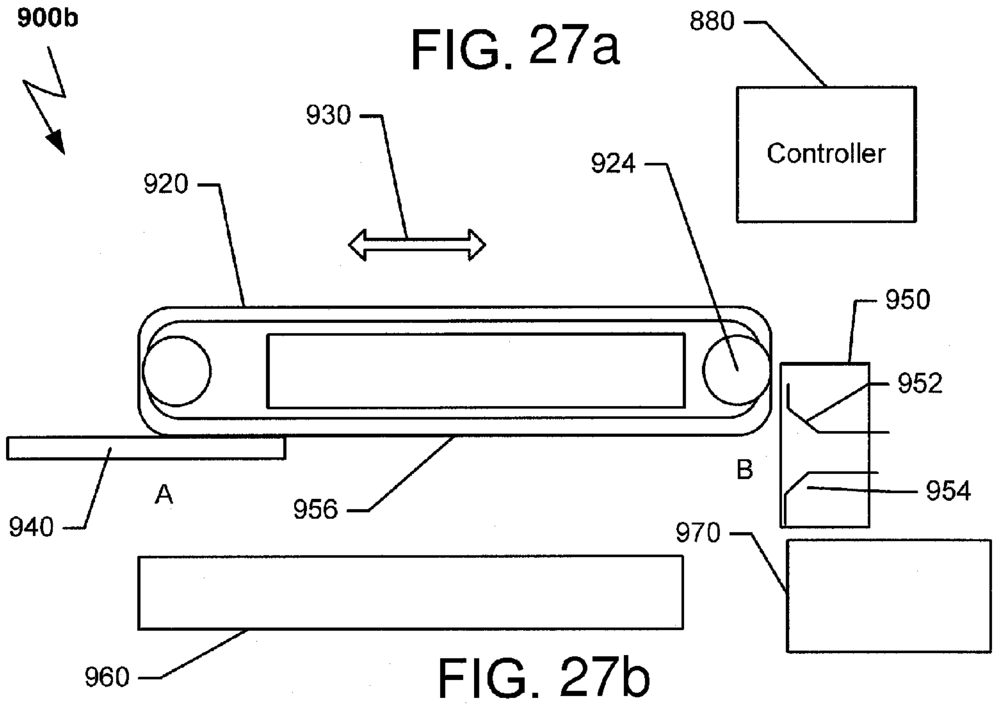
FIG. 27*b* schematically illustrates a simplified portion of a block diagram with relevant elements of an exemplary embodiment of an electrically charged belt separator, according to teachings of the present disclosure.

FIG. 27*b* schematically illustrates a simplified portion of a block diagram with relevant elements of an exemplary embodiment of an electrically charged belt separator 900*b*. An exemplary embodiment of an electrically charged belt separator 900*b* may be charged with an electric charge. The electric charged belt separator 900*b* may then be uncharged at predefined areas by a laser beam, for example. Predefined areas may be similar to the layout of the package together with their joints. In other embodiments, the predefined areas may a negative image of the layout of the package together with their joints. The structure and operation of a system comprising an electrically charged drum separator 900*b* may be similar to that of the system shown in FIG. 26*b* and detailed above.

Features of the Invention

Feature #1

1. A dynamic-multiple-scanner system, comprising:

a controller;

a conveyor; and two or more laser-beam scanners communicatively coupled to the controller and configured to pre-treat a cardboard while the cardboard is been conveyed on the conveyor at a substantially constant velocity;

wherein the controller is configured to dynamically and automatically assign responsibility area to at least one of the two or more laser-beam scanners to pre-treat the cardboard.

2. The dynamic-multiple-scanner system of claim 1, wherein the controller is further configured to divide the cardboard into a plurality of divisions and automatically and dynamically associate at least one of the two or more laser-beam scanners with one or more of the division during pre-treatment of a cardboard.

3. The dynamic-multiple-scanner system of claim 2, wherein the controller is further configured to synchronize the starting point of pre-treatment of each division by the associated one or more laser-beam scanners.

4. The dynamic-multiple-scanner system of claim 1, wherein the controller is further configured to divide the cardboard into a plurality of divisions and associate a laser-beam scanner with one or more of the division based at least in part on a job description for that cardboard.

5. The dynamic-multiple-scanner system of claim 4, wherein the controller is further configured to synchronize the starting point of pre-treatment of each division by the associated one or more laser-beam scanner.

6. The dynamic-multiple-scanner system of claim 1, wherein the responsibility area of two or more laser-beam scanners at least partially overlap.

7. The dynamic-multiple-scanner system of claim 1, wherein two or more laser-beam scanners are placed substantially parallel to each other.

8. The dynamic-multiple-scanner system of claim 1, wherein the number of laser-beam scanners pre-treating a cardboard is a function of the cardboard size.

9. The dynamic-multiple-scanner system of claim 1, wherein cardboard is conveyed in one direction.

10. The dynamic-multiple-scanner system of claim 1, wherein the application of a pre-treatment of a cardboard comprises cutting the cardboard.

11. The dynamic-multiple-scanner system of claim 2, wherein the size of a division is adapted to the sub-layout of the division required to be pre-treated by the laser-beam scanner.

12. The dynamic-multiple-scanner system of claim 2, wherein the pre-treatment of each division by the relevant one or more laser-beam scanner is started in accordance with the sub-layout of the division required to be pre-treated by laser.

13. A method of applying pre-treatment to a cardboard item using a dynamic-multiple-scanner system, the method comprising the actions of:

obtaining a required layout of a cardboard for laser-beam pre-treatment;

dividing the cardboard into a plurality of divisions;

defining one or more laser-beam scanner responsibility areas for one or more divisions;

defining one or more laser-beam scanner pre-treating starting points for one or more divisions.

14. The method of claim 13, further comprising the action of: obtaining the cardboard and pre-treating it while it is being conveyed at a substantial constant velocity.

15. The method of claim 13, further comprising the action of: automatically and dynamically controlling and synchronizing one or more laser-beam scanner according to the division.

16. The method of claim 13, wherein the actions are done during pre-treatment of a cardboard item.

17. The method of claim 13, wherein the action of defining one or more laser-beam scanner responsibility area includes overlapping between one or more scanners responsibility area.

18. The claim 14, wherein the cardboard is conveyed in one direction while the pre-treatment is applied.

19. The method of claim 14, wherein the action of pre-treating the cardboard includes cutting the cardboard.

20. The method of claim 13, wherein the step of dividing the cardboard into a plurality of divisions further comprises adapting a division size to the sub-layout of the division required to be pre-treated by the laser-beam scanner.

21. The method of claim 13, wherein the action of defining one or more laser-beam scanner pre-treating starting point for one or more divisions is at least partially based on the sub-layout of the division required to be pre-treated by laser.

Feature #2

1. An automatic-adjustable stacker, comprising:

a controller that obtains information on a length of a pre-treated cardboard; and an automatic-adjustable gripper mechanism;

wherein the controller synchronizes the automatic-adjustable gripper mechanism with the arrival of a leading edge of a pre-treated cardboard at substantially an end-edge of a module preceding the automatic-adjustable stacker, the automatic-adjustable gripper mechanism operating to:

grip the leading-edge of the pre-treated cardboard from the substantially end-edge of the module preceding the automatic-adjustable stacker;

transfer the pre-treated cardboard toward a desired location; and release the transferred pre-treated cardboard when a trailing-edge of the pre-treated cardboard is proximate to the end-edge of the module preceding the automatic-adjustable stacker, based at least in part on the length of the pre-treated cardboard obtained by the controller, wherein a concavity-like shape is created to the pretreated cardboard while it is being transferred.

2. The automatic-adjustable stacker of claim 1, further comprising an automatic-adjustable extender that is placed substantially near the end-edge of the module preceding the automatic-adjustable stacker, wherein the length of the automatic-adjustable extender is automatically adjusted according to commands received from the controller, and wherein the automatic-adjustable gripper mechanism operates to:

transfer the pre-treated cardboard toward the desired location by transferring the pre-treated cardboard along the automatic-adjustable extender; and release the transferred pre-treated cardboard when the trailing-edge of the pre-treated cardboard substantially reaches the end-edge of the automatic adjustable extender wherein a concavity-like shape is created to the pretreated cardboard while it is being transferred.

3. The automatic-adjustable stacker of claim 2, wherein the automatic-adjustable stacker sorts a plurality of cardboards into two or more piles of pre-treated cardboards by automatically adjusting the length of the automatic-adjustable extender according to commands obtained from the controller.

4. The automatic-adjustable stacker of claim 1, further comprising an automatic-adjustable limiter that stops the pre-treated cardboards inertia movement, when released from the automatic-adjustable gripper mechanism, wherein the automatic-adjustable limiter is automatically positioned according to the length of the pre-treated cardboard.

5. The automatic-adjustable stacker of claim 1, wherein the controller is configured to obtain information on the length of the pre-treated cardboard from one or more sensors.

6. The automatic-adjustable stacker of claim 1, wherein the controller is configured to obtain information on the length of the pre-treated cardboard from a job description.

7. The automatic-adjustable stacker of claim 1, further comprising an automatically adjusted collector.

8. The automatic-adjustable stacker of claim 7, wherein the collector length is automatically adjusted according the length of the pre-treated cardboard.

9. The automatic-adjustable stacker of claim 7, wherein the location of the collector is automatically adjusted according to the length of the pre-treated cardboard.

10. The automatic-adjustable stacker of claim 1, wherein the automatic-adjustable gripper mechanism comprises a clip that is operative to hold the cardboard.

11. The automatic-adjustable stacker of claim 10, further comprising an automatic-adjustable gripping-mechanism opener having a gradual arch cam shape that cooperatively interacts with the automatic-adjustable gripping-mechanism to cause the release of the cardboard and that is automatically positioned to cause the release of the cardboard from the gripping-mechanism based at least in part on the length of the pre-treated cardboard, wherein the gripping-mechanism includes an actuating arm that comes into contact with the gradual arch cam shape and thus causes the gripping mechanism to open.

12. The automatic-adjustable stacker of claim 1, wherein the module preceding the automatic-adjustable stacker is a cardboard pre-treatmenter.

13. The automatic-adjustable stacker of claim 12, wherein the cardboard pre-treatmenter is a laser cardboard pre-treatmenter.

14. A method for controlling an automatic-adjustable stacker, the method being executed by a processor, the method comprising controlling mechanical elements to perform the actions of:

getting information from a source identifying the length of a pretreated cardboard;

causing a first mechanism an automatic-adjustable stacker to grip a pre-treated cardboard at its leading edge from substantially an end edge of a module preceding the automatic-adjustable stacker;

transferring the pre-treated cardboard toward a pile of pre-treated cardboards; and releasing the pre-treated cardboard when the trailing edge of the pre-treated cardboard reaches substantially the end edge of the module preceding the automatic-adjustable stacker, and acting as a surface supporting the pre-treated cardboard, and wherein the first mechanism and the edge of the surface supporting the pre-treated cardboard cooperate to create a concavity-like shape to the pretreated cardboard while it is being transferred.

15. The method of claim 14, further comprising the action of automatically extending a length of an automatic-adjustable extender that is placed substantially near the end-edge of the module preceding the automatic-adjustable stacker based at least in part on commands gotten from a controller.

16. The method of claim 15, further comprising the action of sorting two or more piles of pre-treated cardboards by automatically adjusting the length of the automatic-adjustable extender according to commands gotten from the controller.

17. The method claim 14, further comprising the action of automatically positioning an automatic-adjustable limiter based at least in part on the length of the pre-treated cardboard, such that the automatic-adjustable limiter stops the inertia movement of the pre-treated cardboard when released from the automatic-adjustable gripper mechanism.

18. The method of claim 14, wherein the source for getting information identifying the length of the pretreated cardboard is obtained from one or more sensors.

19. The method of claim 14, wherein the source for getting information identifying the length of the pretreated cardboard is obtained from a job description.

20. The method of claim 14, further comprising automatically adjusting the length of a collector for receiving the cardboard.

21. The method of claim 20, wherein the action of automatically adjusting the length of the collector is based on the length of the pre-treated cardboard.

22. The method claim 14, further comprising the action of automatically adjusting the placement of a collector for receiving the cardboard.

23. The method claim 14, wherein the action of automatically adjusting the placement of the collector placement is based at least in part on the length of the pre-treated cardboard.

Feature #3

1. A vacuum sorter comprising:

a controller a vacuum chamber having openings along a portion of its surface; and a peeler;

wherein a pre-treated cardboard is placed along the surface of the vacuum chamber and the controller commands the peeler to get hold of an area of the pre-treated cardboard and pull a portion of the pre-treated cardboard away from the vacuum chamber surface.

2. The vacuum sorter of claim 1, associated with a laser that cuts required areas along the pre-treated cardboard.

3. The vacuum sorter of claim 1, further comprising a belt with openings associated to the surface of the vacuum chamber.

4. The vacuum sorter of claim 1, further comprising a plurality of belts, placed with gaps between them, associated to the surface of the vacuum chamber.

5. The vacuum sorter of claim 1, wherein the vacuum sorter is associated to a cardboard handling system.

6. The vacuum sorter of claim 5, wherein the vacuum sorter is associated to a SART cardboard handling system.

7. The vacuum sorter of claim 1, wherein the peeler comprises a gripping mechanism.

8. The vacuum sorter of claim 1, wherein the peeler comprises a leader.

9. The vacuum sorter of claim 1, further comprising a brush.

10. The vacuum sorter of claim 1, vacuum chamber surface is a conveyor.

11. The vacuum sorter of claim 1, wherein the vacuum chamber surface has an area with no openings.

12. A selective mask sorter, comprising:

a controller;

a conveyor with opening along a portion of its surface associated to a vacuum chamber;

wherein a selective mask is associated to the surface of the conveyor, the selective mask having openings in substantial similar size and place as areas of a pre-treated cardboard that will be conveyed by the conveyor, required to cling to the conveyor;

and wherein the controller synchronizes between the arrival of the pre-treated cardboard and the conveyor motion.

13. The selective mask sorter of claim 13, further comprising a leader that strips a portion of the pre-treated cardboard from the conveyor.

14. The selective mask sorter of claim 13, wherein the conveyor is a belt.

15. The selective mask sorter of claim 13, wherein the selective mask material comprises a polymer.

16. The selective mask sorter of claim 13, wherein the selective mask material is a cardboard.

17. The selective mask sorter of claim 13, wherein the selective mask layout of cuts is a negative of at least the pretreated cardboard's sections.

18. A selective mask sorter, comprising:

a controller;

a conveyor having a coating holding an electrical charge along a portion of its surface; and a discharger;

wherein a the discharger discharges the conveyor surface at areas substantial similar size and place as areas of a pre-treated cardboard that are required to cling to the conveyor when been conveyed by the conveyor; and wherein the controller synchronizes between the arrival of the pre-treated cardboard and the conveyor motion.

19. The selective mask sorter of claim 18, further comprising a leader that strips a portion of the pre-treated cardboard from the conveyor.

20. The selective mask sorter of claim 18, wherein the conveyor is a belt.

21. The selective mask sorter of claim 18, wherein the selective mask layout of cuts is a negative of at least the pretreated cardboard's section.

We claim:

1. A method of applying pre-treatment to a cardboard item using a dynamic-multiple-scanner system, the method comprising the actions of:

providing a system which comprises a controller, a conveyor, and two or more laser-beam scanners communicatively coupled to the controller and configured to pre-treat a cardboard while the cardboard is being conveyed on the conveyor at a substantially constant velocity, wherein the controller is configured to dynamically and automatically assign responsibility area to at least one of the two or more laser-beam scanners to pre-treat the cardboard;

obtaining a required layout of a cardboard for laser-beam pre-treatment;

dividing the cardboard into a plurality of divisions;

defining one or more laser-beam scanner responsibility areas for one or more divisions; and defining one or more laser-beam scanner pre-treating starting points for one or more divisions.

2. An automatic-adjustable stacker, comprising:

a controller that obtains information on a length of a pre-treated cardboard; and an automatic-adjustable gripper mechanism;

wherein the controller synchronizes the automatic-adjustable gripper mechanism with the arrival of a leading edge of a pre-treated cardboard at substantially an end-edge of a module preceding the automatic-adjustable stacker, the automatic-adjustable gripper mechanism operating to:

grip the leading-edge of the pre-treated cardboard from the substantially end-edge of the module preceding the automatic-adjustable stacker;

transfer the pre-treated cardboard toward a desired location; and release the transferred pre-treated cardboard when a trailing-edge of the pre-treated cardboard is proximate to the end-edge of the module preceding the automatic-adjustable stacker, based at least in part on the length of the pre-treated cardboard obtained by the controller, wherein a concavity-like shape is created to the pre-treated cardboard while it is being transferred;

the stacker further comprising an automatic-adjustable extender that is placed substantially near the end-edge of the module preceding the automatic-adjustable stacker, wherein the length of the automatic-adjustable extender is automatically adjusted according to commands received from the controller, and wherein the automatic-adjustable gripper mechanism operates to: transfer the pre-treated cardboard toward the desired location by transferring the pre-treated cardboard along the automatic-adjustable extender, and release the transferred pre-treated cardboard when the trailing-edge of the pre-treated cardboard substantially reaches the end-edge of the automatic adjustable extender wherein a concavity-like shape is created to the pre-treated cardboard while it is being transferred ;

the stacker further comprising an automatic-adjustable limiter that stops the pre-treated cardboards inertia movement , when released from the automatic-adjustable gripper mechanism, wherein the automatic-adjustable limiter is automatically positioned according to the length of the pre-treated cardboard.

3. The automatic-adjustable stacker of claim 2, wherein the automatic-adjustable stacker sorts a plurality of cardboards into two or more piles of pre-treated cardboards by automatically adjusting the length of the automatic-adjustable extender according to commands obtained from the controller.

4. The automatic-adjustable stacker of claim 2, wherein the controller is configured to obtain information on the length of the pre-treated cardboard from one or more sensors.

5. The automatic-adjustable stacker of claim 2, wherein the controller is configured to obtain information on the length of the pre-treated cardboard from a job description.

6. The automatic-adjustable stacker of claim 2, further comprising an automatically adjusted collector.

7. The automatic-adjustable stacker of claim 6, wherein the collector length is automatically adjusted according the length of the pre-treated cardboard.

8. The automatic-adjustable stacker of claim 6, wherein the location of the collector is automatically adjusted according to the length of the pre-treated cardboard.

9. The automatic-adjustable stacker of claim 2, wherein the automatic-adjustable gripper mechanism comprise a clip that is operative to hold the cardboard.

10. The automatic-adjustable stacker of claim 9, further comprise an automatic-adjustable gripping-mechanism opener having a gradual arch cam shape that cooperatively interacts with the automatic-adjustable gripping-mechanism to cause the release of the cardboard and that is automatically positioned to cause the release of the cardboard from the tripping-mechanism based at least in part on the length of the pre-treated cardboard, wherein the gripping-mechanism includes an actuating arm that comes into contact with the gradual arch cam shape and thus causes the gripping mechanism to open.

11. The automatic-adjustable stacker of claim 2, wherein the module preceding the automatic-adjustable stacker is a cardboard pre-treatmenter.

12. The automatic-adjustable stacker of claim 11, wherein the cardboard pre-treatmenter is a laser cardboard pre-treatmenter.

13. A method for controlling an automatic-adjustable stacker which comprises (a) a controller that obtains information on a length of a pre-treated cardboard and (b) an automatic-adjustable gripper mechanism;

wherein the controller synchronizes the automatic-adjustable gripper mechanism with the arrival of a leading edge of a pre-treated cardboard at substantially an end-edge of a module preceding the automatic-adjustable stacker, the automatic-adjustable gripper mechanism operating to:

grip the leading-edge of the pre-treated cardboard from the substantially end-edge of the module preceding the automatic-adjustable stacker;

transfer the pre-treated cardboard toward a desired location; and release the transferred pre-treated cardboard when a trailing-edge of the pre-treated cardboard is proximate to the end-edge of the module preceding the automatic-adjustable stacker, based at least in part on the length of the pre-treated cardboard obtained by the controller, wherein a concavity-like shape is created to the pretreated cardboard while it is being transferred, the method being executed by a processor, the method comprising:

controlling mechanical elements of the stacker to perform the actions of:

getting information from a source identifying the length of a pretreated cardboard;

causing a first mechanism an automatic-adjustable stacker to grip a pre-treated cardboard at its leading edge from substantially an end edge of a module preceding the automatic-adjustable stacker;

transferring the pre-treated cardboard toward a pile of pre-treated cardboards; and releasing the pre-treated cardboard when the trailing edge of the pre-treated cardboard reaches substantially the end edge of the module preceding the automatic-adjustable stacker, and acting as a surface supporting the pre-treated cardboard, and wherein the first mechanism and the edge of the surface supporting the pre-treated cardboard cooperate to create a concavity-like shape to the pretreated cardboard while it is being transferred.

14. The method of claim 13, further comprising the action of automatically extending a length of an automatic-adjustable extender that is placed substantially near the end-edge of the module preceding the automatic-adjustable stacker based at least in part on commands gotten from a controller.

15. The method of claim 14, further comprising the action of sorting two or more piles of pre-treated cardboards by automatically adjusting the length of the automatic-adjustable extender according to commands gotten from the controller.

16. The method claim 14, further comprising the action of automatically positioning an automatic-adjustable limiter based at least in part on the length of the pre-treated cardboard, such that the automatic-adjustable limiter stops the inertia movement of the pre-treated cardboard when released from the automatic-adjustable gripper mechanism.

17. The method of claim 14, wherein the source for getting information identifying the length of the pretreated cardboard is obtained from one or more sensors.

18. The method of claim 14, wherein the source for getting information identifying the length of the pretreated cardboard is obtained from a job description.

19. The method of claim 13, further comprising automatically adjusting the length of a collector for receiving the cardboard.

20. The method claim 13, further comprising the action of automatically adjusting the placement of a collector for receiving the cardboard.

* * * * *